United States Patent
Iwata et al.

(10) Patent No.: US 7,348,984 B1
(45) Date of Patent: Mar. 25, 2008

(54) IMAGE GENERATING APPARATUS, DATABASE AND STORAGE MEDIUM

(75) Inventors: Satoshi Iwata, Kawasaki (JP); Takahiro Matsuda, Kawasaki (JP); Yuji Takahashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/356,445

(22) Filed: Jul. 19, 1999

(30) Foreign Application Priority Data

Oct. 12, 1998 (JP) .................................. 10-289654
Apr. 15, 1999 (JP) .................................. 11-107945

(51) Int. Cl.
*G06T 15/70* (2006.01)
(52) U.S. Cl. .................. 345/473; 345/419; 345/474; 345/475; 345/581; 345/629; 704/270
(58) Field of Classification Search ................ 345/418, 345/473, 474, 475, 419, 581, 629; 704/270
See application file for complete search history.

(56) References Cited

U.S. PATENT DOCUMENTS

| | | | | |
|---|---|---|---|---|
| 5,923,337 | A | * | 7/1999 | Yamamoto .................. 345/473 |
| 6,167,562 | A | * | 12/2000 | Kaneko .......................... 717/1 |
| 6,256,032 | B1 | * | 7/2001 | Hugh .......................... 345/357 |
| 6,283,858 | B1 | * | 9/2001 | Hayes, Jr. et al. .......... 345/418 |

FOREIGN PATENT DOCUMENTS

JP          10-134202          5/1998

* cited by examiner

*Primary Examiner*—Kimbinh T. Nguyen
(74) *Attorney, Agent, or Firm*—Staas & Halsey LLP

(57) ABSTRACT

An image generating apparatus is provided with an image generating part for generating a sequential character image by connecting a plurality of unit image groups which are respectively guaranteed to indicate one communication information, and a display part for displaying the sequential character image.

31 Claims, 48 Drawing Sheets

F I G. 1 0

| PAUSE 1 | PAUSE 2 | PAUSE 3 | PAUSE 4 |
|---|---|---|---|
| WAVING RIGHT HAND<br>STILL<br>STILL<br>WAVING RIGHT HAND<br>STILL<br>WAVING BOTH HANDS | WAVING LEFT HAND<br>STILL<br>STILL<br>WAVING LEFT HAND<br>STILL<br>WAVING BOTH HANDS | | |

WAVING RIGHT HAND

WAVING BOTH HANDS

WAVING LEFT HAND

①TITLE: LEFT HAND INSTRUCTION 1
②T: 1 SECOND
③N: 15
④v: 15 frame/sec
⑤TRANSITION POINT COORDINATE #1:
  xl1, yl1
⑥INSTRUCTING POSITION COORDINATE:
  xlc, ylc
⑦EACH ATTRIBUTE
  SPONTANEOUS ACTION: NONE
  DIRECTION OF FACE: FACING LEFT
  WALKING: NONE
  HABIT: INSTRUCT FROM BELOW
  SPEECH: NONE ⑧, ⑨
  TOP OF HEAD  : xh, yh
  NECK         : xn, yn
  LEFT HAND    : xl1, yl1
  RIGHT HAND   : xr, yr
      ⋮            ⋮

⑩"CHRACTER No. 1"

①TITLE: FACING LEFT 1
②T: 1 SECOND
③N: 15
④v: 15 frame/sec
⑤TRANSITION POINT COORDINATE #1:
   xl1, yl1
⑥INSTRUCTING POSITION COORDINATE:
   xlc, ylc
⑦EACH ATTRIBUTE
   SPONTANEOUS ACTION: NONE
   LINE OF VISION: FACING LEFT
   CAMERA LINK: YES
   WALKING: NONE
   HABIT: INSTRUCT FROM BELOW
   SPEECH: NONE ⑧, ⑨
   TOP OF HEAD : xh, yh
   NECK        : xn, yn
   LEFT HAND   : xl1, yl1
   RIGHT HAND  : xr, yr
         :           :

⑩"CHRACTER No. 1"

FIG. 17A

①EXPRESSION/ACTION
  IDENTIFICATION NAME (TITLE)
②REPRODUCING TIME T
③(NO. OF REPRODUCING IMAGES) N
④(IMAGE REPRODUCING RATE) v
⑤TRANSITION POINT COORDINATE #1
⑥TRANSITION POINT COORDINATE #N
⑦ATTRIBUTE
    EXISTENCE OF SPEECH
    EXISTENCE OF BLINK
    OTHER
⑧COORDINATE OF FEATURE POINT
  (EYE, NOSE, MOUTH, ETC.)
⑨FEATURE POINT IDENTIFICATION NAME
⑩CHARACTER IDENTIFICATION NAME

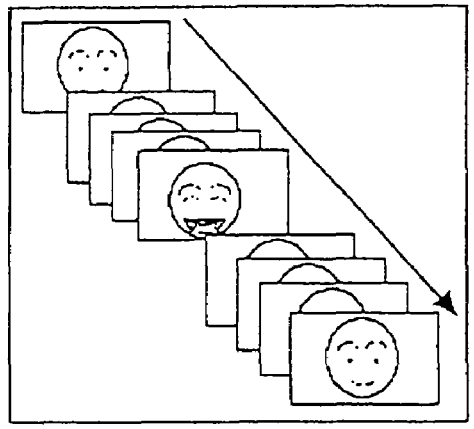

FIG. 17B

①EXPRESSION/ACTION
  IDENTIFICATION NAME (TITLE)
②REPRODUCING TIME T
③(NO. OF REPRODUCING IMAGES) N
④(IMAGE REPRODUCING RATE) v
⑤TRANSITION POINT COORDINATE #1
⑥INSTRUCTING POSITION COORDINATE
⑦ATTRIBUTE
    EXISTENCE OF WALKING
    EXISTENCE OF HABIT
    OTHER
⑧COORDINATE OF JOINT, BODY PART

⑨JOINT IDENTIFICATION NAME
⑩CHARACTER IDENTIFICATION NAME

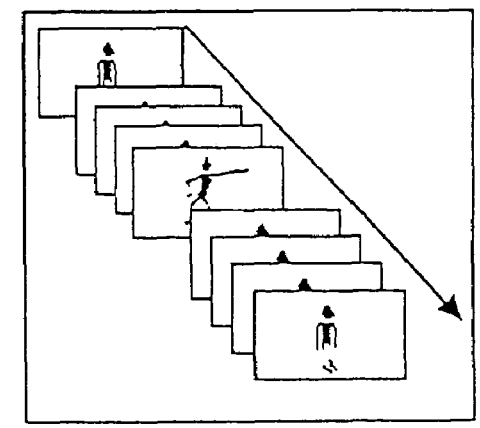

SAME IMAGE
NEUTRAL EXPRESSION/ACTION

REFERENCE IMAGES OF PLURALITY
OF EXPRESSIONS/ACTIONS

FIG. 30

SIGNIFICANCE SPACE: GREETING

```
CHARACTER ID OFFICE LADY
   METHOD
   CHARACTER DISPLAY:    SMILE, BOW
   AUDIO REPRODUCTION:   WELCOME
   USER INPUT:           BUTTON 1: NEXT
                         BUTTON 2: RETURN
   COOPERATION PROCESS:
```
710-1

↓

SIGNIFICANCE SPACE: EXPLANATION

```
CHARACTER ID OFFICE LADY
   METHOD
   CHARACTER DISPLAY:    WAVING HAND
   AUDIO REPRODUCTION:   THIS IS ABC BANK ATM
                         SYSTEM
   USER INPUT:           BUTTON 1: NEXT
                         BUTTON 2: RETURN
   COOPERATION PROCESS:
```
710-2

↓

SIGNIFICANCE SPACE: SELECT

```
CHARACTER ID OFFICE LADY
   METHOD
   CHARACTER DISPLAY:    POINT BUTTON SHIFT LINE
                         OF VISION TO BUTTON
   AUDIO REPRODUCTION:   PLEASE SELECT
                         DESIRED TRANSACTION
   USER INPUT:           BUTTON 1: BALANCE INQUIRY
                         BUTTON 2: WITHDRAWAL
                         BUTTON 3: DEPOSIT
                         BUTTON 4: RETURN
   COOPERATION PROCESS:
```
710-3

↓

SIGNIFICANCE SPACE: OPERATION (WITHDRAWAL)

```
CHARACTER ID OFFICE LADY
   METHOD
   CHARACTER DISPLAY:    POINT BUTTON SHIFT LINE
                         OF VISION TO BUTTON
   AUDIO REPRODUCTION:   PLEASE INPUT PERSONAL ID
                         NOS.
   USER INPUT:           BUTTON 1-9: TEN-KEY
                         BUTTON 10:  CANCEL
                         BUTTON 11:  RETURN
   COOPERATION PROCESS:
```
710-4

↓

PROCESS

↓

SIGNIFICANCE SPACE: GREETING

```
CHARACTER ID OFFICE LADY
   METHOD
   CHARACTER DISPLAY:    SMILE, BOW
   AUDIO REPRODUCTION    THANK YOU
   USER INPUT:           —
   COOPERATION PROCESS:
```
710-5

FIG. 33

| REPRODUCING TIME | IMAGE NO. | | AUDIO DATA |
|---|---|---|---|
| 0'00" | SMILE | #1 | WELCOME |
| 0'20" | | #2 | |
| 0'40" | | #3 | |
| 0'60" | | #4 | |
| 0'80" | | #5 | |
| 1'00" | BOW | #1 | |
| 1'40" | | #2 | |
| 1'80" | | #3 | |
| 2'20" | | #4 | |
| 2'60" | | #5 | |

REPRODUCING LIST

CHARACTER ID

CHARACTER

ID    #1:GIRL    #2:BOY    #3:GENTLEMAN    #4:NOBLEMAN    #5:ANTIQUITY

RETRIEVAL KEY
· ACTION

FIG. 36A   AUDIO REPRODUCTION
- WELCOME
- THANK YOU
- PLEASE CONFIRM
- PLEASE INPUT AGAIN
FIG. 36B   USER INPUT
- BUTTON STRUCTURE
   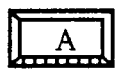   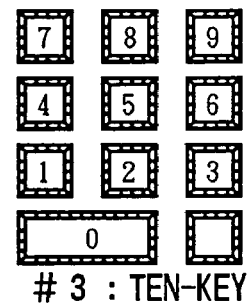
\# 1 : CONFIRM    \# 2 : SELECT    \# 3 : TEN-KEY
FIG. 36C
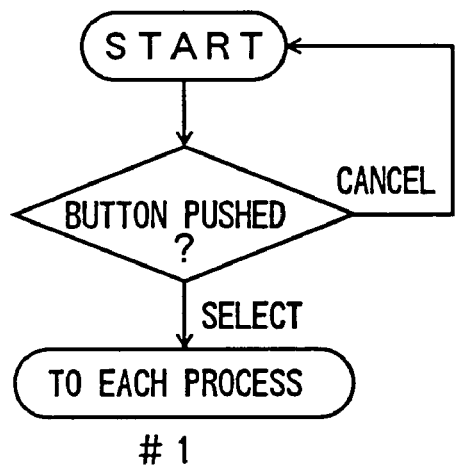
\# 1
FIG. 36D
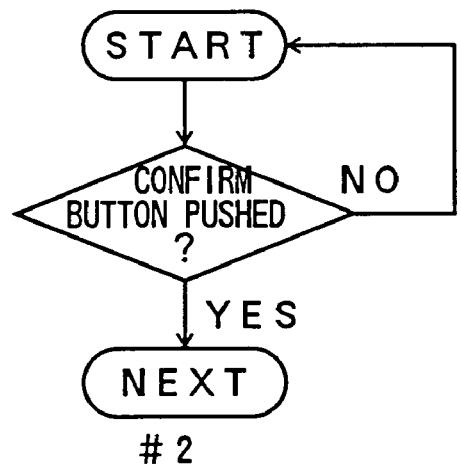
\# 2

FIG. 37

| SIGNIFICANCE SPACE | |
|---|---|
| VARIABLE | |
| $-CHARACTER ID | 5 : ANTIQUITY |
| %-RETRIEVAL KEY | |
| METHOD | |
| CHARACTER DISPLAY | 4 : AMAZED |
| AUDIO REPRODUCTION | PLASE INPUT AGAIN |
| USER INPUT/OUTPUT (BUTTON STRUCTURE/ ALGORITHM) | # 1 : CONFIRM/#1 |
| COOPERATION PROCESS | |

FIG. 43

SIGNIFICANCE SPACE: GREETING

```
CHARACTER ID OFFICE LADY
   METHOD
   CHARACTER DISPLAY:    SMILE, BOW
   AUDIO REPRODUCTION:   WELCOME
   USER INPUT:           BUTTON 1: NEXT
                         BUTTON 2: RETURN
   COOPERATION PROCESS:
   BACKGRAOUND: ABC BANK (DEFAULT PICTURE 11)
```
710A-1

↓

SIGNIFICANCE SPACE: EXPLANATION

```
CHARACTER ID OFFICE LADY
   METHOD
   CHARACTER DISPLAY:    WAVING HAND
   AUDIO REPRODUCTION:   THIS IS ABC BANK ATM
                         SYSTEM
   USER INPUT:           BUTTON 1: NEXT
                         BUTTON 2: RETURN
   COOPERATION PROCESS:
   BACKGROUND:           ABC BANK (DEFAULT PICTURE)
```
710A-2

↓

SIGNIFICANCE SPACE: SELECT

```
CHARACTER ID OFFICE LADY
   METHOD
   CHARACTER DISPLAY:    POINT BUTTON SHIFT LINE
                         OF VISION TO BUTTON
   AUDIO REPRODUCTION:   PLEASE SELECT
                         DESIRED TRANSACTION
   USER INPUT:           BUTTON 1: BALANCE INQUIRY
                         BUTTON 2: WITHDRAWAL
                         BUTTON 3: DEPOSIT
                         BUTTON 4: RETURN
   COOPERATION PROCESS:
   BACKGROUND:           WINDOW (PICTURE 12)
```
710A-3

↓

SIGNIFICANCE SPACE: OPERATION (WITHDRAWAL)

```
CHARACTER ID OFFICE LADY
   METHOD
   CHARACTER DISPLAY:    POINT BUTTON SHIFT LINE
                         OF VISION TO BUTTON
   AUDIO REPRODUCTION:   PLEASE INPUT PERSONAL ID
                         NOS.
   USER INPUT:           BUTTON 1-9: TEN-KEY
                         BUTTON 10: CANCEL
                         BUTTON 11: RETURN
   COOPERATION PROCESS:
   BACKGROUND:           SOLID COLOR (PICTURE 13)
```
710A-4

↓

PROCESS

↓

SIGNIFICANCE SPACE: GREETING

```
CHARACTER ID OFFICE LADY
   METHOD
   CHARACTER DISPLAY:    SMILE, BOW
   AUDIO REPRODUCTION    THANK YOU
   USER INPUT:           —
   COOPERATION PROCESS:
   BACKGROUND:           WINDOW (PICTURE 12)
```
710A-5

| RETRIEVAL KEY | HEADER | BACKGROUND IMAGE FILE |
|---|---|---|
| ABC BANK ← EXTRACT | #0 | (ABC BANK ATM SYSTEM) |
| ... | ... | ... |
| WINDOW | #2 | |
| ... | ... | ... |
| ... | ... | ... |

| RETRIEVAL KEY | HEADER | IMAGE FILE |
|---|---|---|
| ... | ... | ... |
| SMILE ← EXTRACT | T1P5 | #1  #2  #3  #4  #5 |
| ... | ... | ... |
| ... | ... | ... |
| BOW ← EXTRACT | T2P5 | #1  #2  #3  #4  #5 |
| ... | ... | ... |

DATABASE

FIG. 46

| REPRODUCING TIME | IMAGE NO. | AUDIO DATA | BACKGROUND |
|---|---|---|---|
| 0'00" #1<br>0'20" #2<br>0'40" #3<br>0'60" #4<br>0'80" #5<br>1'00" #1<br>1'40" #2<br>1'80" #3<br>2'20" #4<br>2'60" #5 | SMILE<br><br>BOW | WELCOME | A B C<br>B A N K |

REPRODUCING LIST

IMAGE GENERATING APPARATUS, DATABASE AND STORAGE MEDIUM

BACKGROUND OF THE INVENTION

1. Field of the Invention

The present invention generally relates to image generating apparatuses, databases and storage mediums, and more particularly to an image generating apparatus which generates humanoid character images and operation guide sequences, a database which is suited for creating the operation guide sequences, and a computer-readable storage medium which stores a program for causing a computer to generate the humanoid character images and the operation guide sequences.

In this specification, a "humanoid character" refers to an artificial character having behaviors and expressions which are similar to those of humans, where the artificial character may be other than human.

When outputting communication information such as a command, warning and help from a terminal equipment with respect a user, character information is used in most cases. However, when outputting communication information such as information related to emotions and degree or extent with respect to the user, it is difficult to express such information by the character information. In addition, in the case of a user who is unfamiliar with the terminal equipment, it is necessary to first teach the user how to operate the terminal equipment. In such cases, it is possible to display various communication information with respect to the user in an easily understandable manner by employing a user interface which uses humanoid character images.

In this specification, the "communication information" refers to information which is to be conveyed or transferred to the user.

When the user interface using the humanoid character images is employed, it is possible to output a system status to indicate that an error is caused by a machine error, and to output an actual operation image, so as to facilitate the operation of the terminal equipment such as an automatic vending machine and an ATM.

FIG. 1 is a diagram showing an example of a humanoid character image which is displayed on a display part of the ATM. In FIG. 1, a humanoid character 503 which is shown on an enlarged scale on the right side of the figure is displayed on a display part 501 of an ATM 500.

2. Description of the Related Art

Conventionally, when generating the humanoid character image, a general purpose image editing tool typified by a director manufactured by Macromedia, for example, is used in most cases. The general purpose image editing tool calls for quantitative attributes such as a length and an amount of image data, and makes a visual arrangement and connection by displaying the quantitative information of the image data, so as to generate a desired sequential image. Each image data does not indicate a sequential image, and does not represent a series of operations. In other words, a sequential image is created and a humanoid character image and speech or sound are output together, by reading the image data and audio data from files, specifying connecting relationship of the image data and the audio data by the image editing tool, and connecting each of the individual images in correspondence with the audio data.

The human susceptibility or impression with respect to human faces and behaviors is extremely high compared to other images. For this reason, the humanoid character image is easily recognized by the human as compared to other images. Accordingly, it is possible to draw the user's attention by using the humanoid character image, and the leadership of the operation can be transferred from the machine side to the human side, thereby making it possible to reduce uncomfortable feelings towards the operation of the terminal equipment.

However, how the user interprets the communication information which is indicated by the motions such as the expressions and behaviors within the humanoid character image, cannot be guaranteed unless a debugging process is actually performed manually. In other words, without the manual debugging process which is performed by the human operator, it is impossible to guarantee that a desired communication information is actually conveyed accurately to the user. According to the conventional debugging process, when creating a sequential image by connecting the individual images, a judgement is made to confirm whether or not the sequential image appears as if the humanoid character is performing a specific operation. Consequently, it is impossible to automatically evaluate the reliability of the communication information included in the humanoid character image with respect to the susceptibility or impression of the user.

For this reason, by reproducing the generated humanoid character image which is a sequential image, the human operator actually looks at the reproduced humanoid character image to judge whether or not the desired communication information can be perceived. If an inconvenient image portion exists where the desired communication information cannot be perceived as a result of the judgement, it is essential to perform the debugging process to modify contents of this inconvenient image portion so that the desired communication information is positively conveyed to the user. When modifying the contents of the inconvenient image portion of the sequential image, the expressions or behaviors of the humanoid character are changed, for example, so that the desired communication information can be perceived by the human operator.

Preferably, the human operator who actually looks at the reproduced humanoid character image and judges whether or not the desired communication information can be perceived, is other than the person who created the humanoid character image. In addition, it is preferable that this judgement is made by a plurality of people. Furthermore, the debugging process must be performed repeatedly after the inconvenient image portion is modified. As a result, there are problems in that it conventionally requires troublesome processes and considerable time to complete the humanoid character image which can positively convey the desired communication information to the user.

SUMMARY OF THE INVENTION

Accordingly, it is a general object of the present invention to provide a novel and useful image generating apparatus, database and storage medium, in which the problems described above are eliminated.

Another and more specific object of the present invention is to provide an image generating apparatus, database and storage medium, which are capable of generating humanoid character images that can positively convey desired communication information to the viewer.

Still another object of the present invention is to provide an image generating apparatus comprising image generating means for generating a sequential character image by connecting a plurality of unit image groups which are respectively guaranteed to indicate one communication information, and display means for displaying the sequential character image. According to the image generating apparatus of the present invention, it is possible to generate a character image which can positively convey desired communication information to a viewer (user), by carrying out a simple editing process.

A further object of the present invention is to provide a computer-readable storage medium which stores a program for causing a computer to generate a sequential character image, comprising image generating means for causing the computer to generate a sequential character image by connecting a plurality of unit image groups which are respectively guaranteed to indicate one communication information, and display means for causing the computer to display the sequential character image. According to the computer-readable storage medium of the present invention, it is possible to cause a computer to generate a character image which can positively convey desired communication information to a viewer (user), by carrying out a simple editing process.

Another object of the present invention is to provide an image generating apparatus which generates a motion picture, comprising a database storing unit component images respectively representing a series of actions, each of the unit component images being made up of a plurality of images including a starting image and an ending image of an action of a character, a data retrieving part selectively searching and reading the unit component images stored in the database, and a connecting part connecting an end image of a first unit component image read by the data retrieving part and a starting image of a second unit component image read by the data retrieving part. According to the image generating apparatus of the present invention, it is possible to generate a character image which can positively convey desired communication information to a viewer (user).

Still another object of the present invention is to provide an image generating apparatus for generating a motion picture, comprising a database storing unit image groups respectively representing an action of a character and made up of a plurality of images, in correspondence with attribute information defining each action, a retrieving part reading a unit image group corresponding to input attribute information from the database, based on the input attribute information, and editing means for editing the unit image group read by the retrieving part. According to the image generating apparatus of the present invention, it is possible to generate a character image which can positively convey desired communication information to a viewer (user).

A further object of the present invention is to provide a computer-readable storage medium which stores a program for causing a computer to generate a motion picture, comprising a data retrieving part causing the computer to selectively search and read unit component images stored in a database which stores unit component images respectively representing a series of actions, each of the unit component images being made up of a plurality of images including a starting image and an ending image of an action of a character, and a connecting part causing the computer to connect an end image of a first unit component image which is caused to read by the data retrieving part and a starting image of a second unit component image which is caused to read by the data retrieving part. According to the computer-readable storage medium of the present invention, it is possible to cause a computer to generate a character image which can positively convey desired communication information to a viewer (user).

Another object of the present invention is to provide a computer-readable storage medium which stores a program for causing a computer to generate a motion picture, comprising a retrieving part causing the computer to read a unit image group corresponding to input attribute information from a database, based on the input attribute information, the database storing unit image groups respectively representing an action of a character and made up of a plurality of images, in correspondence with attribute information defining each action, and editing means for causing the computer to edit the unit image group caused to read by the retrieving part. According to the computer-readable storage medium of the present invention, it is possible to cause a computer to generate apparatus capable of generating a character image which can positively convey desired communication information to a viewer (user).

Still another object of the present invention is to provide an image generating apparatus comprising image generating means for generating a sequential character image, display means for displaying the sequential character image, and control means for controlling a device depending on a motion of the sequential character image. According to the image generating apparatus of the present invention, it is possible to operate a camera with a feeling as if the character image is handling the camera, in a case where the device is the camera, for example.

A further object of the present invention is to provide an image generating apparatus comprising sequence generating means for generating an operation sequence by connecting a plurality of picture scenes of the character image generated by the image generating apparatus, by treating the character image in units of significance spaces corresponding to one picture scene from a point in time when a switching of one picture of the character image occurs to a point in time when a next switching of one picture occurs, each of the significance spaces being defined as an object at least including a method corresponding to a character display and a method corresponding to a user input and/or output. According to the image generating apparatus of the present invention, it is possible to create and edit the operation sequence with ease.

Another object of the present invention is to provide a computer-readable storage medium which stores a program for causing a computer to generate an operation sequence, comprising sequence generating means for causing the computer to generate an operation sequence by connecting a plurality of picture scenes of a character image, by treating the character image in units of significance spaces corresponding to one picture scene from a point in time when a switching of one picture of the character image occurs to a point in time when a next switching of one picture occurs, each of the significance spaces being defined as an object at least including a method corresponding to a character display and a method corresponding to a user input and/or output. According to the computer-readable storage medium of the present invention, it is possible to cause the computer to create and edit the operation sequence with ease.

Still another object of the present invention is to provide a database comprising a character image stored in units of significance spaces corresponding to one picture scene from a point in time when a switching of one picture of the character image occurs to a point in time when a next switching of one picture occurs, and each of said significance spaces is defined as an object at least including a method corresponding to a character display and a method corresponding to a user input and/or output. According to the database of the present invention, it is possible to create and edit the operation sequence with ease.

Other objects and further features of the present invention will be apparent from the following detailed description when read in conjunction with the accompanying drawings.

BRIEF DESCRIPTION OF THE DRAWINGS

FIG. 10 is a diagram showing contents of pause tables;

FIGS. 17A and 17B respectively are diagrams showing the data structures of the expression/action component images stored in a database;

FIG. 30 is a flow chart for explaining a process in a case where the second embodiment is applied to the operation guide sequence shown in FIG. 21;

FIG. 33 is a diagram showing a reproduction list;

FIGS. 36A, 36B, 36C and 36D respectively are diagrams showing an element group which facilitates the construction of the significance space;

FIG. 37 is a diagram showing a significance space which is formed by inserting each of the elements;

FIG. 43 is a flow chart for explaining a case where the third embodiment is applied to the operation guide sequence shown in FIG. 21;

FIG. 46 is a diagram showing a reproduction list;

DESCRIPTION OF THE PREFERRED EMBODIMENTS

Figure 1:
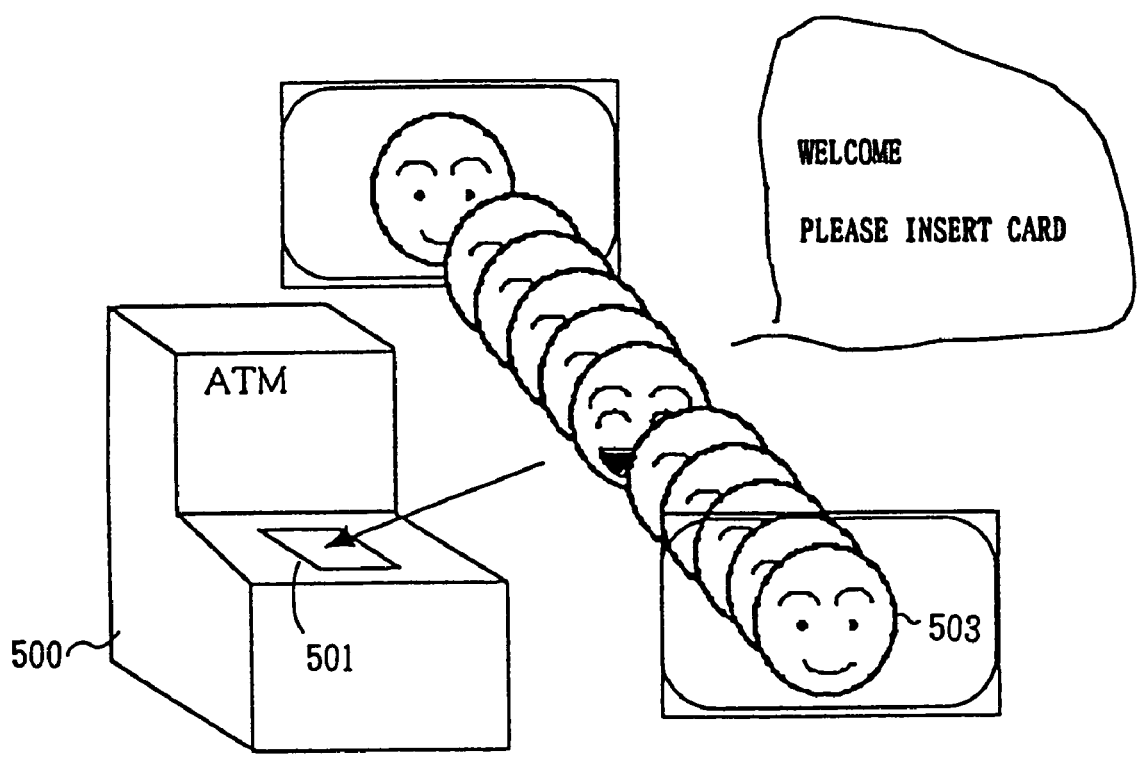
FIG. 1 is a diagram showing an example of a humanoid character image displayed on a display part of an ATM.
Figure 2:
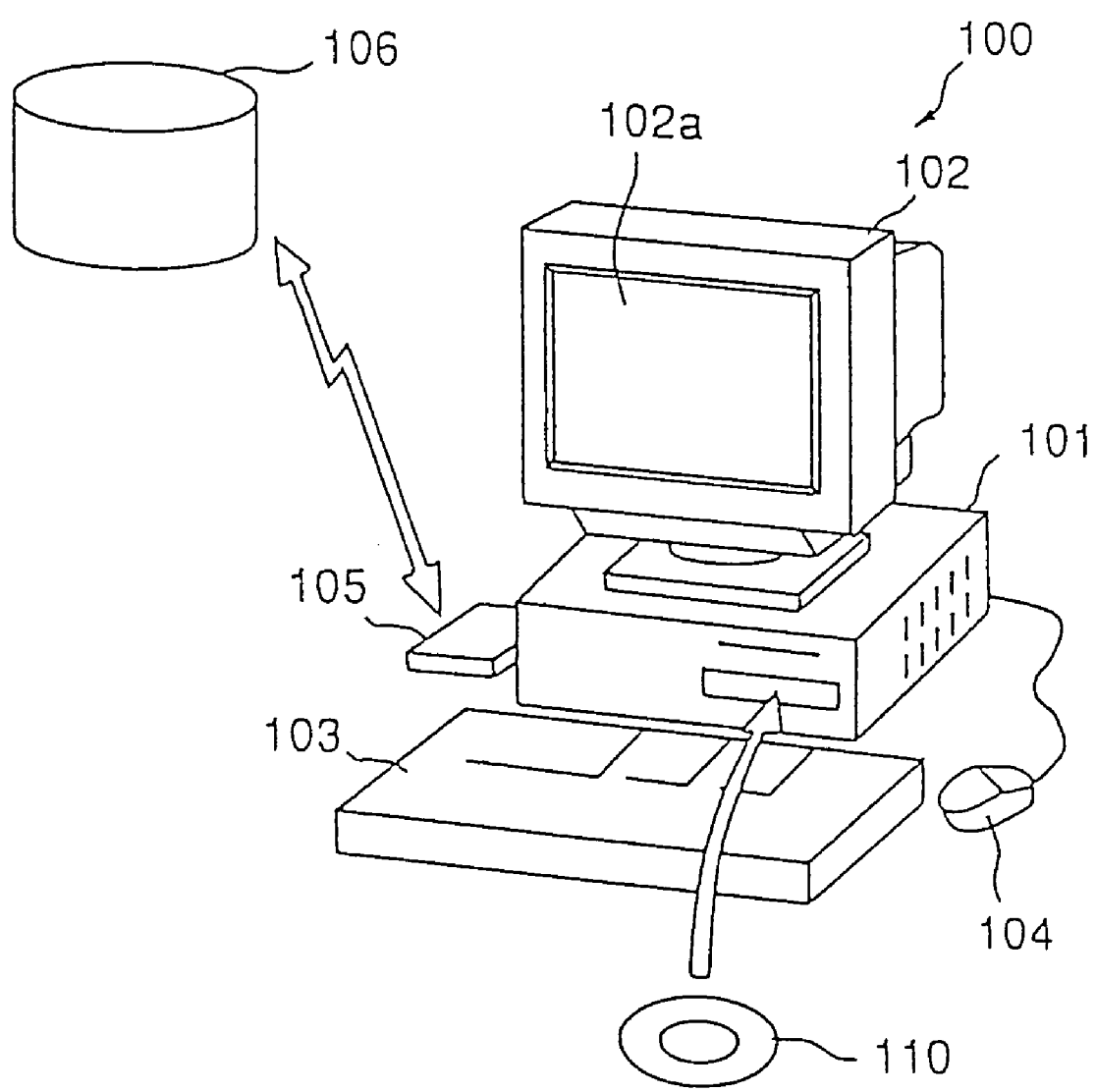
FIG. 2 is a perspective view showing a computer system for realizing an embodiment of an image generating apparatus according to the present invention.

FIG. 2 is a perspective view showing a computer system for realizing a first embodiment of an image generating apparatus according to the present invention. This first embodiment of the image generating apparatus generates humanoid character images based on a program stored in a first embodiment of a computer-readable storage medium according to the present invention.

A computer system 100 shown in FIG. 2 is made up of a general purpose computer system such as a personal computer. The computer system 100 is provided with a main body part 101 which includes a CPU, a disk drive and the like, a display 102 which displays an image on a display screen 102a in response to an instruction from the main body part 101, a keyboard 103 which is used to input various information to the computer system 100, a mouse 104 which is used to specify an arbitrary position on the display screen 102a of the display 102, and a modem 105 which is used to make access to an external database or the like and to download a program or the like stored in another computer system. Programs which are stored in a portable recording medium such as a disk 110 or, downloaded from a recording medium 106 of another computer system by use of a communication unit such as the modem 105, are input to and are compiled in the computer system 100. These programs include a program which causes the CPU of the computer system 100 to generate the humanoid character image.

The first embodiment of the storage medium is formed by a recording medium such as the disk 110 which stores the program described above. The recording medium is of course not limited to removable recording mediums such as IC card memories, floppy disks, magneto-optical disks, CD-ROMs and various kinds of semiconductor memory devices, and also includes recording mediums which are accessible by a computer system by connecting via a communication means such as a LAN or a communication unit such as a modem.

Figure 3:
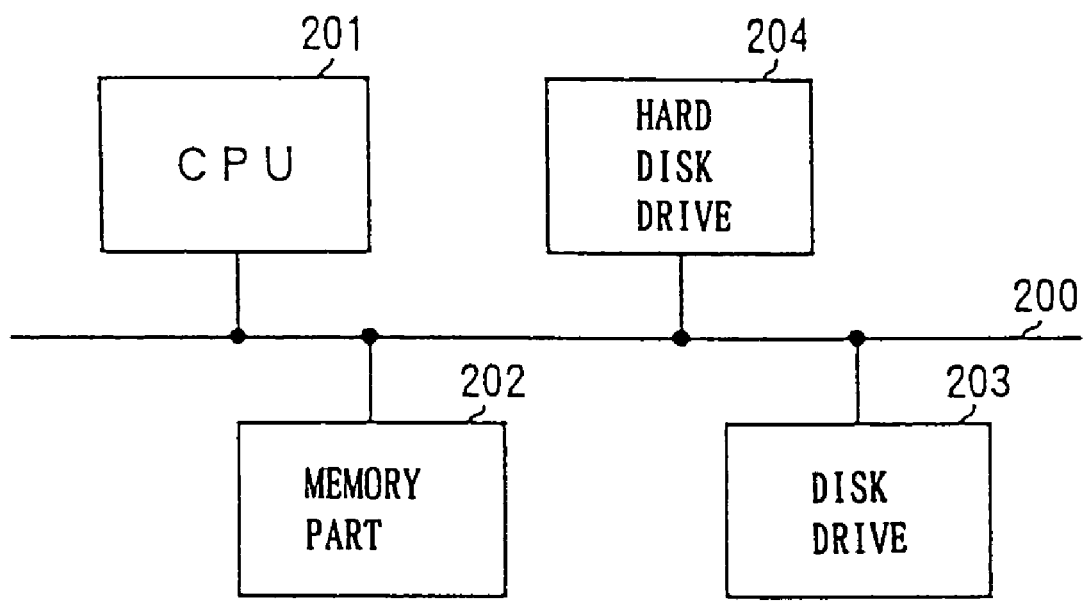
FIG. 3 is a system block diagram showing the construction of a main body part shown in FIG. 2.

FIG. 3 is a system block diagram showing the construction of an important part within the main body part 101 of the computer system. In FIG. 3, the main body part 101 generally includes a CPU 201, a memory part 202 which includes a RAM, a ROM or the like, a disk drive 203 for the disk 110, and a hard disk drive 204 which are coupled via a bus 200.

Of course, the construction of the computer system 100 is not limited to that shown in FIGS. 2 and 3, and various kinds of known constructions may be used instead.

Figure 4:
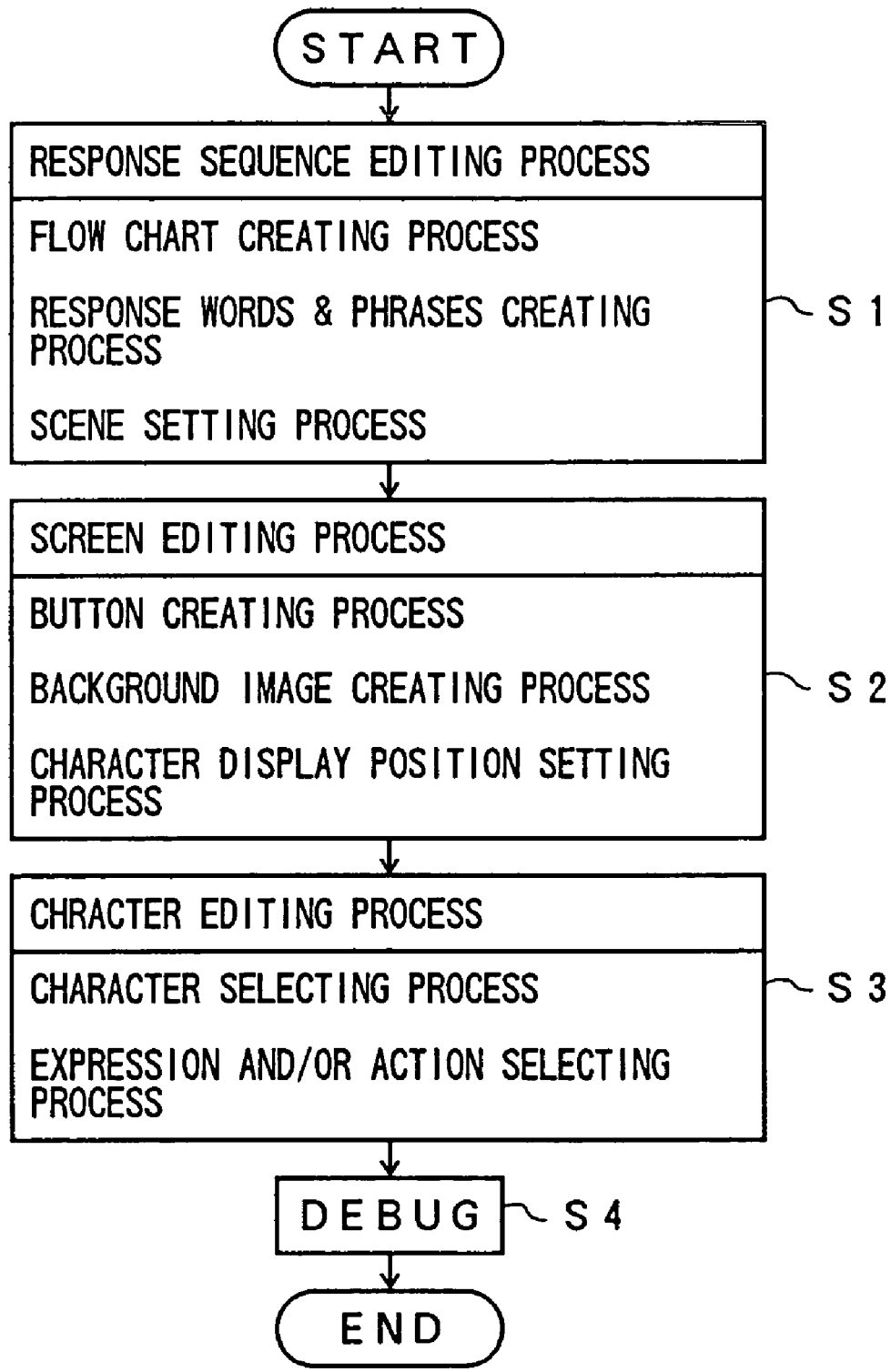
FIG. 4 is a flow chart for explaining the general operation of the embodiment of the image generating apparatus.

FIG. 4 is a flow chart for explaining the general operation of the first embodiment of the image generating apparatus. In this embodiment, the present invention is applied to the creation of an ATM response sequence which forms a user interface. For example, the ATM response sequence is a logical sequence which is followed when a user makes a withdrawal or a deposit, and the image generating apparatus generates the humanoid character images so that the actions, expressions and the like of the humanoid character images correspond to this logical sequence. The process shown in FIG. 4 corresponds to the operation of the CPU 201 shown in FIG. 3.

In FIG. 4, a step S1 carries out a response sequence editing process based on an operation made by an operator, that is, a programmer. The response sequence editing process includes a flow chart creating process, a response words and phrases creating process, and a scene setting process. The flow chart creating process creates a flow chart related to the entire motion of the humanoid character image. The response words and phrases creating process creates words and phrases such as "PLEASE INSERT CARD" AND "PLEASE SELECT TRANSACTION" which are to be output in correspondence with the entire motion of the humanoid character image. The scene setting process sets a scene, such as a scene which is to be displayed, a deposit scene, and a transfer scene.

A step S2 carries out a screen editing process based on an operation made by the programmer. The screen editing process includes a button creating process, a background image creating process, and a character display position setting process. The button creating process creates buttons which are used to specify operation items which are to be displayed. The background image creating process creates a background image which is to be displayed. The character display position setting process sets a display position of a humanoid character which is to be displayed.

A step S3 carries out a character editing process based on an operation made by the programmer. The character editing process includes a character selecting process and an expression and/or action (expression/action) selecting process. The character selecting process selects a humanoid character which is to be displayed. The expression/action selecting process selects the expression and/or action of the selected humanoid character, for each scene. In each scene, the humanoid character makes a series of actions by a sequential image, and thus, a series of action images is selected by the expression/action selecting process. As will be described later, the actions and expressions of the humanoid character are formed by and managed in units of one communication information, that is, a unit image group, which indicates a meaning that is to be conveyed to a person who sees the displayed humanoid character. Each unit image group forms one sequential moving image unit which is made up of a plurality of still images.

A step S4 carries out a debugging process based on an operation made by the programmer. More particularly, the series of action images of the humanoid character which is selected as described above, that is, the unit image groups, are connected to reproduce and display a sequential humanoid character image. Further, unnatural movements in the image at a connecting part of two successive unit image groups, the matching of the image and the voice, and the like are modified if necessary. With respect to each unit image group, it is guaranteed in advance that the communication information which is indicated by the unit image group is correctly conveyed to the user who sees the unit image group. Hence, in the debugging process of the step S4, it is unnecessary to judge whether or not the communication information which is indicated by the unit image group is actually and correctly conveyed to the user who sees the unit image group. After the debugging process of the step S4, the process of generating the humanoid character image ends.

Next, a description will be given of the differences between the debugging process carried out in the present invention and a conventional debugging process.

Conventionally, the action images are not formed as components. Hence, in the process of editing the images, each of the individual images are read or created, and the individual images are connected. Each of the individual images does not represent a series of actions, and only represents a portion of the action. For this reason, it is impossible to guarantee that an action will be represented correctly, even if each of the individual images are connected. Accordingly, the conventional debugging process confirms whether or not a specific action is visible to the viewer when each of the individual images are connected.

On the other hand, in the present invention, the series of actions is formed as a component, and such components are stored. Hence, when creating or editing the action image, the stored component images are read and connected. Since the series of actions is formed in advance as the component image, it is unnecessary to confirm whether or not the action indicated by the component image appears unnatural. In other words, unlike the conventional debugging process, the debugging process of the present invention does not require confirmation of whether or not a specific action is visible to the viewer who sees the series of actions indicated by the component image. However, when creating the action image, it is still necessary to confirm whether or not a connecting part of two successive component images appears natural, and the debugging process of the present invention makes such a confirmation to determine whether or not the connecting part between the component images appears natural to the viewer.

Figure 5:
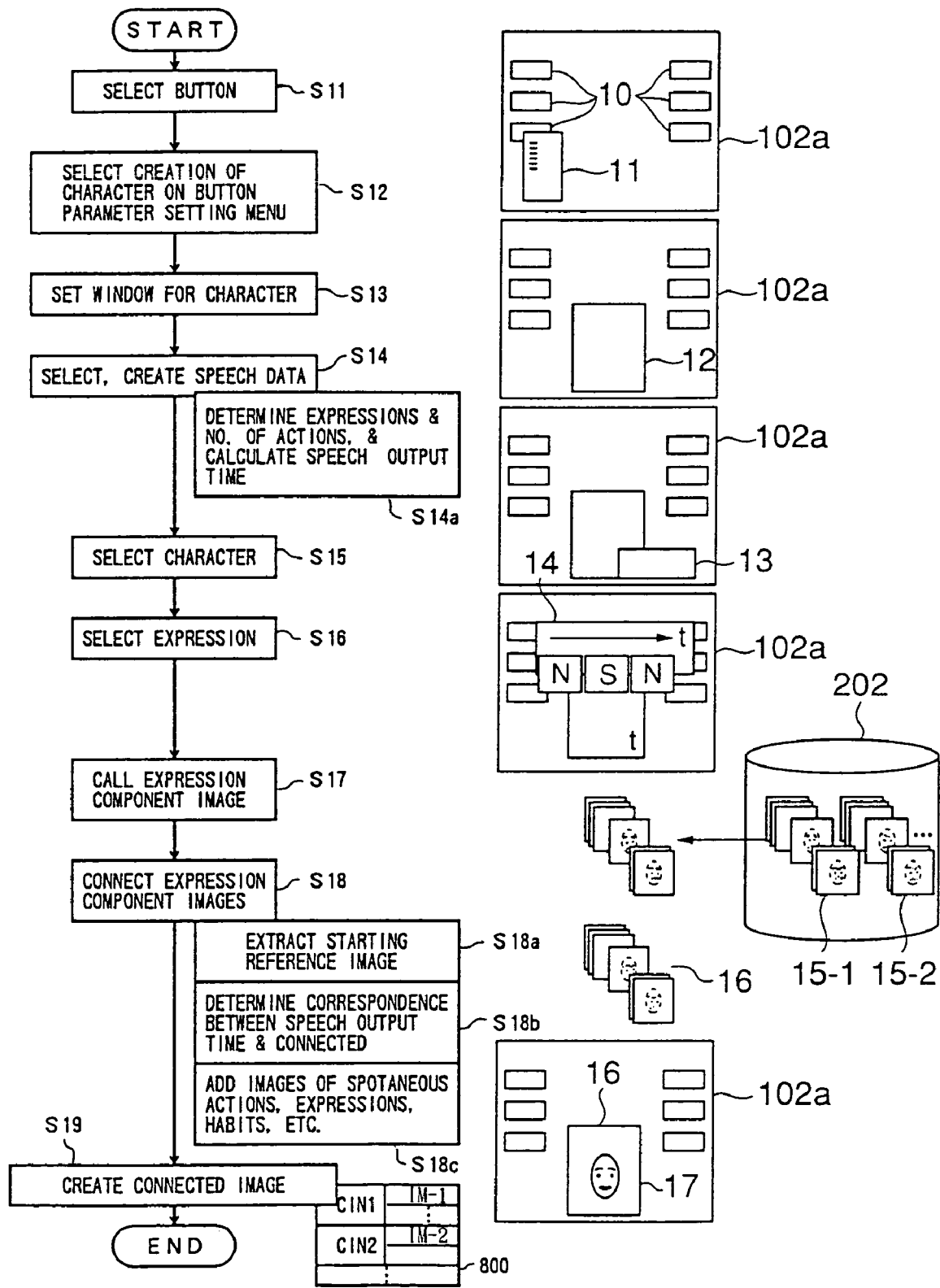
FIG. 5 is a diagram for explaining a character editing process.

FIG. 5 is a diagram for explaining the character editing process of the step S3 shown in FIG. 4. In FIG. 5, the left part shows a flow chart for explaining the character editing process, and the right part shows stages for explaining each stage of the character editing process.

In FIG. 5, when the character editing process is started, a step S11 selects one of a plurality of buttons 10 on the display screen 102a, so as to select an operation item specifying button. The operation item specifying button is used to specify an operation item, and the operation related to the operation item is explained by use of a humanoid character (hereinafter simply referred to as a character) when the operation item specifying button which specifies this operation item is selected. A step S12 selects creation of the character on a button parameter setting menu which is displayed in a region 11 on the display screen 102a. A step S13 sets a window 12 in a part where the character is to be displayed on the display screen 102a. A step S14 selects, in a region 13 on the display screen 102a, an audio data related to a speech which is to be made by the character or, creates speech data by a text editing. In addition, as indicated by S14a, the step S14 includes the process of determining the expressions and the number of actions to be used, and calculating the speech output time, based on the selected audio data or the audio data which is obtained by converting the created speech data.

A step S15 selects the character which is to be used, by inputting a code number of the character from the keyboard 103 or, selecting a character selecting button on the display screen 102a, for example. A step S16 selects an expression which is to be used, by inputting a code number of the expression from the keyboard 103 or, selecting an expression selecting button on the display screen 102a, for example. If N denotes "expressionless", S denotes "smile" and t denotes "time", the step S16 selects component images corresponding to the expression which changes in a sequence of "expressionless"→"smile"→"expressionless" with the lapse of time, as indicated by a reference numeral 14 on the right side of the step S16 in FIG. 5, for example. A step S17 calls expression component images 15-1, 15-2, . . . corresponding to the selected expression, from the memory part 202, for example.

Of course, the step S15 may select an action which is to be used in place of the expression or, select the expression and the action which are to be used. But in this embodiment, it is assumed for the sake of convenience that the expression which is to be used is selected.

A step S18 connects the called expression component images 15-1, 15-2, . . . and generates a connected image which indicates a series of expressions. The expression component images 15-1, 15-2, . . . respectively are unit image groups described above which are connected in this sequence, and it is guaranteed in advance that the communication information which is to be indicated by each expression component image will be conveyed to the viewer of the expression component image. In this case, the communication information which is to be indicated by the expression component image is an impression of an expression to the viewer. Therefore, since it is guaranteed in advance that the communication information which is to be indicated by each expression component image will be conveyed to the viewer of the expression component image, in the connected image 16 which is obtained by connecting the plurality of expression component images 15-1, 15-2, . . . and indicates the series of expression, it is guaranteed that the communication information is correctly conveyed to the viewer by each of the expression component images 15-1, 15-2, . . . . The debugging process of the present invention is required with respect to the connecting parts of the expression component images 15-1, 15-2.

More particularly, the step S18 includes a process S18a, a process S18b and a process S18c. The process S18a extracts a starting reference image of one expression component image and an ending reference image of another expression component image, between two component images which are to be mutually connected, from among the expression component images 15-1, 15-2, . . . which are to be connected. In addition, the process S18a selects the expression component image having the starting reference image and the expression component image having the ending reference image which approximately matches the starting reference image and are connectable, based on a predetermined standard. The process S18b determines the correspondence between the speech output time and the connected image 16 which indicates the series of expressions. The process S18c adds images related to spontaneous actions, expressions, habits and the like, if necessary, when the number of expressions is small with respect to the speech output time, for example. As the predetermined standard, it is possible to use, for example, a tolerable range of a positional error of the characters between the starting reference image of one expression component image and the ending reference image of another expression component image which are connected.

The connected image 16 which is obtained in the above described manner is stored in a sequential image table 800 within the memory part 202, for example. The sequential image table 800 is made up of a list of image numbers of each of the expression component images forming the connected image 16. In the particular case shown in FIG. 5, the sequential image table 800 is made up of connected image numbers CIN1, CIN2, . . . which specify the connected images 16, image numbers IM1-1, . . . which specify the component images forming the connected image 16 having the connected image number CIN1, image numbers IM2-1, . . . which specify the component images forming the connected image 16 having the connected image number CIN2, and the like. A key which specifies the expression may further be added with respect to each of the connected image numbers CIN1, CIN2, . . . . In addition, the connected image 16 may be stored in the sequential image table 800 after being converted into a format of a sequential animation.

A step S19 creates connected image data by reproducing the connected image 16 according to the list within the sequential image table 800 for a specified reproducing time or, by reproducing the connected image 16 with the format of the sequential animation in a case where the connected image 16 is stored in the sequential image table 800 after being converted into the format of the sequential animation format, and displaying the reproduced connected image in a region 17 of the display screen 102a. The process ends after the step S19. Of course, the specified reproducing time may be variably set.

Figure 6:
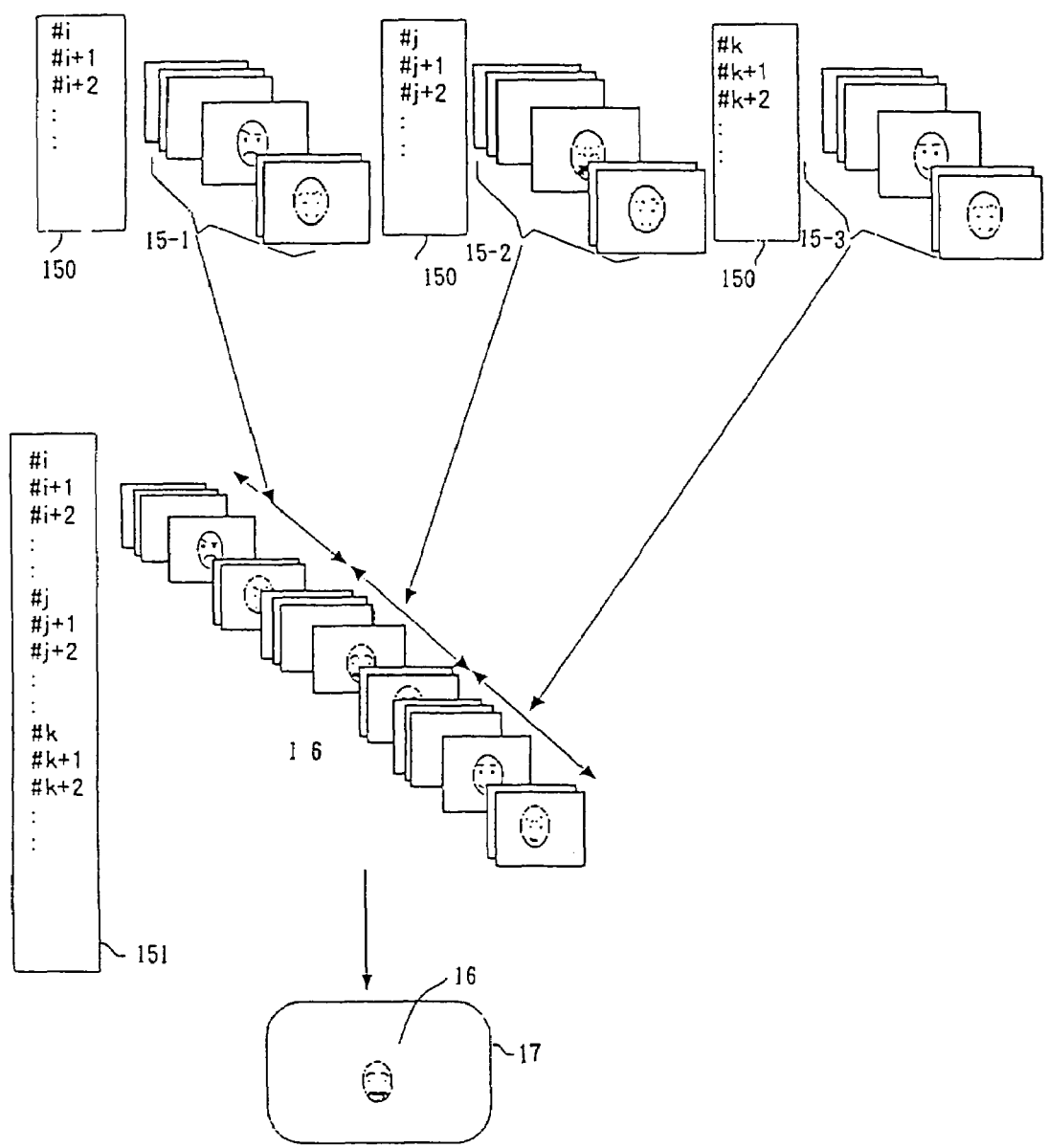
FIG. 6 is a diagram for explaining the connection of expression component images.

FIG. 6 is a diagram for explaining the connection of the expression component images. For the sake of convenience, it is assumed that an expression component image 15-1 related to a dubious face, an expression component image 15-2 related to a smiling face, and an expression component image 15-3 related to a serious face are stored within a database which is formed by the memory part 202. More particularly, in a reproducing image table 150 within the database, a list of reproducing images #i, #i+1, #i+2, . . . forming the expression component image 15-1 related to the dubious face, a list of reproducing images #j, #j+1, #j+2, . . . forming the expression component image 15-2 related to the smiling face, and a list of reproducing images #k, #k+1, #k+2, . . . forming the expression component image 15-3 related to the serious face, are stored with a format similar to that of the sequential image table 800 described above, for example.

When the expression component images 15-1 through 15-3 are called in the step S17, the step S18 connects the lists of the reproducing images #i, #i+1, #i+2, . . . , #j, #j+1, #j+2, . . . , #k, #k+1, #k+2, . . . of the expression component images 15-1, 15-2 and 15-3 which are read from the reproducing image table 150, and stores the connected lists in a sequential image table 151. Hence, the sequential image can be reproduced based on the connected lists stored in the sequential image table 151, and it is possible to reproduce the connected image 16 and display the connected image 16 in the region 17 on the display screen 102a.

Figure 7:
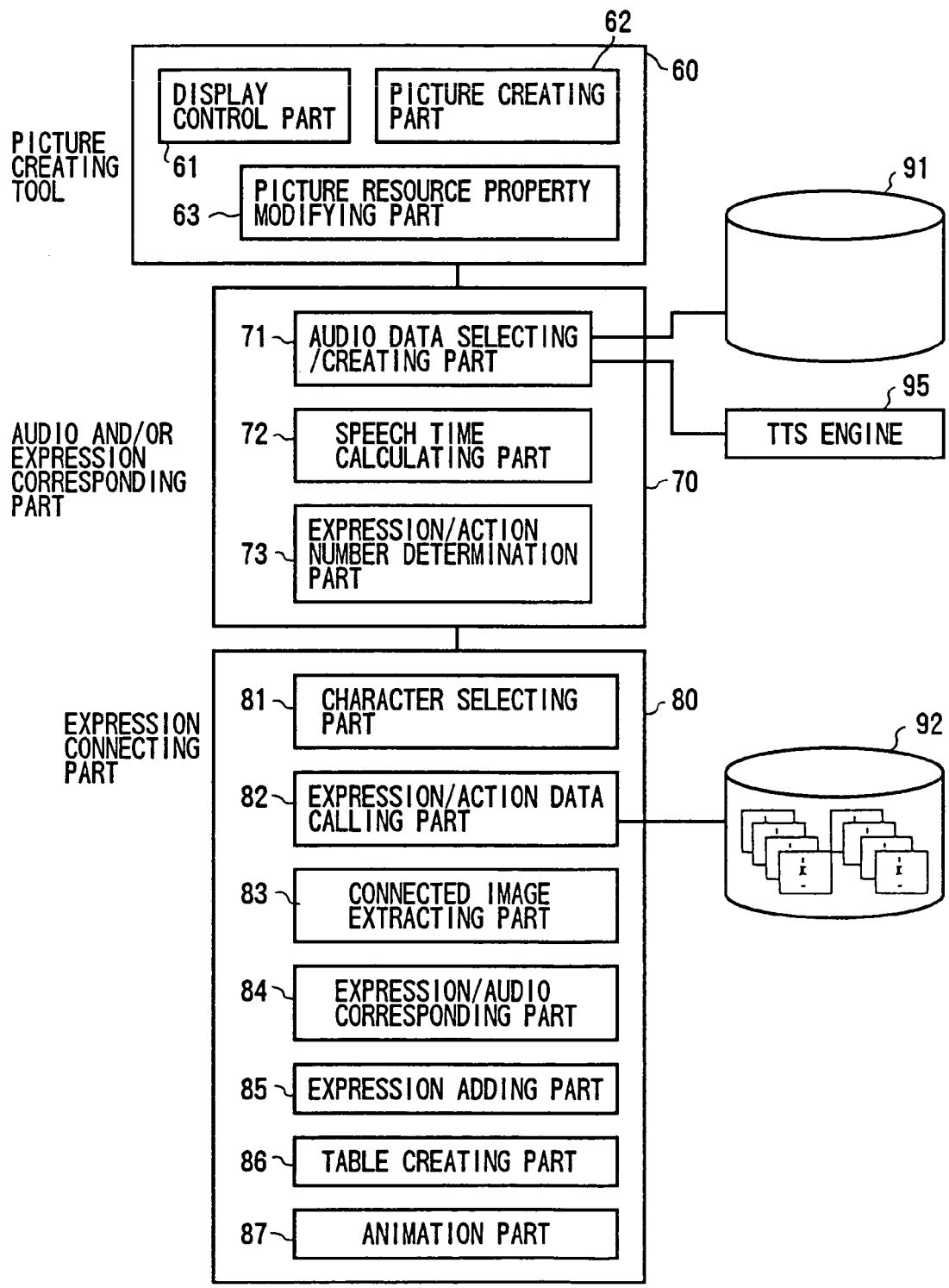
FIG. 7 is a functional block diagram showing an important part of the embodiment of the image generating apparatus.

FIG. 7 is a functional block diagram showing an important part of the first embodiment of the image generating apparatus. In FIG. 7, a picture creating tool 60 has a known construction including a display control part 61, a picture creating part 62, and a picture resource property modifying part 63. The display control part 61 controls the picture which is displayed on the display screen 102a. The picture creating part 62 creates the picture which is displayed on the display screen 102a. The picture resource property modifying part 63 modifies a property of a picture resource. The picture creating tool 60 is installed in a hard disk within the hard disk drive 204, for example.

An audio and/or expression (audio/expression) corresponding part 70 and an expression connecting part 80 are formed by the CPU 201. More particularly, the CPU 201 realizes functions of the audio/expression corresponding part 70 and the expression connecting part 80 by executing a program stored in the disk 110 or the like.

The audio/expression corresponding part 70 includes an audio data selecting and/or creating (selecting/creating) part 71, a speech time calculating part 72, and an expression and/or action (expression/action) number determination part 73. The audio data selecting/creating part 71 carries out the process of the step S14 described above, and reads the audio data related to the words to be sounded by the character from an audio database 91 and selects the audio data. Alternatively, the audio data selecting/creating part 71 creates the speech data by a text editing using a known Text To Speech (TTS) engine 95. For example, the audio database 91 is stored within the memory part 202, and the TTS engine 95 is installed in a hard disk within the hard disk drive 204. The speech time calculating part 72 and the expression/action number determination part 73 carry out the process of the step S14a described above. In other words, the speech time calculating part 72 calculates the speech time based on the selected audio data or the audio data which is obtained by converting the created speech data. In addition, the expression/action number determination part 73 determines the number of expressions and the number of actions to be used.

The expression connecting part 80 includes a character selecting part 81, an expression and/or action (expression/action) data calling part 82, a connected image extracting part 83, an expression and/or audio (expression/audio) corresponding part 84, an expression adding part 85, a table creating part 86, and an animation part 87. The character selecting part 81 carries out the process of the step S15 described above and selects a character. The expression/action data calling part 82 carries out the process of the step S17 depending on the expression and action selected by the step S16, and retrieves a corresponding expression and/or action (expression/action) component image by calling the expression/action component images from an expression and/or action (expression/action) database 92. For example, the expression/action database 92 is stored within the memory part 202.

The connected image extracting part 83 carries out the process S18a of the step S18 described above. More particularly, the connected image extracting part 83 extracts the starting reference image of one expression/action component image and the ending reference image of another expression/action component image which are to mutually be connected, from among the expression/action component images which are to be connected. In addition, the connected image extracting part 83 obtains the connected image by selecting and connecting the expression component image having the starting reference image and the expression component image having the ending reference image which approximately matches the starting reference image, based on the predetermined standard. The expression/audio corresponding part 84 carries out the process S18b of the step S18 described above. More particularly, the expression/audio corresponding part 84 determines the correspondence between the speech output time and the connected image which indicates the series of expressions. The expression adding part 85 carries out the process S18c of the step S18 described above. More particularly, the expression adding part 85 adds images related to spontaneous actions, expressions, habits and the like, by further reading and connecting the expression/action component images corresponding to the images of the spontaneous actions, expression, habits and the like, if necessary, when the number of expressions is small with respect to the speech output time, for example.

The table creating part 86 and the animation part 87 carry out the process of the step S19 described above. The table creating part 86 creates the sequential image table which is made up of the lists of the expression/action component images which form the connected image. In addition, the table creating part 86 reproduces the connected image according to the lists in the sequential image table for the specified reproducing time or, the animation part 87 reproduces the connected image with the format of the sequential animation, and the reproduced connected image is displayed on the display screen 102a so as to create the connected image data.

When reproducing the connected image with the format of the sequential animation and displaying the connected image on the display screen 102a, it is easy to convey the communication information of the connected image to the viewer of the connected image. This is because, in a case where the character in the connected image points to a button on the display screen 102a by a finger of the character so as to draw the viewer's attention to this button, for example, it is possible to display the finger tip of the character on an enlarged scale in a simple manner if the connected image is reproduced with the format of the sequential animation.

Figure 8:
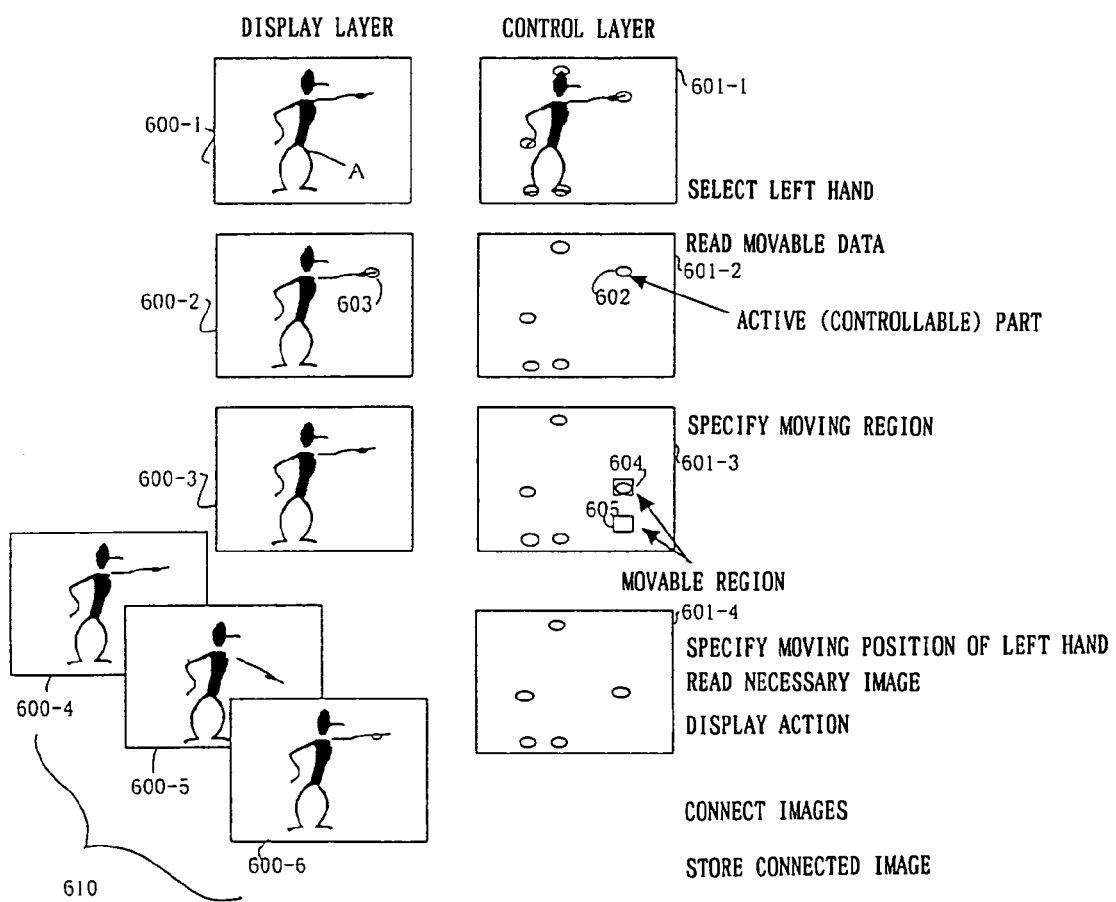
FIG. 8 is a diagram for explaining a process of creating connected images in which a body shape of a character displayed on a screen changes.

Next, a description will be given of a process of creating a connected image in which a body shape of a character displayed on the display screen 102*a* changes, by referring to FIG. 8. The left part of FIG. 8 shows display layers for displaying the character in real-time, and the right part of FIG. 8 shows control layers for controlling the character when the user points by use of the mouse 104 or the like. For the sake of convenience, it is assumed that the attention of the viewer (user) is drawn to a predetermined position on the display screen 102*a* by moving the left hand of a character A downwards from an original position and then returning the left hand to the original position. In display layers 600-1 through 600-3 which will be described later, the image is still while the control is being carried out, and the sequential display (debugging) is carried out as shown by display layers 600-4 through 600-6 after the necessary image is read in a control layer 601-4.

First, the display layer 600-1 of the character A and a control layer 601-1 which includes a control point of the character A indicated by an oval mark are superimposed so that the control point is superimposed on a joint part of the character A. In this case, the control point refers to a moving part of the character A, such as the hand and the foot. Next, a target moving part of the character A, that is, a control point 603 corresponding to the left hand in this particular case, is confirmed in the display layer 600-2. Thereafter, a movable range is calculated when a control point 602 corresponding to the control point 603 is pointed by the mouse 104 and selected in a control layer 601-2. The movable range is calculated from an image attribute (coordinates of the body part) of the selected control point 602, by reading the sequentially movable region (coordinates) from the database within the memory part 202. Hence, the control point 603 disappears in the display layer 600-3, and movable regions 604 and 605 obtained by the calculation are displayed in a control layer 601-3.

As a result, out of the expression/action component images related to the character A, the expression/action component images in which the left hand of the character A moves are read from the memory part 202, and the expression/action component images which smoothly connect the movable regions 604 and 605 are extracted. Accordingly, the expression/action component images made up of the images typified by the display layers 600-4, 600-5 and 600-6, for example, are connected, so that a connected image 610 is obtained. This connected image 601 is stored in the memory part 202.

Because the control point 602 is selected in this case, the actions in which the left hand of the character A moves are retrieved from the database, and a plurality of maximum moving positions are extracted from the attribute. The plurality of extracted moving position coordinates are displayed in the control layer 601-3 as the movable regions 604 and 605. The viewer (user) specifies the moving region, that is, specifies the moving position of the left hand of the character A, in the control layer 601-3, by pointing a desired one of the movable regions 604 and 605 by the mouse 104. By specifying the desired one of the movable regions 604 and 605, it is possible to read from the memory part 202 and display the necessary images having in the attribute the maximum moving position to be displayed. As may be seen from FIG. 13 which will be described later, the necessary images can be read by calling the images by use of expression/action identification names (titles) of the image data, for example, and a reproducing list may be created from the titles. Hence, in a case where a button need to be displayed on the display screen 102*a*, for example, it is possible to easily make an adjustment to match the position of this button to the left hand position of the character A.

Figure 9:
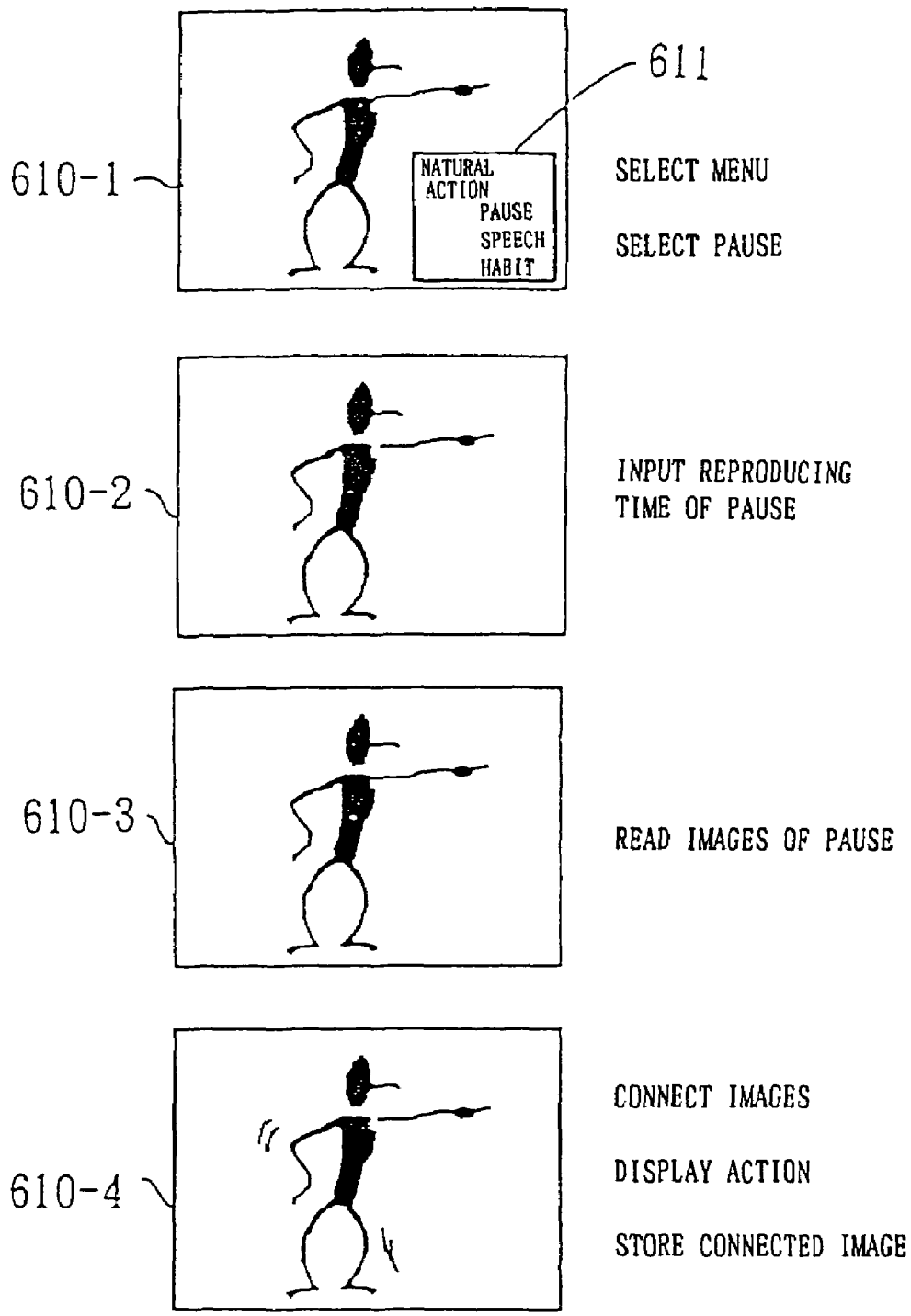
FIG. 9 is a diagram for explaining the specifying of a spontaneous action.

FIG. 9 is a diagram for explaining the specifying of a spontaneous action when carrying out the process S18*c* of the step S18. In a case where it is unnecessary to make the character perform a specific action and an action may be freely continued for a predetermined time, a "pause" is set.

Figure 11A:
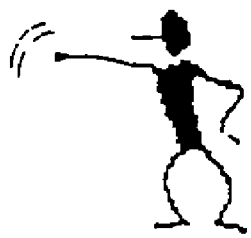
FIGS. 11A, 11B and 11C respectively are diagrams showing characters corresponding to "waving right hand", "waving both hands" and "waving left hand" in the pause tables shown in FIG. 10.
Figure 11B:
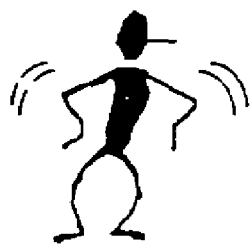
Figure 11C:
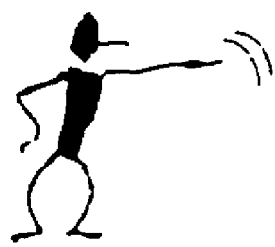

The spontaneous action refers to the expression, action and the like which are other than the expressions, actions and the like in the series of images which are connected by an instruction from the user. When the "pause" is specified, for example, a plurality of action images are read at random and displayed or, a plurality of image identification tables which form the "pause" are read at random and component images written in the image identification tables are displayed. FIG. 10 is a diagram showing contents of pause tables "pause 1" and "pause 2" which are examples of the "pause". In addition, FIGS. 11A, 11B and 11C respectively are diagrams showing characters corresponding to "waving right hand", "waving both hands" and "waving left hand" in the pause tables shown in FIG. 10.

In the case shown in FIG. 9, an image 610-1 including a character is displayed on the display screen 102*a*, and a pull-up menu 611 for the spontaneous action is displayed in a superimposed manner on the image 610-1. When a "pause" button is selected from the pull-up menu 611 by use of the mouse 104 or the like, an image 610-2 is displayed, and a reproducing time of the "pause" is input thereafter. The reproducing time of the "pause", that is, the reproducing time of the "pause" of the character, may be input from the keyboard 103 or the like or, input by making a selection from another editor software. Accordingly, while an image 610-3 is being displayed, the images of the "pause" are read from the memory part 202 for the reproducing time which is input. The read images amounting to the reproducing time are connected and stored in the memory part 202 as a connected image, and this connected image is displayed as an image 610-4. Of course, it is possible to create a reproducing list depending on the reproducing time of the "pause" which is input, and to successively display the images based on the reproducing list.

Figure 12:
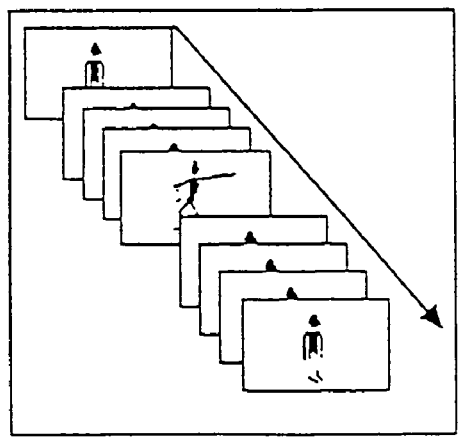
FIG. 12 is a diagram showing the data structure of an expression/action component image data.

The pull-up menu 611 of the spontaneous action can be created by making a reference to determine whether or not the attribute of the expression/action component image data shown in FIG. 12, for example, indicates the spontaneous action. First, the title of the data categorized as the spontaneous action is extracted, and is displayed within the pull-up menu 611. Then, the title "pause" is selected from the pull-up menu 611. By this selection, one or a plurality of data having the title "pause" are read from the database. Further, an arbitrary one of the read data having the title "pause" is obtained, and the reproducing time of the "pause" is extracted from this arbitrary one of the read data.

Figure 13:
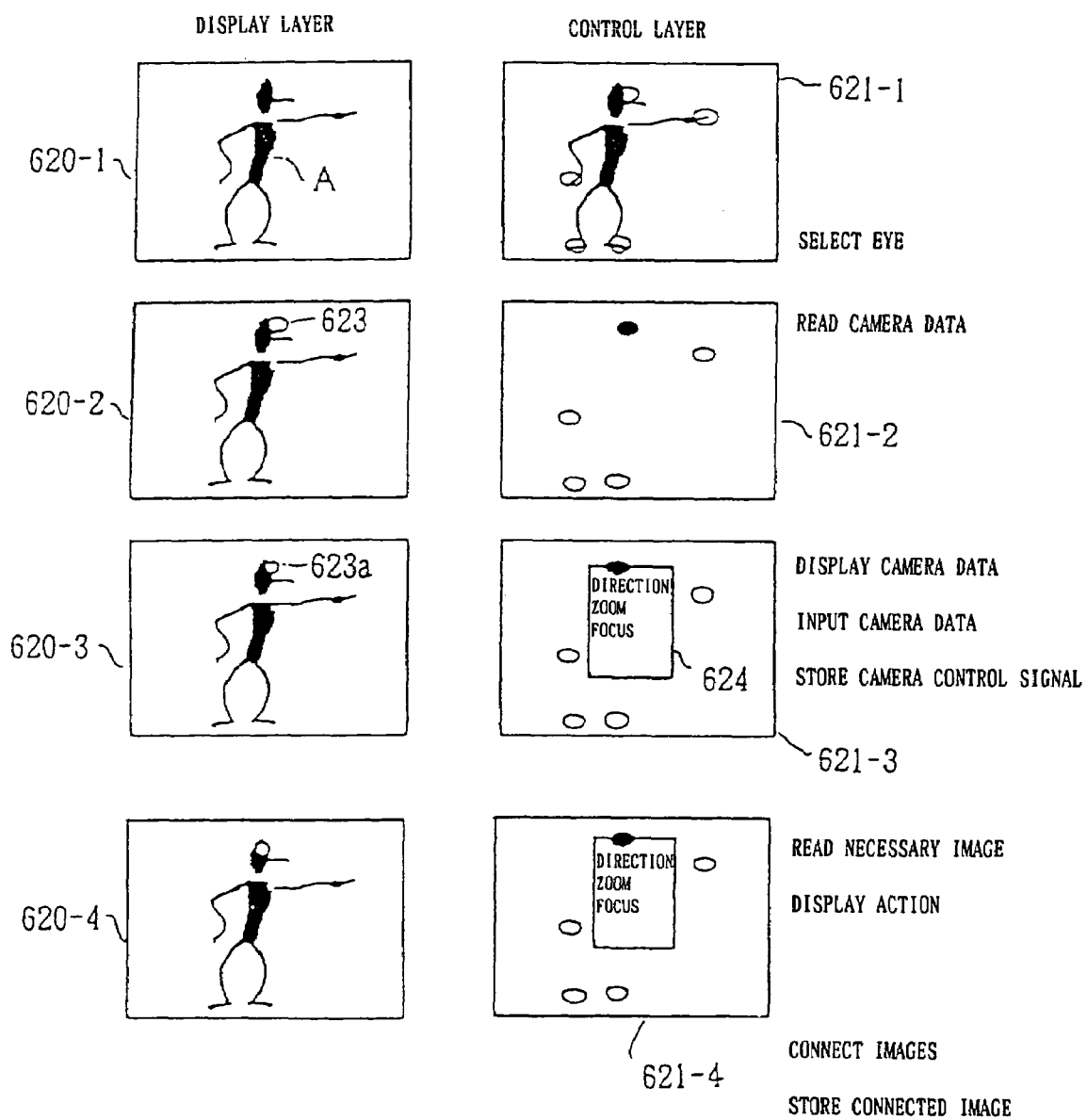
FIG. 13 is a diagram for explaining a process of controlling the body shape of the character and a device which are displayed on the screen.
Figure 14:
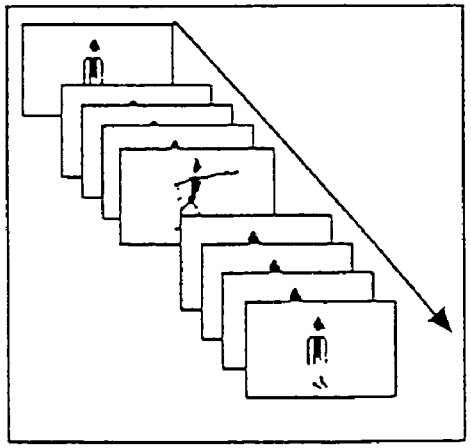
FIG. 14 is a diagram showing the data structure of the expression/action component image data.

Next, a description will be given of a process of controlling the body shape of the character and a device which are displayed on the display screen 102*a*, by referring to FIG. 13. Similarly as in the case shown in FIG. 8, the left part of FIG. 13 shows the display layers for displaying the character, and the right part of FIG. 13 shows the control layers for controlling the character. For the sake of convenience, it is assumed that a camera is operated with a feeling as if the character A is handling the camera as an example of the device. FIG. 14 is a diagram showing a data structure of the expression/action component image data used in this case.

First, a display layer 620-1 of the character A and a control layer 621-1 which includes a control point of the character A indicated by an oval mark are superimposed so that the control point is superimposed on a joint part of the character A. Then, a control point 623 corresponding to an eye of the character A is confirmed in a display layer 620-2, and a control point corresponding to the control point 623 is specified by the mouse 104 in a control layer 621-2. When the control point is specified in the control layer 621-2, a corresponding command input picture data for controlling the camera is read from the memory part 202. Hence, an eye 623a corresponding to the control point 623 is displayed in a display layer 620-3, and a command input picture 624 including camera data is displayed in a control layer 621-3. When a camera data related to "zoom" or the like is input by the mouse 104 in the command input picture 624, a corresponding camera control signal is stored in the memory part 202.

As a result, necessary expression/action component images are read from the memory part 202 based on the input camera data and are connected, and a connected image is obtained thereby. This connected image is stored in the memory part 202. Accordingly, the camera is operated with a feeling as if the character A itself is handling the camera, and it is possible to read from the memory part 202 and display the images depending on the movement of the eye 623a of the character A.

Figure 15:
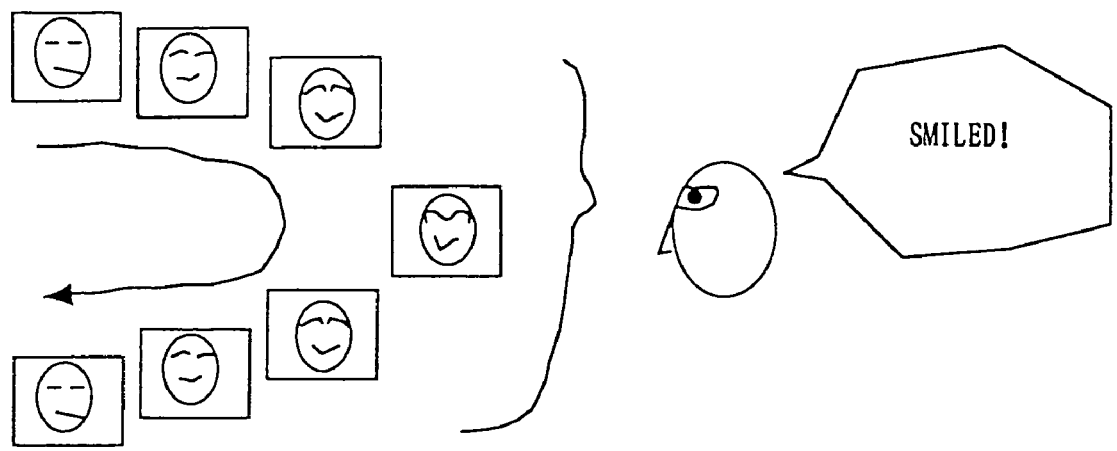
FIG. 15 is a diagram for explaining the concept of the expression/action component image.

FIG. 15 is a diagram for explaining the concept of the expression/action component image, that is, the unit image group. In addition, FIGS. 16A and 16B respectively are diagrams for explaining embodiments of the expression/action component image.

The expression/action component image is a unit which is guaranteed to indicate one communication information to the viewer. In other words, the expression/action component image is a unit image group which represents a series of actions, and is made up of a plurality of images including a starting image and an ending image of expressions, actions and the like of a humanoid character. Even if a programmer generates a humanoid character image which is made up of a plurality of images as shown in FIG. 15, for example, and indicates a smile, it is essential that the viewer who actually sees this humanoid character image will understand that the humanoid character is smiling. Hence, this embodiment generates a humanoid character image which is made up of a plurality of images and indicates one communication information such as a smile. Furthermore, a judgement is made in advance to determine whether or not a viewer who actually sees this humanoid character image will take in the communication information originally intended by the humanoid character image, and the humanoid character image is modified if necessary to guarantee that the originally intended communication information will be conveyed to the viewer. The humanoid character image which is guaranteed to convey one intended communication information to the viewer is prestored in the database of the memory part 202 or the like as the expression/action component image. Each expression/action component image is guaranteed to convey the intended communication information to the viewer, and for this reason, the connected image which is generated by connecting the expression/action component images is also guaranteed to convey the intended communication information to the viewer.

Figure 16A:
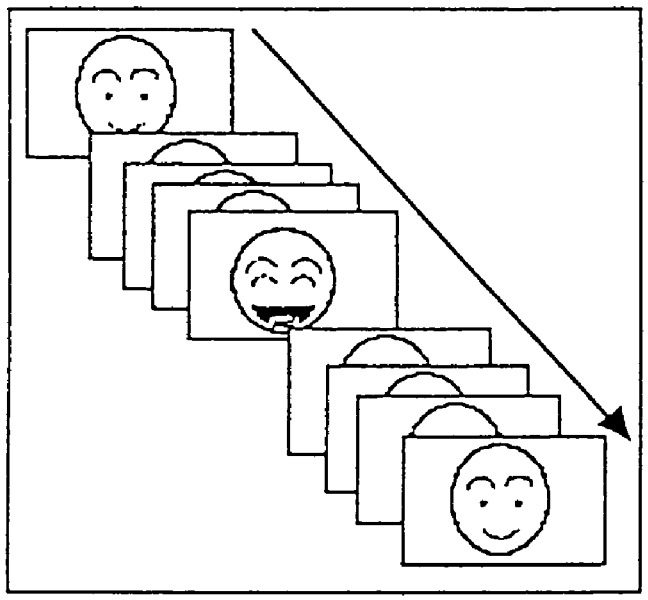
FIGS. 16A and 16B respectively are diagrams for explaining embodiments of the expression/action component-image.
Figure 16B:
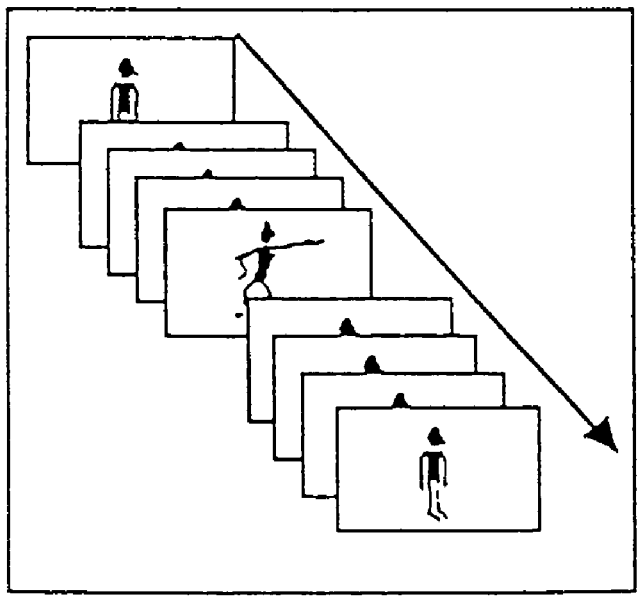

FIG. 16A shows an embodiment of the expression/action component image which indicates a "smile" of the character as the communication information. It is guaranteed that the "smile" is conveyed to the viewer who sees this expression/action component image. On the other hand, FIG. 16B shows an embodiment of the expression/action component image which indicates "drawing attention to the right side of the picture" by the character finger-pointing to the right of the picture, as the communication information. It is guaranteed that the "drawing attention to the right side of the picture" is conveyed to the viewer who sees this expression/action component image.

FIGS. 17A and 17B respectively are diagrams for explaining the data structures of the expression/action component images stored in the database in the memory part 202 or the like, when the data are used in the case shown in FIG. 8 described above, for example. FIG. 17A shows the data structure of the expression/action component image shown in FIG. 16A, and FIG. 17B shows the data structure of the expression/action component image shown in FIG. 16B.

Attribute values such as an expression/action identification name (title), an image reproducing time, a number of reproducing images, an image reproducing rate, transition point coordinates #1 and #N corresponding to the starting and ending reference images which are used to connect the images, an image attribute, feature point coordinates, a feature point identification name, and a character identification name are registered with respect to the expression/action component image shown in FIG. 17A. In this case, the image attribute indicates information such as the existence or non-existence of speech by the character, and the existence or non-existence of blink by the character. Further, the feature point indicates the eyes, nose, mouth and the like of the character.

On the other hand, attribute values such as an expression/action identification name (title), an image reproducing time, a number of reproducing images, an image reproducing rate, a transition point coordinate #1 corresponding to the starting reference image which is used when connecting the images, an instructing position coordinate of the image, an image attribute, coordinates of joints and body parts of the character, a joint identification name, and a character identification name are registered with respect to the expression/action component image shown in FIG. 17B. In this case, instructing position coordinate of the image indicates the coordinate of the position where the character makes an instruction. In addition, the image attribute indicates information such as the existence or non-existence of walking by the character, and the existence or non-existence of a habit of the character.

In FIGS. 17A and 17B, it is assumed that the title is made up of an expression/action name and a number, and is uniquely determined. Each data is stored in the database within the memory part 202. The attributes used in the case shown in FIG. 8 include the instructing position coordinate and the position coordinate of the transition point coordinate #1. The transition point coordinate #1 is retrieved from the left hand position which is specified by the user by use of the mouse 104, and the corresponding data are read. Next, moving regions are calculated from the instructing position coordinate of the corresponding data, and the calculated region parts are displayed in the control layer by utilizing frame displays or the like. The user points the frame displays by use of the mouse 104, so as to select the moving region.

Figure 18:
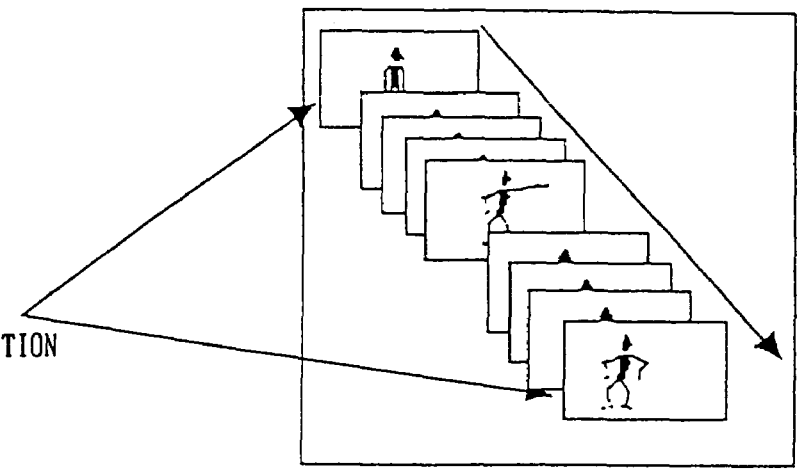
FIG. 18 is a diagram for explaining an embodiment of the expression/action component image in which a starting reference image and an ending reference image are the same.

FIG. 18 is a diagram for explaining an embodiment of the expression/action component image in which the starting reference image and the ending reference image are the same. This embodiment shows the expression/action component image which indicates the "smile" of the character as the communication information, and the starting reference image and the ending reference image are related to the same expressionless image. In this case, since the starting reference image and the ending reference image are the same, it is possible to suppress the amount of the expression/action component image to be stored in the database to a minimum, and to easily connect the images.

Figure 19:
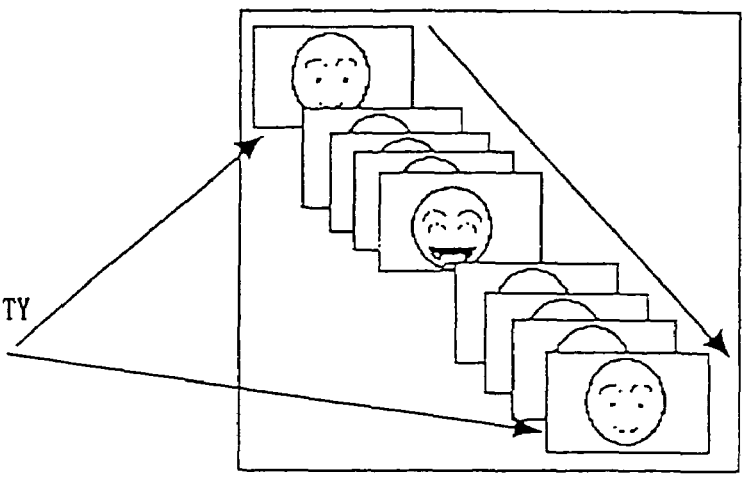
FIG. 19 is a diagram for explaining an embodiment of the expression/action component image in which the starting reference image and the ending reference image are different.

FIG. 19 is a diagram for explaining an embodiment of the expression/action component image in which the starting reference image and the ending reference image are different. This embodiment shows the expression/action component image which indicates "drawing the attention to the right side of the picture" by the character as the communication information, and the starting reference image and the ending reference image are different. In this case, because the starting reference image and the ending reference image are different, it is possible to realize expressions and actions of the humanoid character image with a higher degree of freedom.

Of course, the humanoid character image may be a 2-dimensional image or a 3-dimensional image. However, particularly in the case of a 2-dimensional animation image, it is easier to convey the intended communication information to the viewer by carrying out a process such as deforming the animation, the effects of the present invention are especially notable in the case of the 2-dimensional image.

Figure 20:
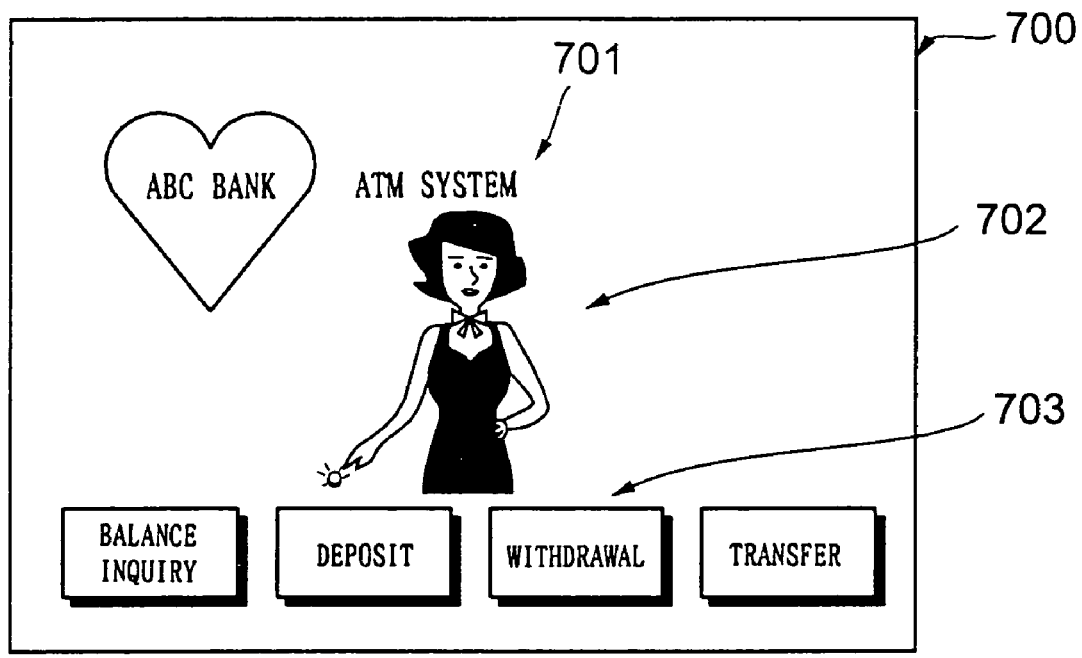
FIG. 20 is a diagram for explaining an operation guide sequence for an ATM screen.

After picture scenes which are to be displayed are created as in the first embodiment described above, these picture scenes are connected to create an operation guide sequence for a screen of a customer operated type terminal such as an operation guide sequence of an ATM screen. FIG. 20 is a diagram for explaining an operation guide sequence of an ATM screen. In addition, FIG. 21 is a flow chart for explaining a response sequence with respect to the operation guide sequence shown in FIG. 20.

In FIG. 20, a system display part 701 which explains the system, a character 702, and a transaction selection button group 703 are displayed within an ATM screen 700. In this case, the system display part 701 displays "ABC BANK ATM SYSTEM". In addition, the transaction selection button group 703 includes buttons for selecting "balance inquiry", "deposit", "withdrawal" and "transfer". The user (viewer) makes a desired transaction by following the operation guidance displayed on the ATM screen 700. In a picture scene of the ATM screen 700 at the start of the operation, a greeting such as "WELCOME" is periodically output by voice, and the character 702 makes a bowing motion in synchronism with this greeting.

Figure 21:
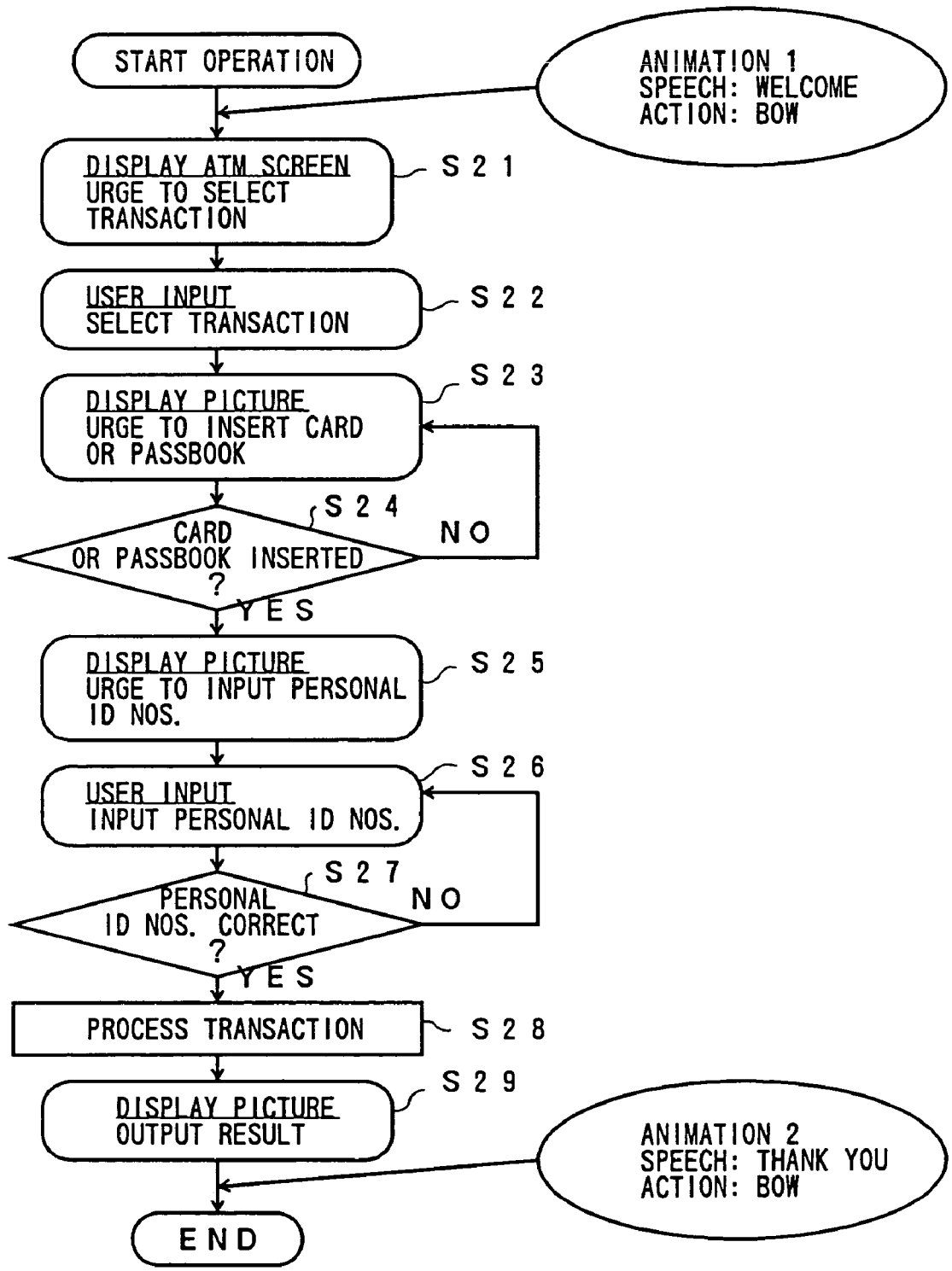
FIG. 21 is a flow chart for explaining a response sequence with respect to the operation guide sequence shown in FIG. 20.

In FIG. 21, a step S21 displays the ATM screen 700 of the picture scene at the start of the operation, so as to urge the user to select the transaction. The user selects a desired transaction by manipulating one button of the transaction selection button group 703 in a step S22. A step S23 displays a picture which urges the user to insert a card or a passbook into the ATM, and a step S24 decides whether or not the user inserted the card or passbook. If the decision result in the step S24 is YES, a step S25 displays a picture which urges the user to input personal identification numbers. The user inputs the personal identification numbers in a step S26. A step S27 decides whether or not the input personal identification numbers are correct. If the decision result in the step S27 is YES, a step S28 carries out a process corresponding to the selected transaction. After the step S28, a step S29 outputs a result of the process carried out by the step S28, and displays the ATM screen 700 of a picture scene at the end of the operation. As a result, a greeting such as "THANK YOU" is output by voice, and the character 702 makes a bowing motion in synchronism with this greeting. The process ends after the step S29.

In FIG. 21, only the ATM screens 700 at the start of the operation and at the end of the operation are described for the sake of convenience, however, in actual practice, it is of course possible to display the ATM screens 700 of various picture scenes during the operation.

Accordingly, in the operation guide sequence, each of the various picture scenes and the input and/or output (input/output) sequences of the user are closely related. For this reason, when creating and editing (including correction and modification) the operation guide sequence, it is necessary to connect the picture scenes and the input/output sequences so that the operation guidance is easy to understand for the user and the user will not feel uncomfortable with the operation. In other words, it is necessary to connect the picture scenes with the display which urges the user to make an input, the voice guidance and the like, so as not to make the user feel uncomfortable or unnatural about the operation. Hence, particularly when editing the operation guide sequence, the programmer of the operation guide sequence must have an excellent understanding of the entire process flow, meaning and the like of the operation guide sequence, before the programmer can newly create or modify the picture sequence and/or the input/output sequence. Consequently, it requires a troublesome and time consuming process for the programmer to create or modify the operation guide sequence.

Accordingly, a description will now be given of embodiments which enable the operation guide sequence to be easily created and edited. In the following embodiments, it is assumed for the sake of convenience that the picture scenes used are those created by the first embodiment described above, but each picture scene itself may of course be created according to a conventional method.

First, a description will be given of a second embodiment of the image generating apparatus according to the present invention. This second embodiment of the image generating apparatus creates an operation guide sequence based on a program which is stored in a second embodiment of a storage medium according to the present invention.

Figure 22:
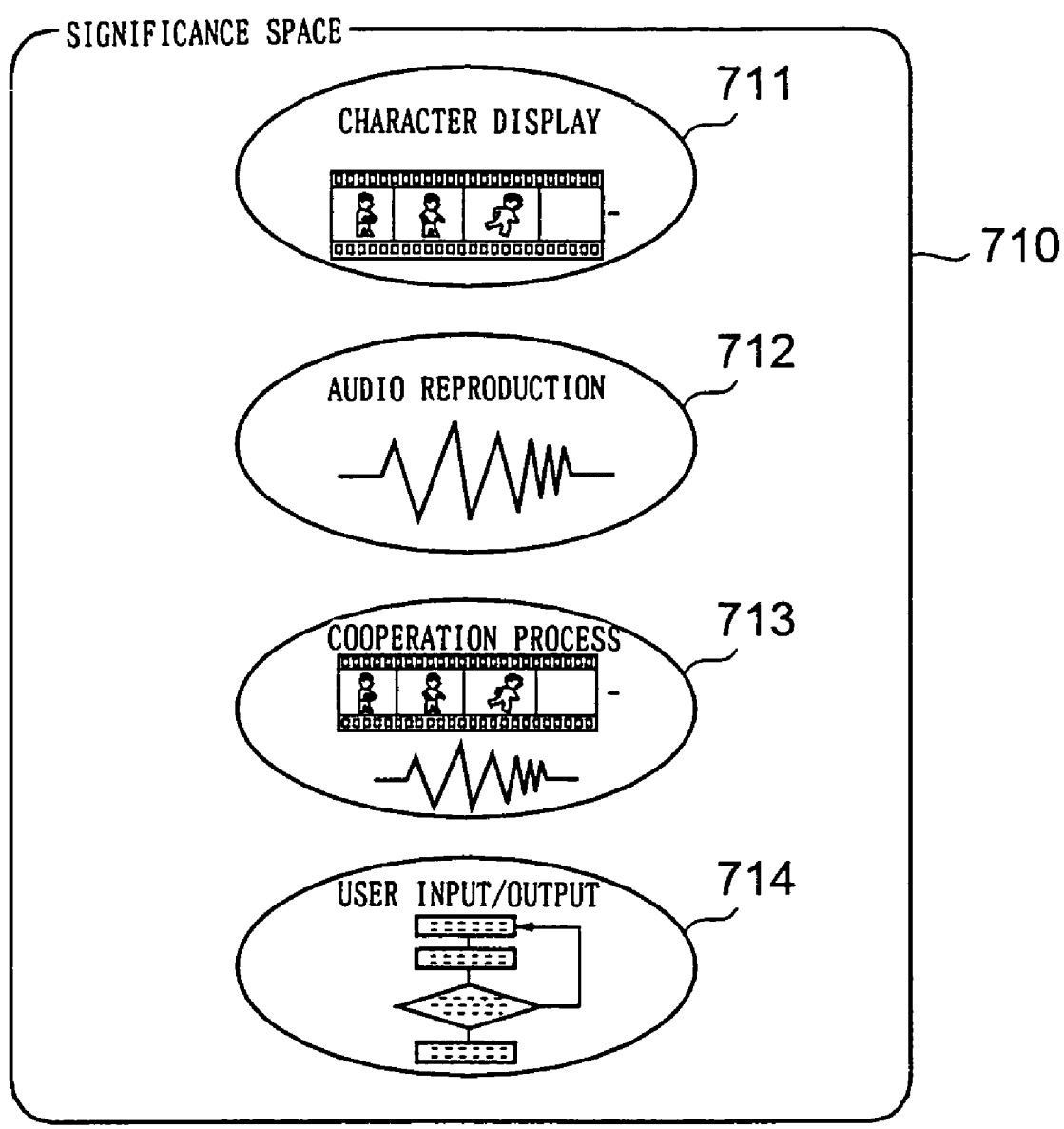
FIG. 22 is a diagram for explaining a significance space used in a second embodiment of the image generating apparatus according to the present invention.

FIG. 22 is a diagram for explaining a significance space used in this embodiment. A significance space 710 is a kind of object which is defined by the programmer or the like, and is one unit of editing the operation guide sequence, that is, one collection. In this embodiment, the significance space 710 corresponds to one picture scene from a point in time when a switching of one picture occurs to a point in time when a next switching of the picture occurs. In addition, the significance space 710 includes a method 711 corresponding to character display, a method 712 corresponding to audio reproduction, a method 713 corresponding to a cooperation process between the character display and the audio reproduction, and a method 714 corresponding to user input/output.

The character display method 711 includes information related to at least the character display with respect to one picture scene. This character display method 711 has a function of obtaining data IDs (character IDs) of the data which are necessary for the display from a database which is prepared in advance and storing the data IDs as a reproducing list, and a function of obtaining reproducing attributes, display conditions and the like included in the data and writing the necessary data in a display memory. More particularly, in the significance space 710, the character display method 711 uses a retrieval key 721 shown in FIG. 23A, for example, so as to obtain an image file 722 related to a running character from a database 731 shown in FIG. 24 and stores the image file 722 as the reproducing list. In addition, the character display method 711 obtains the reproducing attributes, display conditions and the like included in the data of the image file 722, and writes the necessary data in the display memory.

The audio reproduction method 712 includes audio information which is to be reproduced with respect to one picture scene. This audio reproduction method 712 has a function of obtaining data IDs (audio IDs) of the audio data from a database which is prepared in advance and storing the data IDs as a reproducing list, and a function of reading and supplying the audio data to an audio reproducing part according to the reproducing list. More particularly, in the significance space 710, the audio reproduction method 712 uses a retrieval key 727 shown in FIG. 23B, for example, so as to obtain an audio file 728 related to a reproducing audio of a smiling character from an audio database similar to the database 731 shown in FIG. 24 and stores the audio file 728 as the reproducing list. In addition, the audio reproduction method 712 reads and reproduces the audio data of the audio file 728.

The cooperation process method 713 includes information which indicates a cooperation of the character display and the audio reproduction with respect to one picture scene. In the significance space 710, the cooperation process method 713 has a function of reading the corresponding data according to the character IDs and the audio IDs described above, obtaining the reproducing times of these data, and adjusting starting times and the like, so as to match the reproducing times of the character display and the audio reproduction.

The input/output method 714 includes information related to inputs from the user and/or outputs to the user, with respect to one picture scene. For example, the output to the user is the display of a message which urges the user to make an input, and the input from the user is information which is input by the user in response to the message which urges the user to make the input. In the significance space 710, the input/output method 714 has a function of carrying out a start process with respect to each of the functions described above by receiving at least an external event such as the selection of a button in a background image of the character by the user, and a function of generating an event with respect to the character background after the character reproduction is completed.

The unit with which the input images can be simultaneously selected, the unit which is significant as a dialogue, and the like may be used as the unit of the significant space 710. In this case, the unit which is significant as the dialogue includes a greeting, a response, an explanation, a reminder, a waiting of a response, a rejection and the like. In addition, the essential methods within the significant space 710 are the character display method 711 and the input/output method 714, and the audio reproduction method 713 and the cooperation process method 713 may be omitted.

Figure 23:
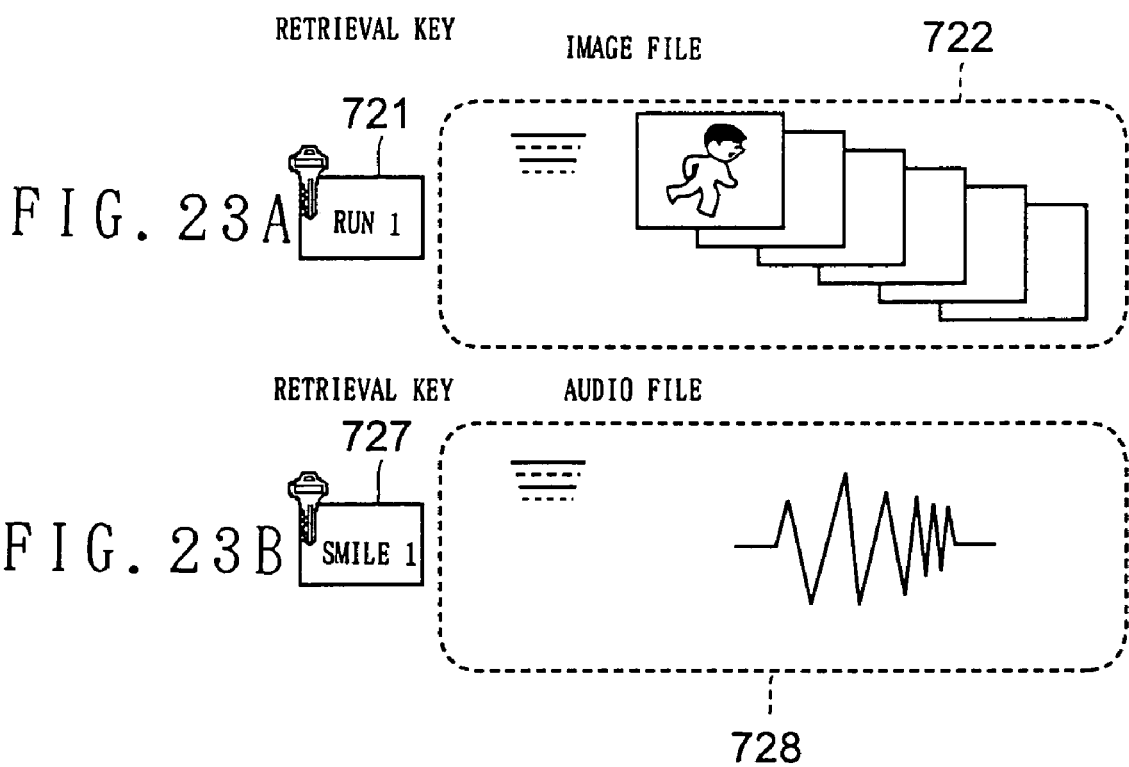
FIGS. 23A and 23B respectively are diagrams for explaining an image file and an audio file.
Figure 24:
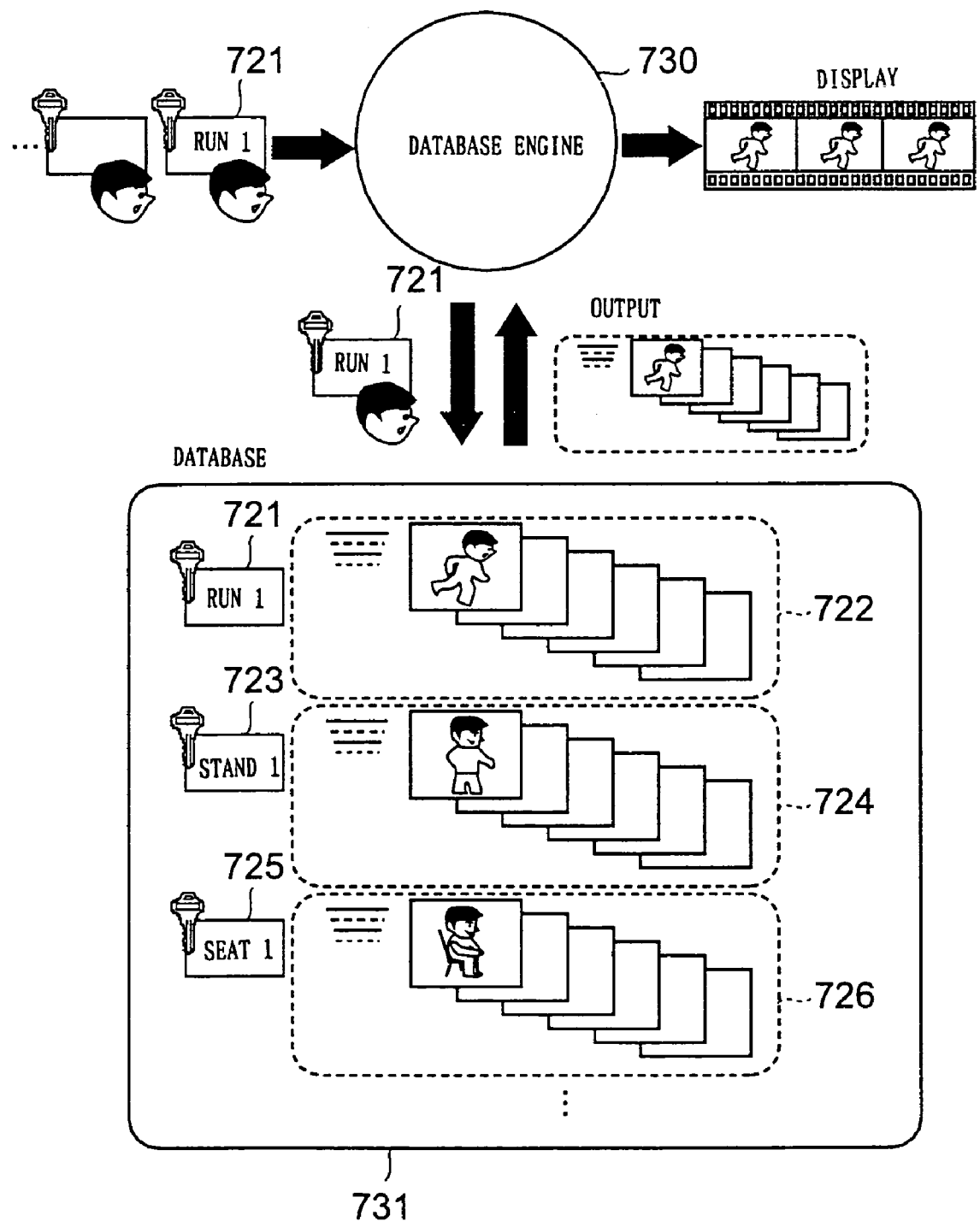
FIG. 24 is a diagram for explaining a display made via a database engine.

FIG. 24 is a diagram showing a display which is made via a database engine. In FIG. 24, those parts which are the same as those corresponding parts in FIG. 23 are designated by the same reference numerals, and a description thereof will be omitted. As shown in FIG. 24, when the retrieval key 721 is supplied to a database engine 730, the database engine 730 makes a search in a database 731 using the retrieval key 721, and reads the corresponding image file 722. The read image file 722 is supplied to the display 102 via the database engine 730, and the running character within the image file 722 is displayed. The audio data is reproduced similarly via a database engine which is similar to the database engine 730.

In FIG. 24, a retrieval key 723 corresponds to a standing character, and a retrieval key 725 corresponds to a sitting character. An image file 724 corresponds to the retrieval key 723, and an image file 726 corresponds to the retrieval key 725.

Accordingly, the changes in the expressions and/or actions of the character, and the user inputs and/or outputs, can be treated in the unit of the significance space 710, within one framework. For this reason, the programmer can easily create and edit the series of expressions and/or actions of the character, in units of the logic of the operation guide sequence, that is, using picture scene units as objects. Therefore, the programmer can create and edit the pictures such as the operation guide sequence based more on intuition.

Figure 25:
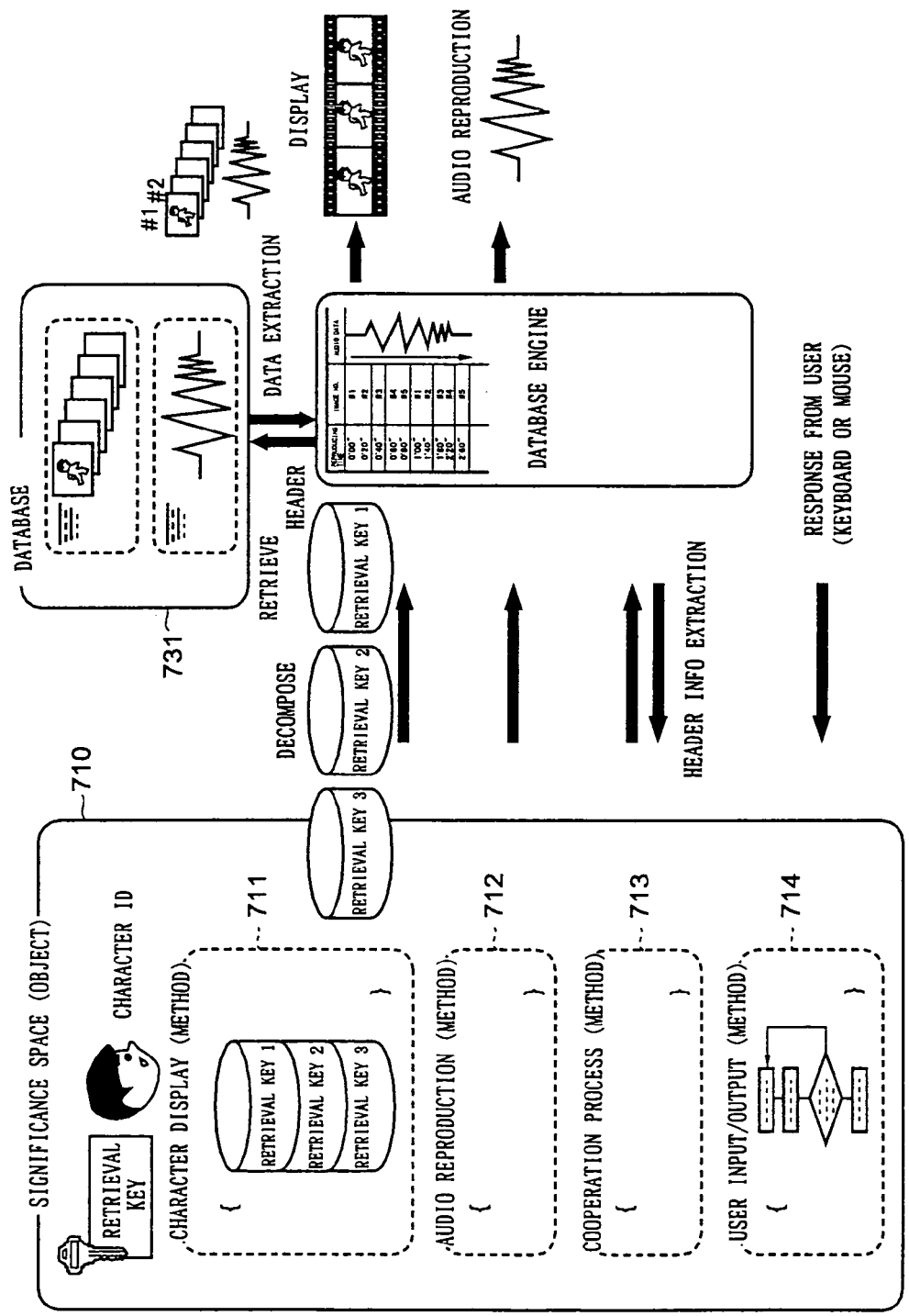
FIG. 25 is a diagram showing the general construction of the second embodiment of the image generating apparatus.

FIG. 25 is a diagram showing the general construction of the second embodiment of the image generating apparatus. In FIG. 25, those parts which are the same as those corresponding parts in FIGS. 22 through 24 are designated by the same reference numerals, and a description thereof will be omitted. Each of the functions of this embodiment can be realized by the computer system 100 used in the first embodiment, for example.

In FIG. 25, a character ID is set as a variable for each defined significant space 710. A database of a character to be used is specified from the database 731 based on this character ID. The actions of the character are substituted into the reproducing list, as retrieval keys, in the sequence of the actions, and are supplied in sequence to the database engine 730. The database engine 730 specifies the data from the retrieval key, and analyses a header of the data. After analyzing the header, the character expression/action data are supplied to the display memory in the sequence of the actions substituted in the reproducing list. In addition, the audio data are supplied to the audio reproducing part according to a reproducing list of in the audio reproducing function.

Figure 26:
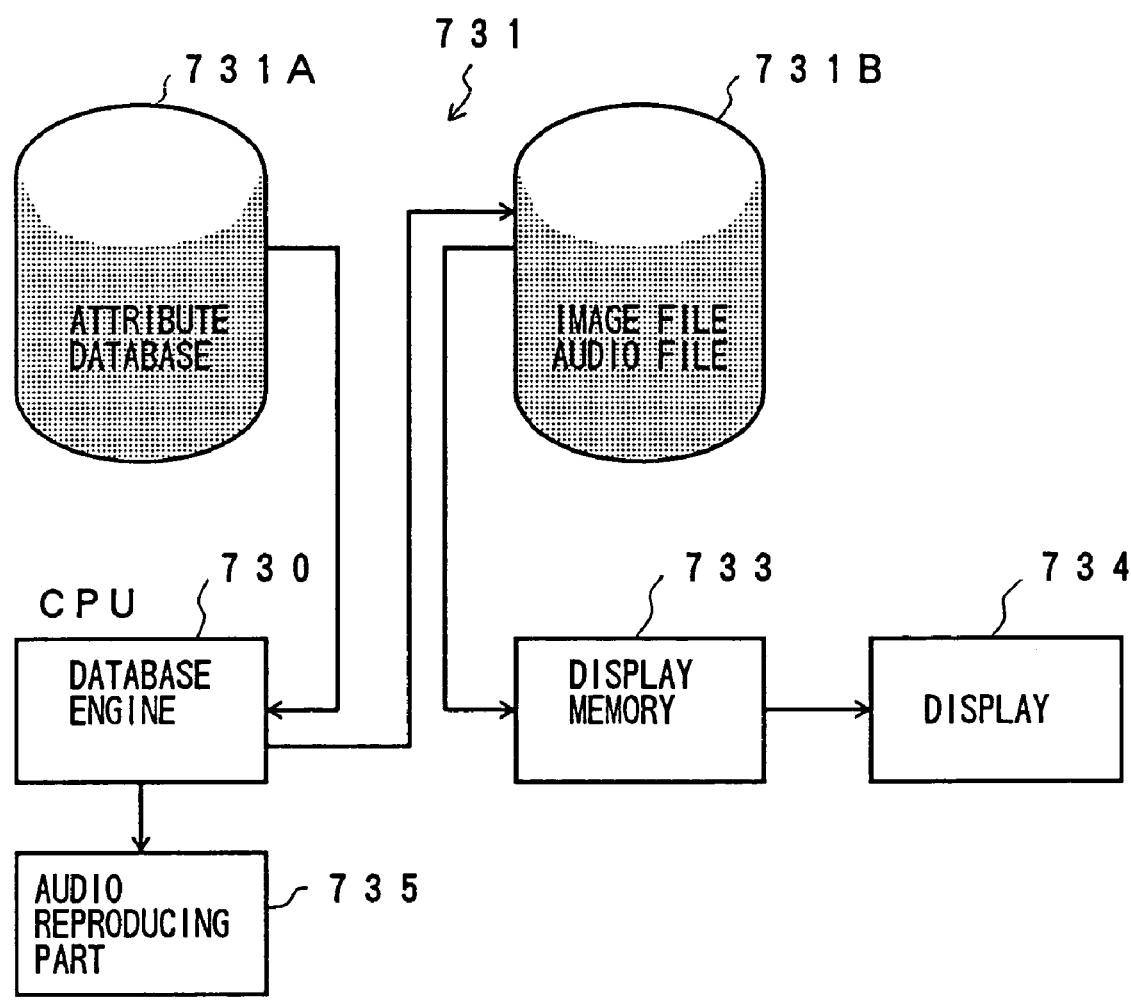
FIG. 26 is a diagram for explaining the supply of character expression/action data to a display memory.

FIG. 26 is a diagram for explaining the supply of the character expression/action data to the display memory, and shows the flow of the display data and the audio data in more detail. The data related to the character image are stored in a storage unit 731A and a storage unit 731B. The storage unit 731A stores an attribute database which prescribes character unit expressions. On the other hand, the storage unit 731B stores databases of image files and audio files which include the image file 722 and the audio file 728 shown in FIG. 23. The attribute database which prescribes the character unit expressions stores a plurality of images forming the character expressions/actions, audio lists, character expression/action attributes, and the like. The data within the storage units 731A and 731B form the database 731.

The database engine 730 extracts the image list such as the corresponding expression/action list from the attribute database, based on the specified expression name or attribute keyword. In addition, based on the extracted image list, the database engine 730 transfers the image file to a display memory 733 and displays the image file on a display 734. On the other hand, with respect to the audio data, the database engine 730 extracts the corresponding audio file from the attribute database, and transfers the audio file to an audio reproducing part 735, so as to reproduce the audio file.

Figure 27:
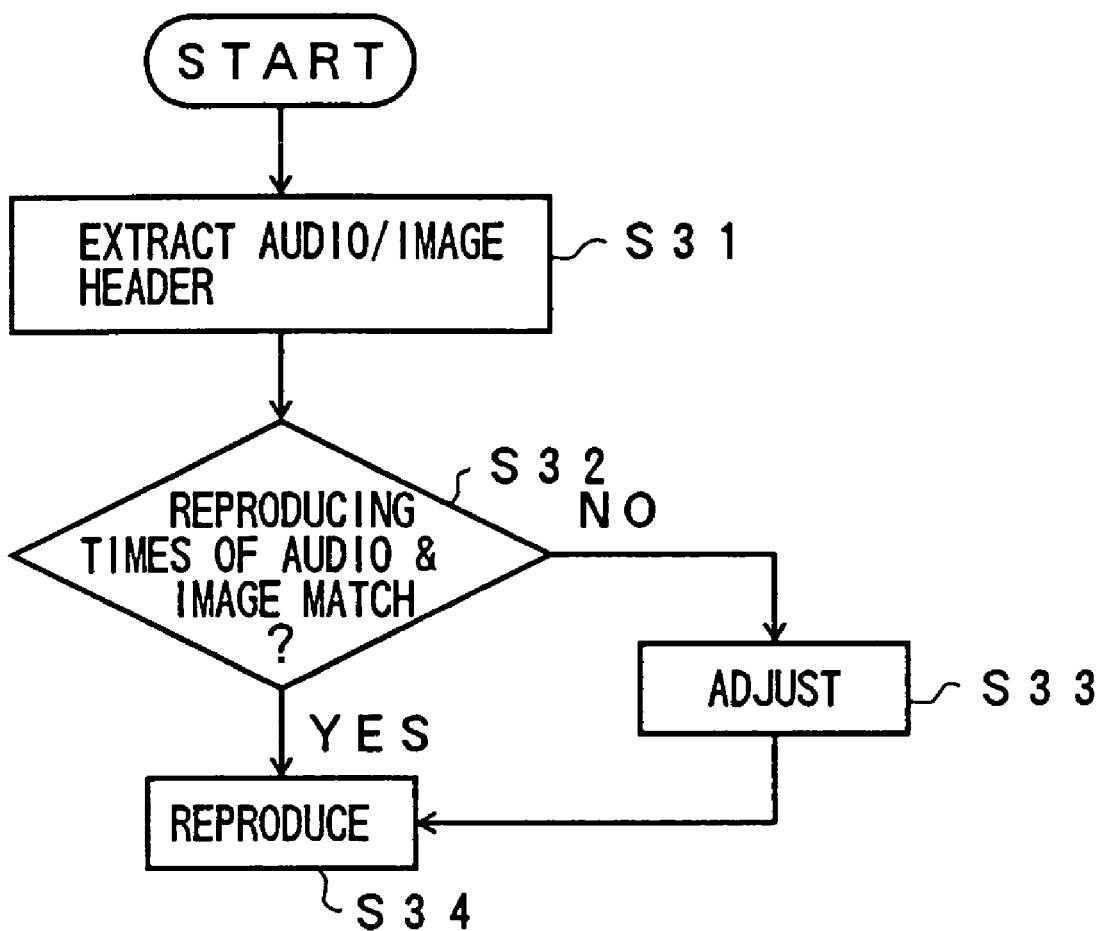
FIG. 27 is a flow chart for explaining a cooperation process.

FIG. 27 is a flow chart for explaining the cooperation process. This cooperation process adjusts the reproducing interval of the image data when the reproducing time of the image data and the reproducing time of the audio data do not match, so that the two reproducing times approximately match.

In FIG. 27, a step S31 extracts headers of the image file 722 and the audio file 728. A step S32 decides whether or not the reproducing time of the image data and the reproducing time of the audio data match, based on the information within the extracted headers. If the decision result in the step S32 is NO, a step S33 carries out an adjusting process to adjust the reproducing interval of the image data. More particularly, the reproducing interval of the image data is increased if the reproducing time of the audio data is longer than the reproducing time of the image data, and the reproducing interval of the image data is reduced if the reproducing time of the audio data is shorter than the reproducing time of the image data. If the decision result in the step S32 is YES or after the step S33, a step S34 reproduces the image data and the audio data.

In this embodiment, the reproducing interval of the image data is adjusted when the reproducing time of the image data and the reproducing time of the audio data do not match, so that the two reproducing times approximately match. However, it is of course possible to adjust the reproducing interval of the audio data or, adjust the reproducing intervals of both the image data and the audio data, so that the reproducing time of the image data and the reproducing time of the audio data approximately match.

Figure 28:
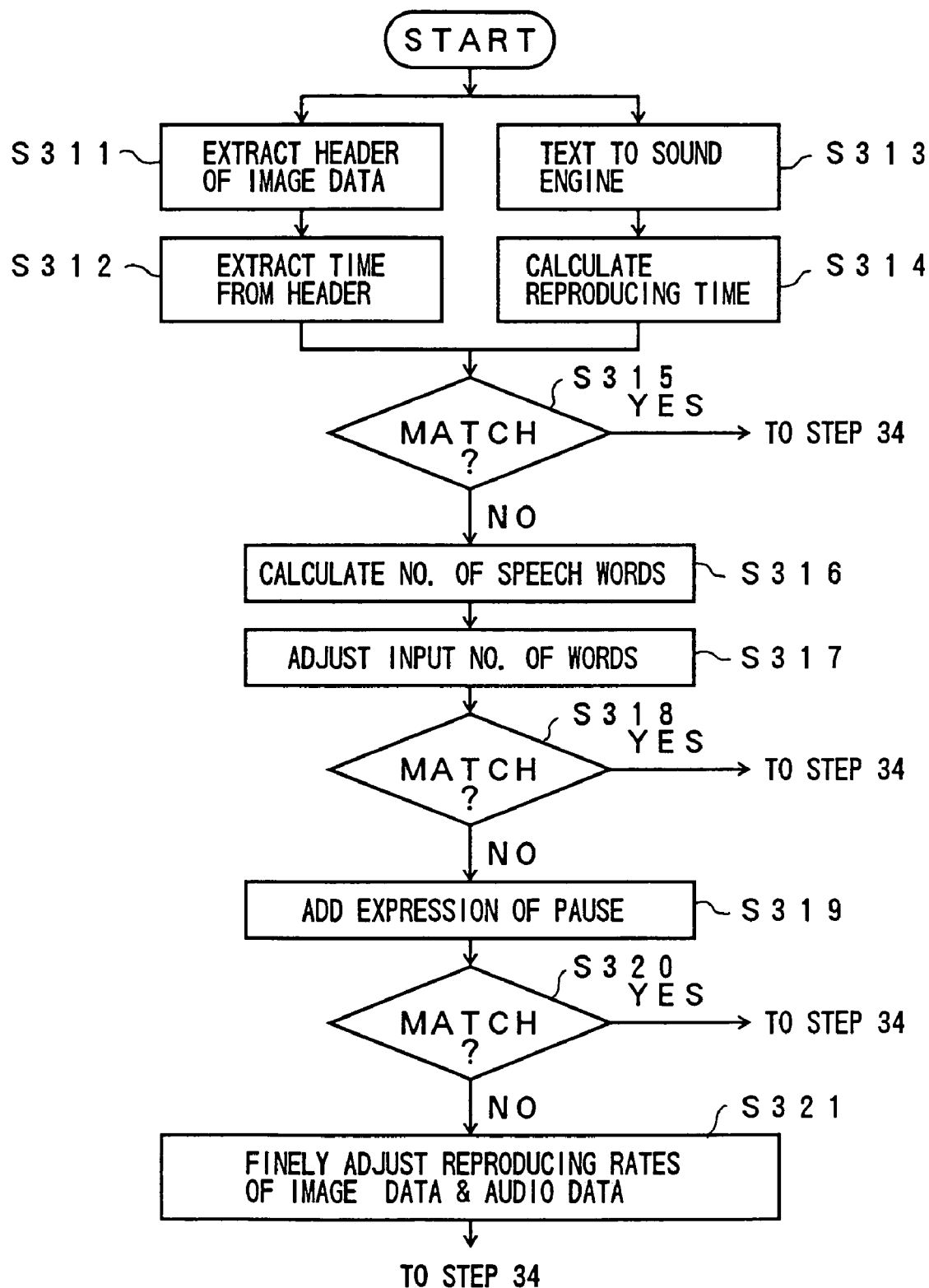
FIG. 28 is a flow chart for explaining the cooperation process in more detail.

FIG. 28 is a flow chart for explaining the cooperation process in more detail. In FIG. 28, steps S311 through S314 correspond to the step S31 shown in FIG. 27, a step S315 corresponds to the step S32 shown in FIG. 27, and steps S316 through S321 correspond to the step S33 shown in FIG. 27.

In FIG. 28, the step S311 extracts the header of the image file 722, and the step S312 extracts the reproducing time of the image data based on the information within the extracted header. In a case where the information related to the reproducing time of the audio data is included within the header of the audio file 728, the reproducing time of the audio data can be extracted similarly as in the case of the image file 722. On the other hand, in a case where the audio data of the audio file 728 are in the form of text data, the step S313 obtains a audio waveform using a known Text To Speech (TTS) engine. In this case, if the audio waveform itself is the audio data, it is possible to use the audio data as it is. In addition, the step S314 calculates the reproducing time of the audio data from the obtained audio waveform. The steps S311 and S312 and the steps S313 and S314 are carried out in parallel.

The step S315 decides whether or not the reproducing time of the image data and the reproducing time of the audio data match. If the decision result in the step S315 is YES, the process advances to the step S34 shown in FIG. 27. On the other hand, the process advances to the step S316 if the decision result in the step S315 is NO.

The step S316 calculates a number of speech words matching the reproducing time of the image data. For example, by storing an average reproducing time of one word, it is possible to calculate the necessary number of speech words matching the reproducing time of the image data based on this average reproducing time of one word. The step S317 adjusts the input of the number of words. The step S318 decides whether or not the reproducing time of the image data and the reproducing time of the audio data match as a result of the adjustment of the number of words. The process advances to the step S34 shown in FIG. 27 if the decision result in the step S318 is YES. Accordingly, if the reproducing times of the image data and the audio data do not match, the necessary number of speech words and the number of excess words are calculated based on the reproducing time of the image data, so as to urge the programmer to newly add or delete words.

On the other hand, the process advances to the step S319 if the decision result in the step S318 is NO. The step S319 adds the expression of "pause" to the image data. The step S320 decides whether or not the reproducing time of the image data and the reproducing time of the audio data match as a result of the addition of the expression of "pause". The process advances to the step S34 shown in FIG. 27 if the decision result in the step S320 is YES. Hence, if the reproducing times of the image data and the audio data do not match and a number of excess words exists in the audio data, the reproducing time of the image data is adjusted by inserting the image of "pause". For example, the image of "pause" indicates an expression/action image for filling a time peculiar to the character, such as the habit of the character. If the decision result in the step S320 is YES, the step S321 finely adjusts the reproducing rate of the image data to the reproducing rate of the audio data, so as to match the reproducing time of the image data and the reproducing time of the audio data. After the step S321, the process advances to the step S34 shown in FIG. 27.

Figure 29:
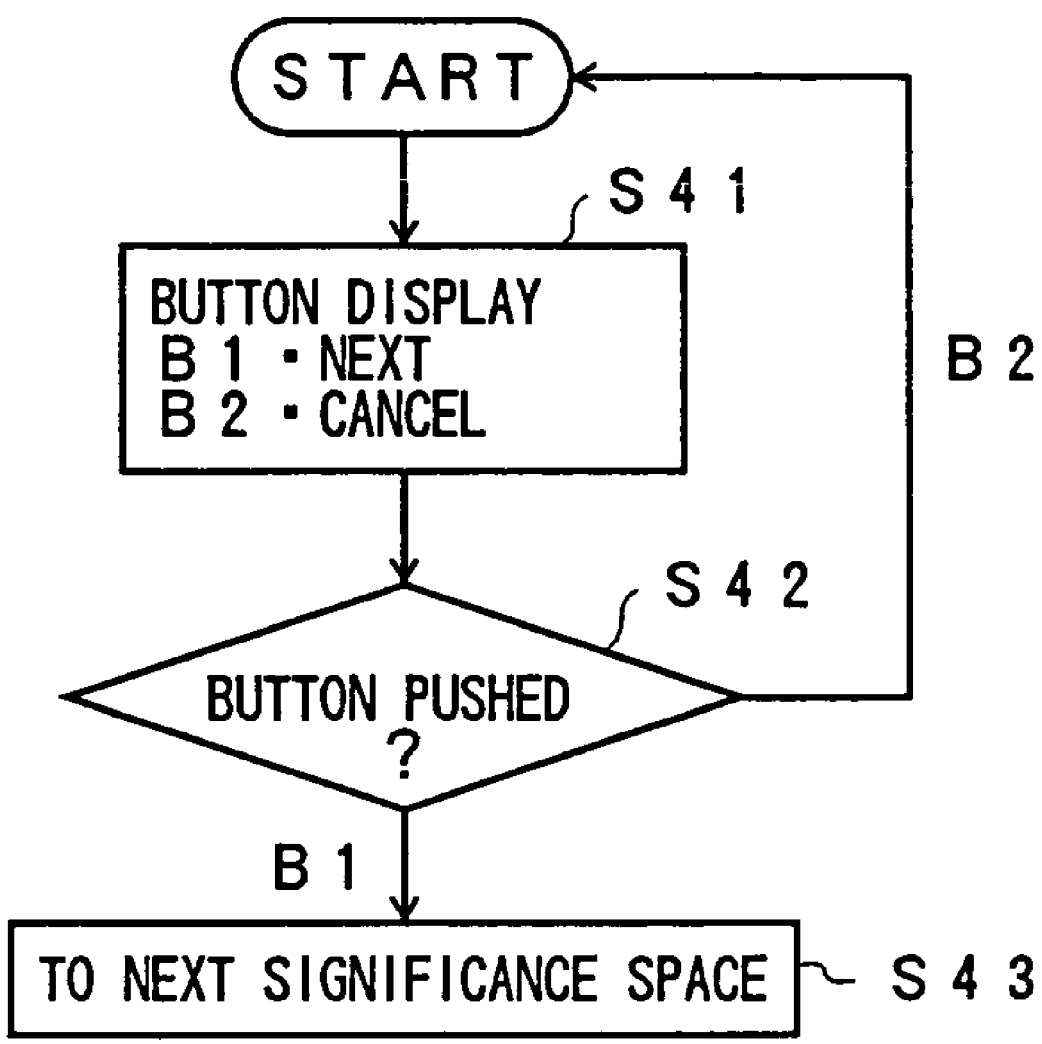
FIG. 29 is a flow chart for explaining a user input/output process.

FIG. 29 is a flow chart for explaining the user input/output process. In a case where the operation guide sequence is formed by a plurality of significance spaces, a move of the process from one significance space to another significance space is determined based on the user input.

In FIG. 29, a step S41 displays buttons, and for example, buttons B1 and B2 are displayed. For the sake of convenience, it is assumed that the button B1 specifies "next", and the button B2 specifies "cancel", for example. A step S42 decides whether the button B1 or B2 is selected and pushed by the user. The process returns to the step S41 if the button B2 is selected by the user. On the other hand, if the button B1 is selected by the user, a step S43 moves the process to the next significance space. The move itself of the process from one significance space to another significance space will be described later.

FIG. 30 is a flow chart for explaining a process in a case where this embodiment is applied to the operation guide sequence shown in FIG. 21. Variables within the significance space (object) are formed by array type variables which store the character IDs and the retrieval keys. In addition, the character display, the audio reproduction and the user input are defined as methods within the object. It is assumed that the user input is made by the selection of a button.

The significance space (object) is set in the following manner. First, an ID which defines the significance space is defined. In FIG. 30, "greeting" is regarded as the object ID of a first significance space 710-1. Next, the programmer represents the desired expression/action changes of the character by the retrieval keys, and substitutes the retrieval keys according to the sequence of the actions. In this particular case, the "greeting" is divided into "smile" and "bow" which are respectively substituted into arrays 1 and 2 in sequence. Similarly, the necessary audio data are represented as the audio file IDs by the lists within the significance space 710-1, and substituted into the arrays depending on the reproducing sequence. In addition, the event IDs and actions (object instructions) received from the background buttons are substituted into the arrays of the user input. Accordingly, in the significance space 710-1 in which the "greeting" is the object ID, the character ID is an office lady, for example. Further, as for the methods in this significance space 710-1, the character display is "smile" and "bow", the audio reproduction is "WELCOME", the user input is a button 1 specifying "next" and a button 2 specifying "return". It is assumed for the sake of convenience that there is no cooperation process in this particular case.

If the user input in the significance space 710-1 is the button 1 specifying "next", the process moves to a significance space 710-2. In the significance space 710-2 in which the object ID is "explanation", the character ID is the office lady, for example. Moreover, as for the methods in this significance space 710-2, the character display is "waving hand", the audio reproduction is "THIS IS ABC BANK ATM SYSTEM", the user input is the button 1 specifying "next" and the button 2 specifying "return". It is also assumed for the sake of convenience that there is no cooperation process in this particular case.

If the user input in the significance space 710-2 is the button 1 specifying "next", the process moves to a significance space 710-3. In the significance space 710-3 in which the object ID is "select", the character ID is the office lady, for example. In addition, as for the methods in this significance space 710-3, the character display is "point button" and "shift line of vision to button", the audio reproduction is "PLEASE SELECT DESIRED TRANSACTION", and the user input is the button specifying "balance inquiry", the button 2 specifying "withdrawal", a button 3 specifying "deposit" and a button 4 specifying "return". It is also assumed for the sake of convenience that there is no cooperation process in this particular case.

When the user input in the significance space 710-3 is the button 2 specifying "withdrawal", the process moves to a significance space 710-4. In the significance space 710-4 in which the object ID is "withdrawal", the character ID is the office lady, for example. Further, as for the methods in this significance space 710-4, the character display is "point button" and "shift line of vision to button", the audio reproduction is "PLEASE INPUT PERSONAL IDENTIFICATION NUMBERS", and the user input is buttons 1 through 9 specifying "ten-key (personal identification numbers)", a button 10 specifying "cancel", and a button 11 specifying "return". It is also assumed for the sake of convenience that there is no cooperation process in this particular case.

When the user input in the significance space 710-4 is the buttons 1 through 9 specifying "ten-key", a process related to the withdrawal is carried out in this case, and thereafter, the process moves to a significance space 710-5. In the significance space 710-5 in which the object ID is "greeting", the character ID is the office lady, for example. As for the methods in this significance space 710-5, the character display is "smile" and "bow", the audio reproduction is "THANK YOU", and there is no particular user input and no particular cooperation process.

Figure 31:
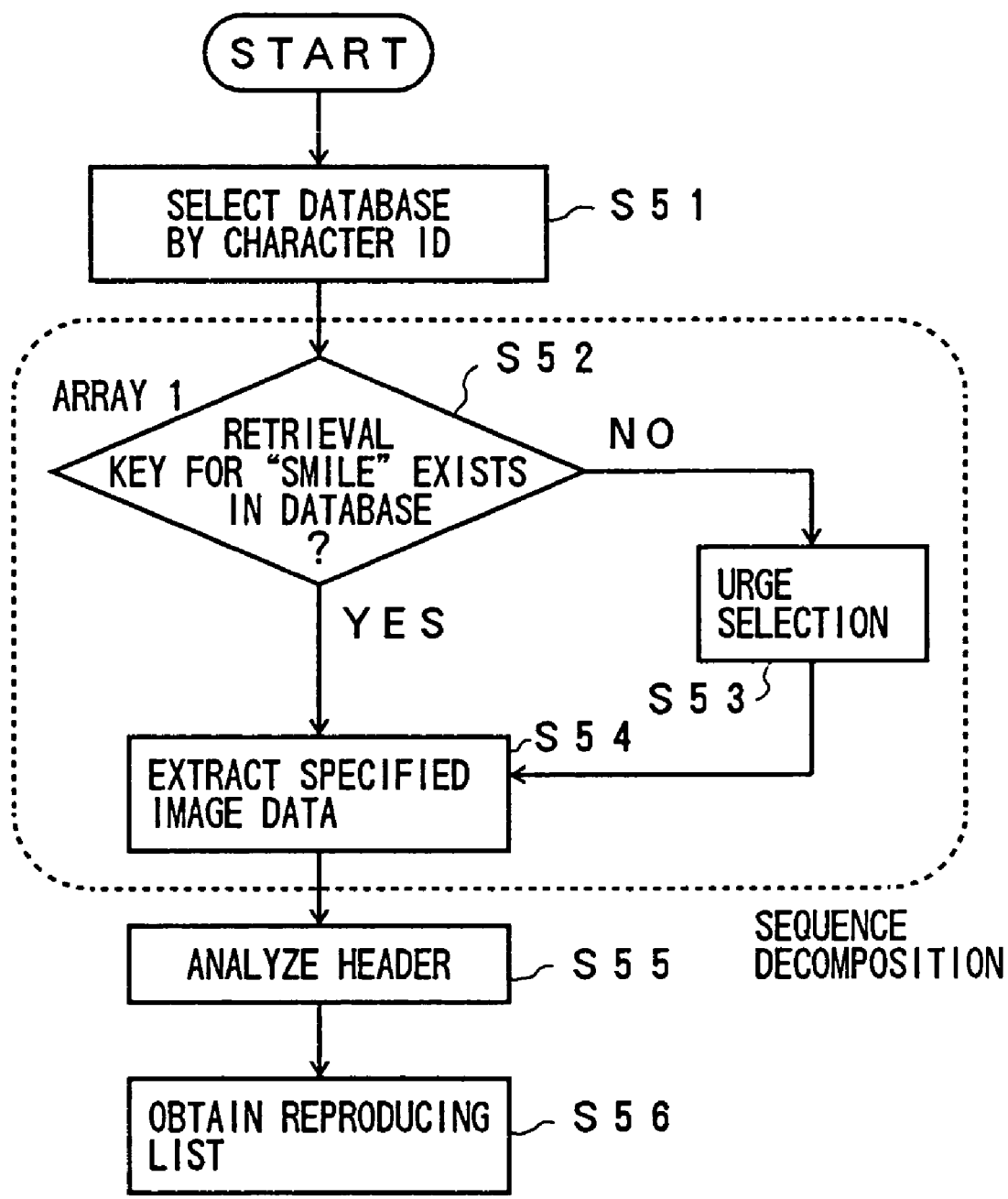
FIG. 31 is a flow chart for explaining the relationship of the significance space and the database engine.
Figure 32:
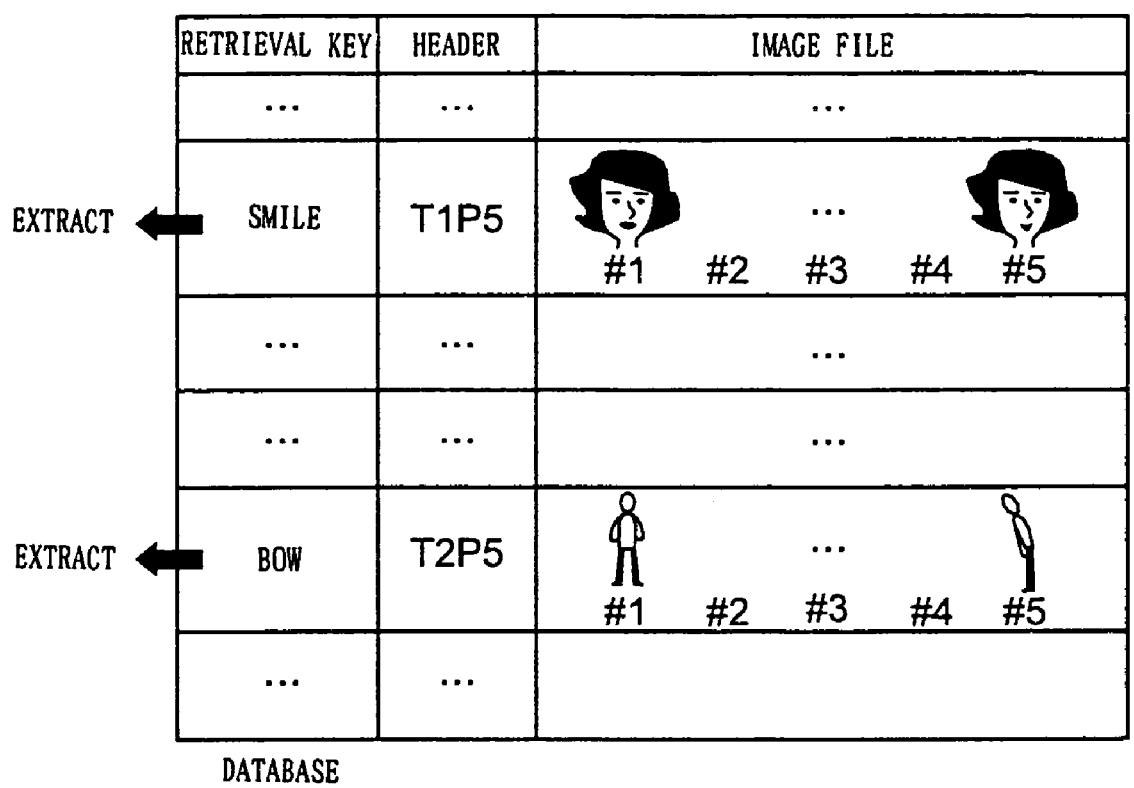
FIG. 32 is a diagram showing a part of a database in which a character ID is an office lady.

FIG. 31 is a flow chart for explaining the relationship of the significant space and the database engine. FIG. 32 is a diagram showing a part of the database in which the character ID is the office lady. It is assumed for the sake of convenience that the process is carried out with respect to the significance space 710-1 shown in FIG. 30 in which the object ID is "greeting". But of course, the process can be carried out similarly with respect to other significance spaces.

In FIG. 31, when the programmer inputs the character ID in a step S51, a corresponding database is selected. Since the character ID is the office lady in this case, the database shown in FIG. 32 is selected. The character display method in the significance space 710-1 supplies the retrieval keys in a sequence from the array 1 to the database engine 730, and detects whether or not the image data specified by the retrieval keys exist in the database engine 730. If the image data specified by the retrieval key does not exist in the database engine 730, a table of the retrieval keys related to the expressions/actions existing in the database is displayed, so as to urge the programmer to select the retrieval key. Similar operations are repeated with respect to the number of arrays, so that the necessary image files are extracted from the database and a reproducing sequence is created from a collection of the image data. More particularly, a step S52 first decides whether or not a retrieval key for "smile" exists in the database. If the decision result in the step S52 is NO, a step S53 urges the programmer to select the retrieval key from the table of retrieval keys. If the decision result in the step S52 is YES or after the step S53, a step S54 extracts the image data specified by the retrieval key, that is, the image file, from the database. In this particular case, the image file having a header T1P1 is extracted from the database shown in FIG. 32.

After the step S54, a step S55 analyzes the information included in the header of the extracted image file, that is, the information included in the header of the reproducing sequence, and determines the reproducing interval of the image data. The reproducing interval of the image data differs for each of the data. In the character display, it is more efficient and a more appropriate display can be made by making the number of image files necessary for the display to be variable depending on the magnitude of the action of the character. In this embodiment, the reproducing interval of the image file is not a constant interval, and differs depending on the individual data in the database, that is, the series of image file group uniquely determined by a peculiar retrieval key. In order to appropriately reproduce the image file, the information necessary for reproducing each image data is included in the header, and in a step S56, the database engine 730 constructs a reproducing list such as that shown in FIG. 33 by referring to the header.

Next, a description will be given of a case where the information included in the header prescribes the character reproducing time T and the number P of image files. In the case of the database shown in FIG. 32, a header T1P5 of the image file corresponding to the retrieval key for "smile" indicates that the character reproducing time T is 1 second, and the number P of image files to be reproduced during this 1 second is 5. On the other hand, a header T2P5 of the image file corresponding to the retrieval key for "bow" indicates that the character reproducing time T is 2 seconds, and the number P of image files to be reproduced during this 2 seconds is 5. The reproducing intervals of the data in the image files corresponding to the retrieval keys for "smile" and "bow" are mutually different, but the respective reproducing intervals can be obtained as "0.2 second interval" and "0.4 second interval" through calculation by the database engine 730.

Therefore, the reproducing interval and the reproducing time of each data obtained by the database engine 730 are stored in the form of the reproducing list such as that shown in FIG. 33, together with the image number within each data and the corresponding audio data. Thus, during the operation guide sequence, it is possible to display the determined image file at the time determined based on the reproducing list.

Figure 34:
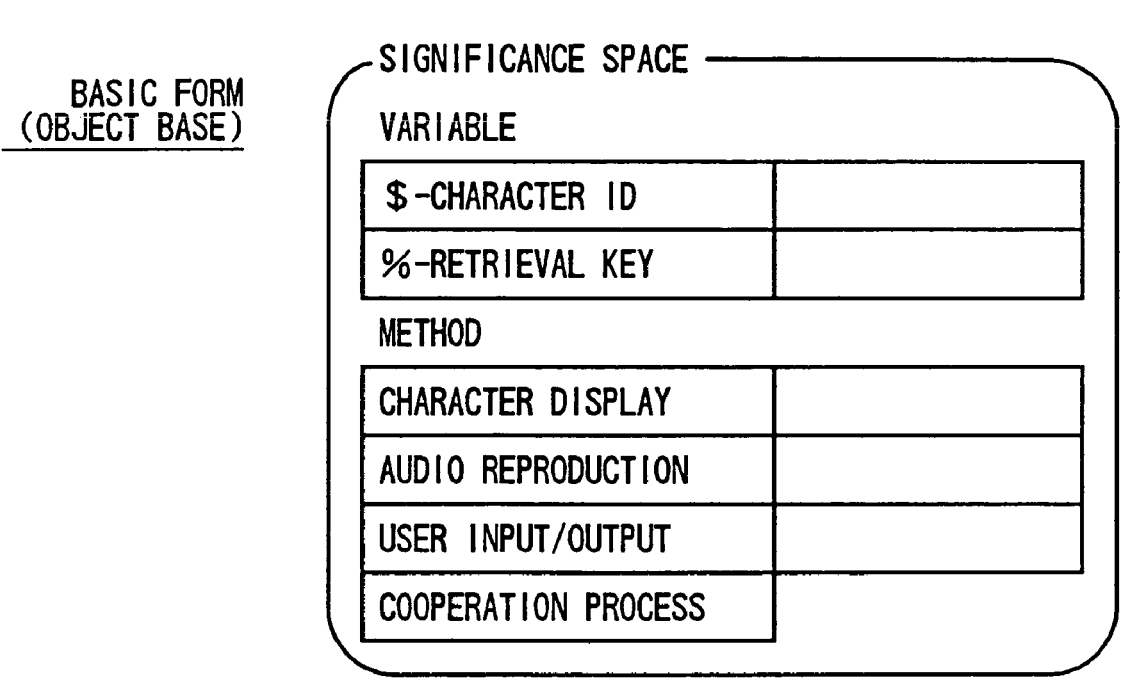
FIG. 34 is a diagram showing a basic form.

Next, a description will be given of a significance space structuring tool. FIG. 34 is a diagram showing a basic form. In addition, FIGS. 35A and 35B and FIGS. 36A through 36D respectively are diagrams for explaining element groups which facilitate the structuring of the significance space.

Figure 35A:
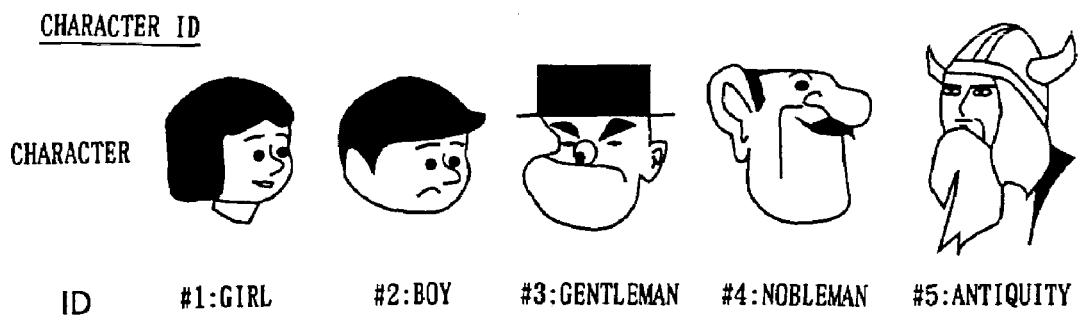
FIGS. 35A and 35B respectively are diagrams showing an element group which facilitates the construction of the significance space.
Figure 35B:
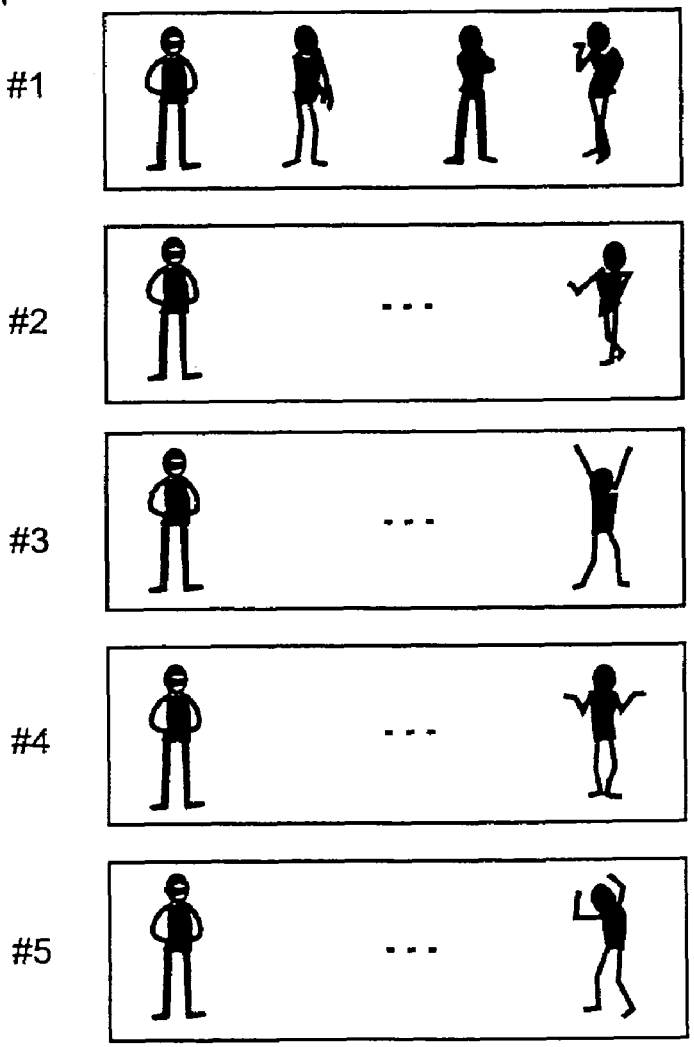

As described above, this embodiment treats the significance space as an object, and the character display, the audio reproduction and the user input/output (including button structure and algorithm) as methods. FIGS. 34, 35A and 35B show elements which are prepared in advance as options of the elements the use of which are anticipated within the significance space.

In FIG. 34, the basic form is the nucleus of the object, and a $-character ID, %-retrieval key, and elements used within each of the methods are selected and inserted as the variables. The $-character ID is a variable for specifying the character which is to act within the significance space. The %-retrieval key is an array variable which stores the actions selected by the character display method in the picture reproducing sequence, and an editing thereof by the programmer is prohibited. On the other hand, the character display, the audio reproduction, the user input/output, and the cooperation process are all methods.

As shown in FIG. 35A, the character IDs indicate various characters. The character IDs #1, #2, #3, #4 and #5 respectively indicate a girl, a boy, a gentleman, a nobleman and an antiquity.

In addition, of the methods, the character display is an element related to the selected action. For example, the character display indicates actions indicated by #1 through #5 in FIG. 35B. Of the methods, the audio reproduction indicates speech such as "WELCOME", "THANK YOU", "PLEASE CONFIRM" and "PLEASE INPUT AGAIN" shown in FIG. 36A, for example, which are anticipated beforehand as likely to be used, and the audio reproduction is prepared as a file which can be reproduced by the computer system 100 or the like. Of the methods, the user input is a combination of a button structure such as confirm keys #1, select keys #2, and a ten-key #3 shown in FIG. 36B, and an input process algorithm described by a flow chart #1 shown in FIG. 36C and a flow chart #2 shown in FIG. 36D, for example.

FIG. 37 is a diagram showing a significance space which is formed by inserting each of the elements described above.

Figures 38A, 38B:
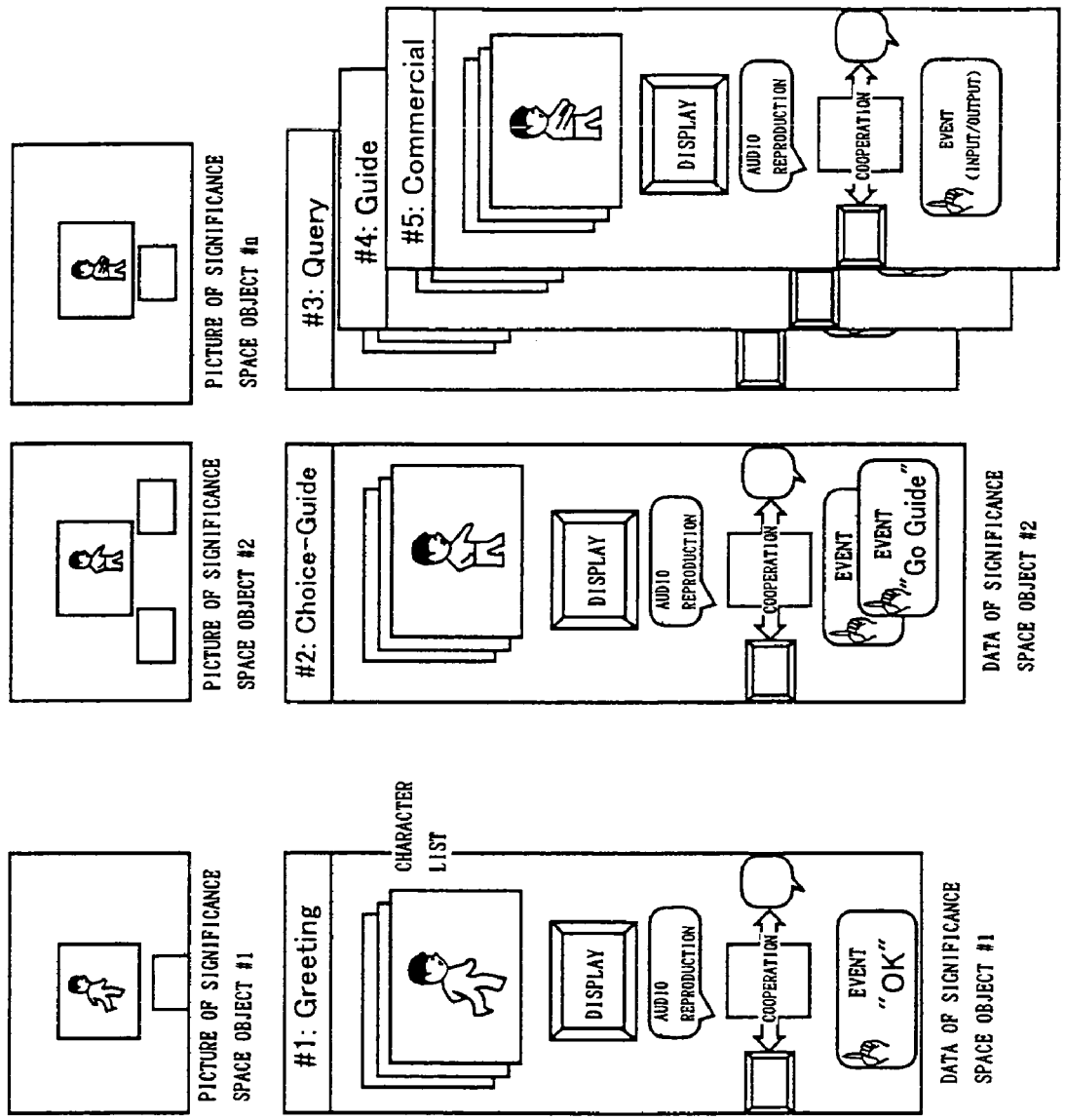
FIGS. 38A and 38B respectively are diagrams for explaining methods of forming, displaying and connecting the significance spaces.
Figure 39:
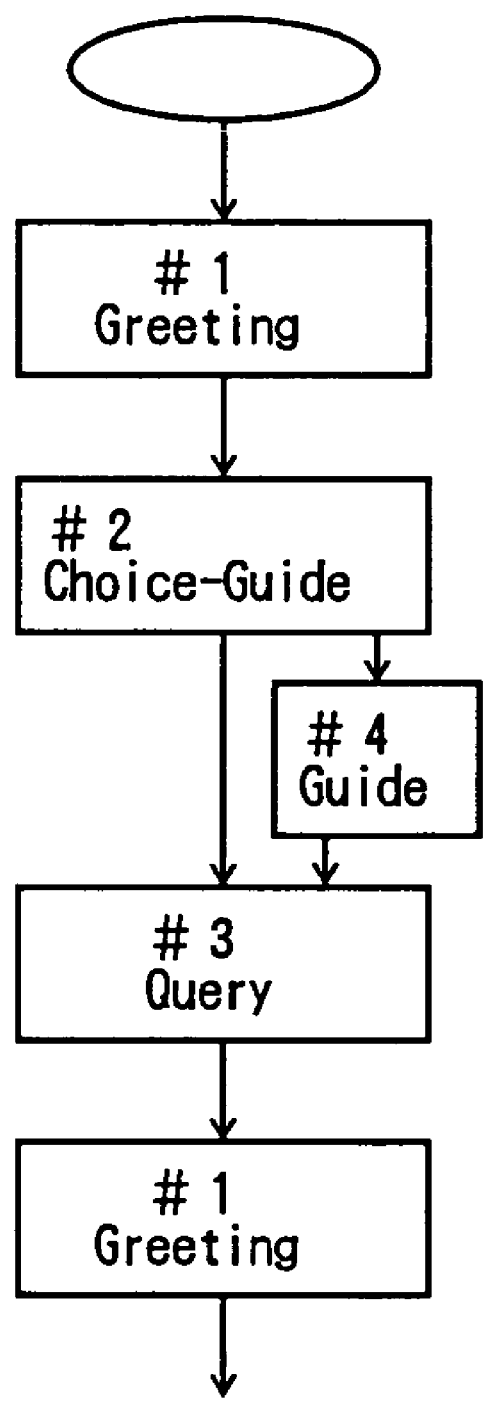
FIG. 39 is a diagram showing an editing using the significance space.

Next, a description will be given of the methods of forming, displaying and connecting the significance spaces. FIG. 38A shows pictures which are displayed by the significance spaces (objects), and FIG. 38B shows functional blocks of the significance spaces for realizing the pictures shown in FIG. 38A. In addition, FIG. 39 is a diagram showing an editing using the significance space.

FIG. 38B shows a significance space #1 for greeting, a significance space #2 for choice-guide, a significance space #3 for query, a significance space #4 for guide, and a significance space #5 for commercial. The functional blocks of each of these significance spaces #1 through #5 include i) a character image group (image list), ii) a display attribute (display rate, resolution, etc.), iii) an audio data, iv) a cooperation relationship of the audio and expression display, and v) each data and function of the input event, which are required to form one significant space. The pictures shown in FIG. 38A are displayed by these functional blocks. The character action is prescribed by the functional block i), the necessary images are decomposed into image files, and the necessary image is sent from the database of the character image to the image memory. The display position, the display rate, the display resolution and the like are prescribed by the functional block ii). The audio is prescribed by the functional block iii). The cooperation of the audio and action is prescribed by the functional block iv). Furthermore, in this embodiment, the functional block v) prescribes a process such as that performed in a case where the programmer receives an event that an "OK" button is selected and a reference is made to another significance space.

A plurality of such significance spaces (objects) are created depending on the definitions made by the programmer. The constituent elements of the data and the functions are the same, but the required number of constituent elements may be selected depending on the significance space.

In FIG. 38B, the significance space #2 for choice-guide, the significance space #3 for query, the significance space #4 for guide, and the significance space #5 for commercial, which are shown on the right side, are required for the response sequence of the terminal. In the case of the significance space #2 for choice-guide, for example, the number of significance spaces (objects) to be called becomes plural depending on the event. In the particular case shown, there are two options.

Therefore, in this embodiment, an instance for moving the process to another significance space depending on the event, is prepared within the significance space, that is, within the object. Since the name of the significance space to be processed next is registered in the instance, it is possible to move the process based on this name of the significance space.

FIG. 39 shows an editing for a case where the significance space #1 for greeting, the significance space #2 for choice-guide, the significance space #3 for query, the significance space #4 for guide, and the significance space #5 for commercial shown in FIG. 38B are connected. As shown in FIG. 39, a plurality of connecting significance spaces (objects) are set when a plurality of options exist.

Figure 40:
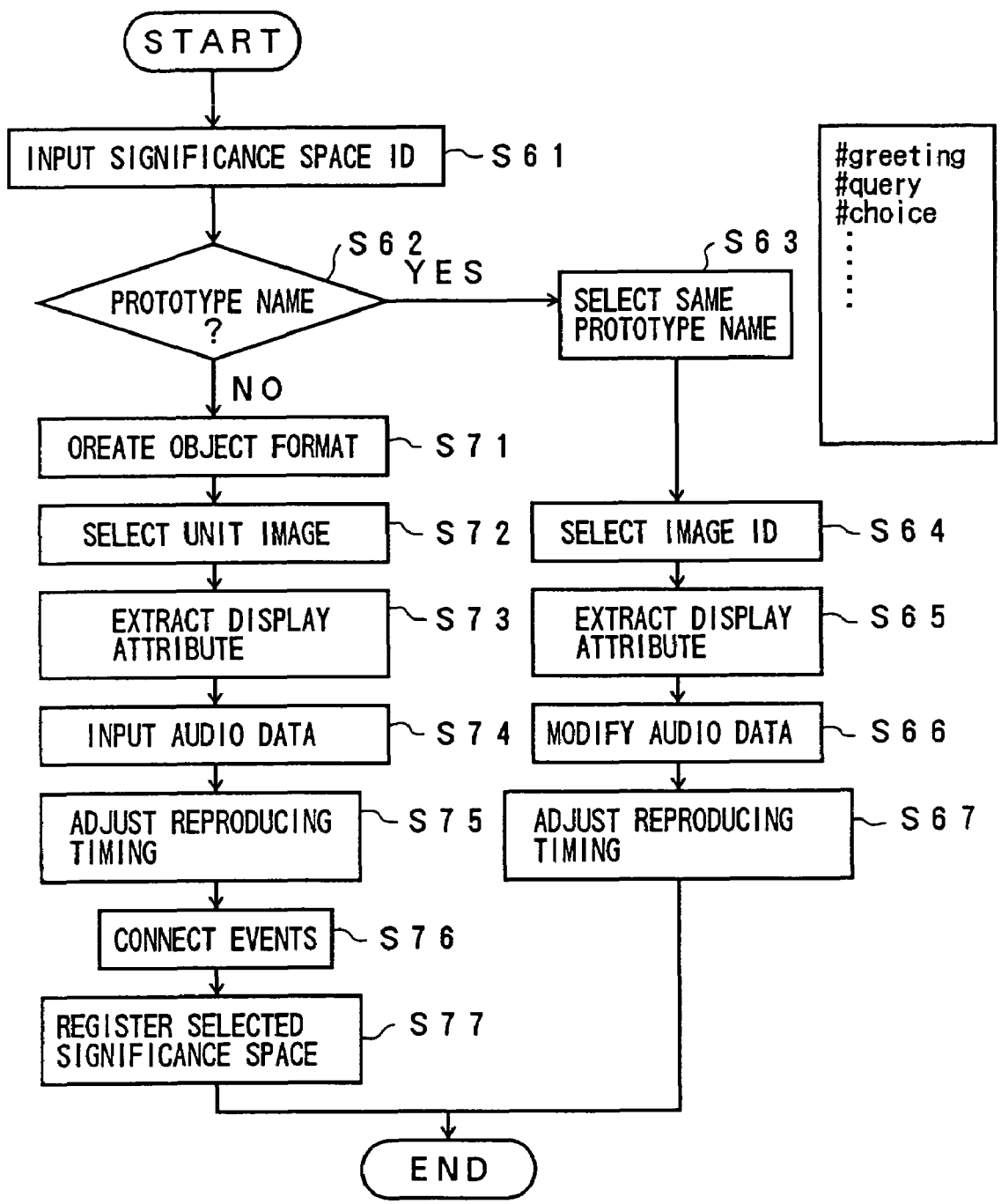
FIG. 40 is a flow chart for explaining a creation of the significance space.

Next, a description will be given of the creation of the significance space (object), by referring to FIG. 40. FIG. 40 is a flow chart for explaining the creation of the significance space.

In FIG. 40, a step S61 inputs a significance space ID which is the name of the significance space, and a step S62 decides whether or not the same name is set as a prototype name such as the significance space #1 for greeting described above. If the decision result in the step S62 is YES, a step S63 selects the same prototype name, that is, the significance space ID. After the step S63, modifications of the necessary functional parts are made in the selected significance space ID. More particularly, a step S64 selects the image ID which indicates the kind of character used in the significance space ID, and a step S65 extracts the display attribute from the database. Next, if necessary, the audio data is modified to adjust the timing with the reproducing timing of the character action, so as to form the significance space of the significance space ID. More particularly, a step S66 modifies the audio data, and a step S67 adjusts the reproducing timing of the character action to match the reproducing timing of the audio data by use of a reproduction cooperation function, and the process ends.

On the other hand, if the decision result in the step S62 is NO, i) the character image group (image list), ii) the display attribute (display rate, resolution, etc.), iii) the audio data, iv) the cooperation relationship of the audio and expression display, and v) each data and function of the input event, of the significance space are called, and the programmer manually sets the functions thereof. More particularly, a step S72 selects the necessary unit images, and a step S73 extracts the selected unit images from the database and also extracts the display attributes of the unit images. A step S74 inputs or registers the audio data which is to be sounded, and a step S75 adjusts the reproducing timing. A step S76 connects the events, and a step S77 inputs and registers the significance space selected by the connected events, thereby completing the creation of the significance space, and the process ends. In other words, if the input from the screen is necessary, the buttons on the screen are created, and the selected significance space is input by the event initiated from the button on the screen. The creation of the significance space is completed by registering the significance space which is input in this manner.

Next, a description will be given of a third embodiment of the image generating apparatus according to the present invention. This third embodiment of the image generating apparatus creates an operation guide sequence based on a program which is stored in a third embodiment of the storage medium according to the present invention.

Figure 41:
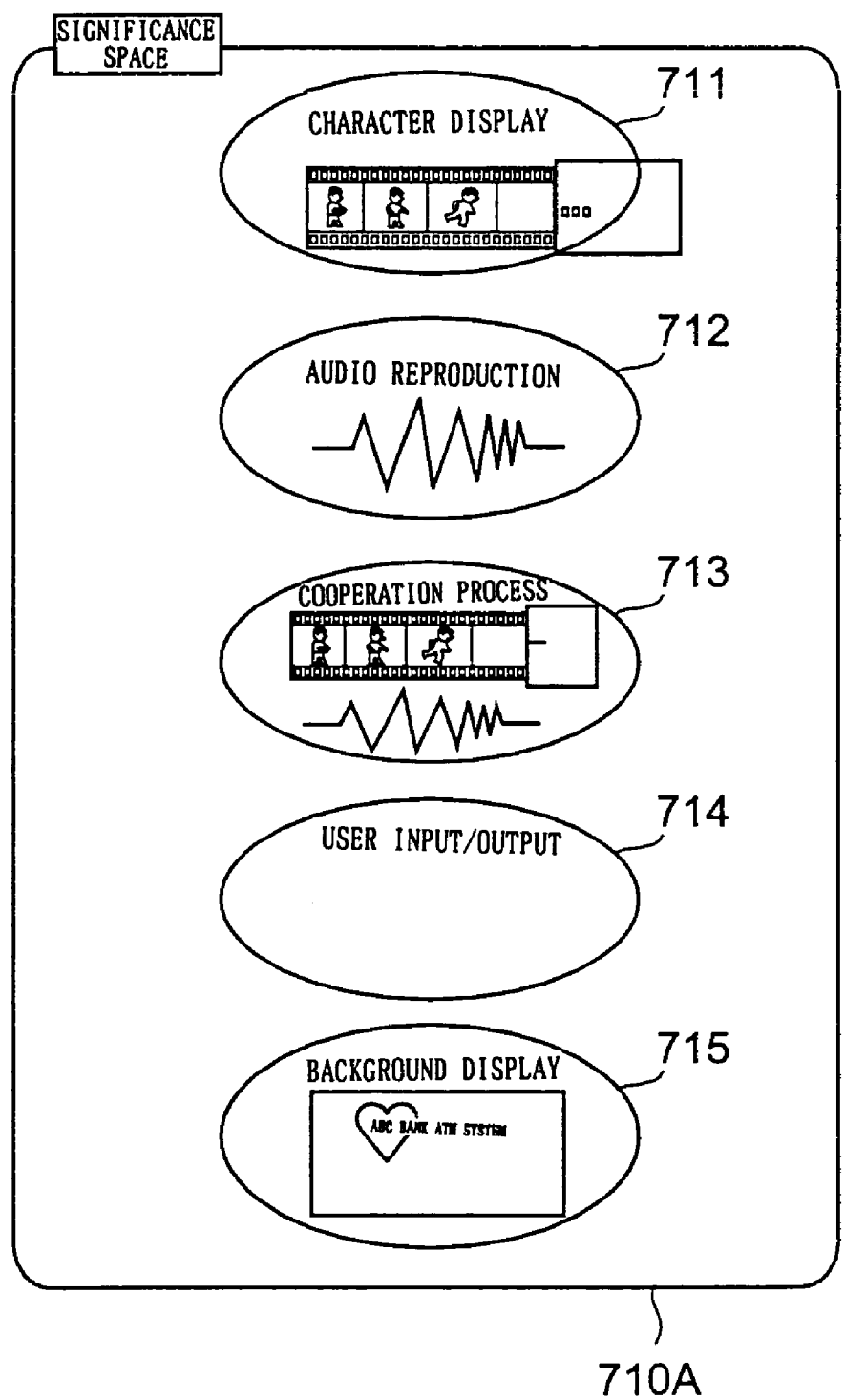
FIG. 41 is a diagram for explaining the significance space used in a third embodiment of the image generating apparatus according to the present invention.

FIG. 41 is a diagram for explaining a significance space which is used in this embodiment. In FIG. 41, those parts which are the same as those corresponding parts in FIG. 22 are designated by the same reference numerals, and a description thereof will be omitted. In this embodiment, a significance space 710A corresponds to one picture scene from a point in time when a switching of one picture occurs to a point in time when a next switching of the picture occurs. In addition, the significance space 710A includes a method 711 corresponding to character display, a method 712 corresponding to audio reproduction, a method 713 corresponding to a cooperation process between the character display and the audio reproduction, a method 714 corresponding to user input/output, and a method 715 corresponding to background display.

The method 715 corresponding to the background display has a function of calling image data of a background part of the displaying picture including the character, and superimposing and displaying the background with the character. The background image may be a still picture or a motion picture.

Figure 42:
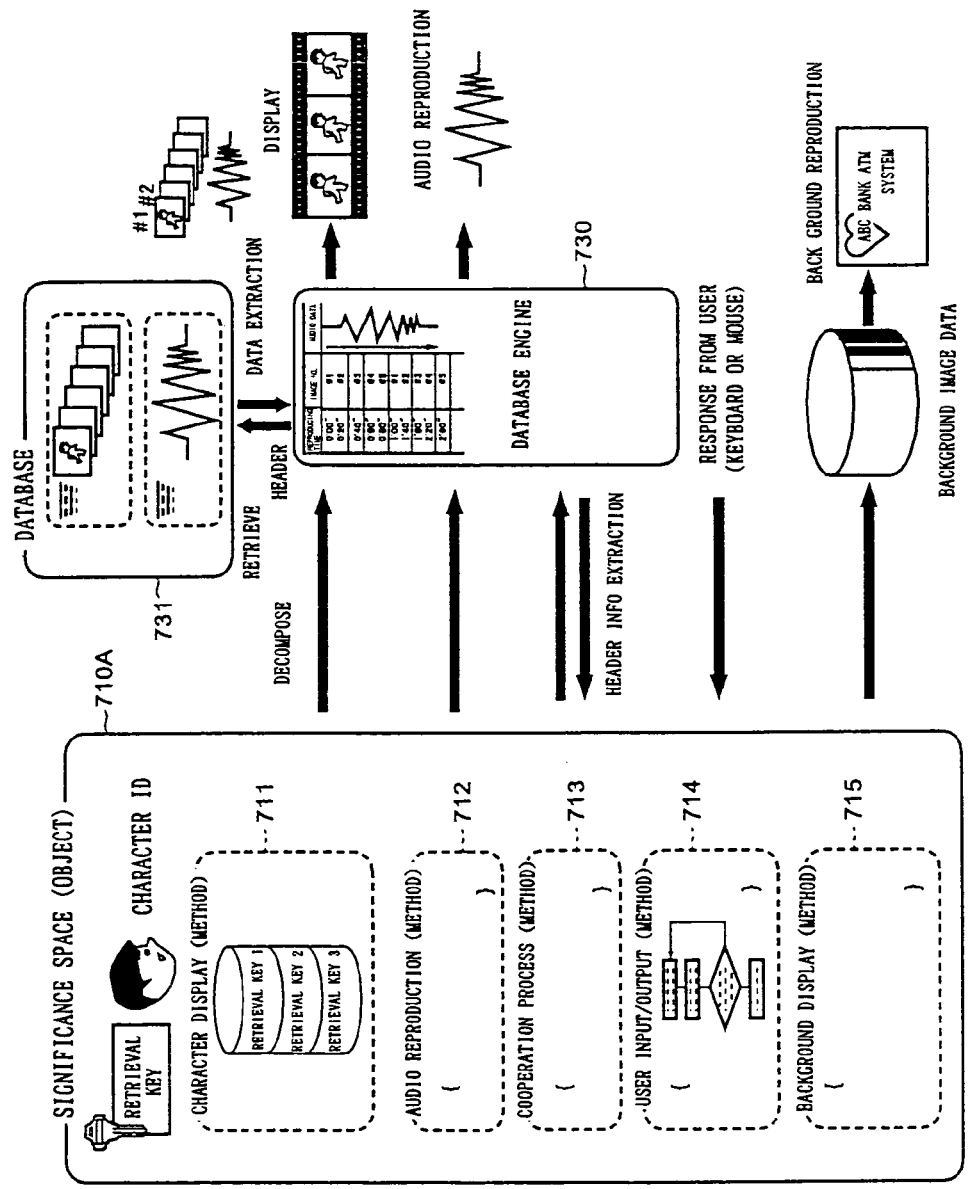
FIG. 42 is a diagram showing the general construction of the third embodiment of the image generating apparatus.

FIG. 42 is a diagram showing the general construction of a third embodiment of the image generating apparatus according to the present invention. In FIG. 42, those parts which are the same as those corresponding parts in FIGS. 25 and 41 are designated by the same reference numerals, and a description thereof will be omitted. Each of the functions of this embodiment can be realized by the computer system 100 used in the first embodiment, for example.

In FIG. 42, a character ID is set as a variable for each defined significant space 710. A database of a character to be used is specified from the database 731 based on this character ID. The actions of the character are substituted into the reproducing list, as retrieval keys, in the sequence of the actions, and are supplied in sequence to the database engine 730. The database engine 730 specifies the data from the retrieval key, and analyses a header of the data. After analyzing the header, the character expression/action data are supplied to the display memory in the sequence of the actions substituted in the reproducing list. In addition, the audio data are supplied to the audio reproducing part according to a reproducing list of in the audio reproducing function. Furthermore, a background image which is specified by the method 715 corresponding to the background display is extracted from a database of the background image, and is superimposed and reproduced with the image of the character.

FIG. 43 is a flow chart for explaining a process in a case where this embodiment is applied to the operation guide sequence shown in FIG. 21. In FIG. 43, those parts which are the same as those corresponding parts in FIG. 30 are designated by the same reference numerals, and a description thereof will be omitted. This case shown in FIG. 43 differs from the case shown in FIG. 21, in that the method of the background image is further defined in the object. In other words, in this embodiment, in a background display function part within the object corresponding to each significance space, a retrieval key of each background image is set as a variable. The necessary background image is written in a list array within the object by use of an ID of a background image file included in the header of the image file, similarly as in the case of the character image data and the audio data.

In FIG. 43, a method corresponding to the background of significance spaces 710A-1 and 710A-2 is "default picture I1 of ABC bank". A method corresponding to the background of significance spaces 710A-3 and 710A-5 is "picture I2 of window". In addition, a method corresponding to the background of a significance space 710A-4 is "solid color picture I3".

Figure 44:
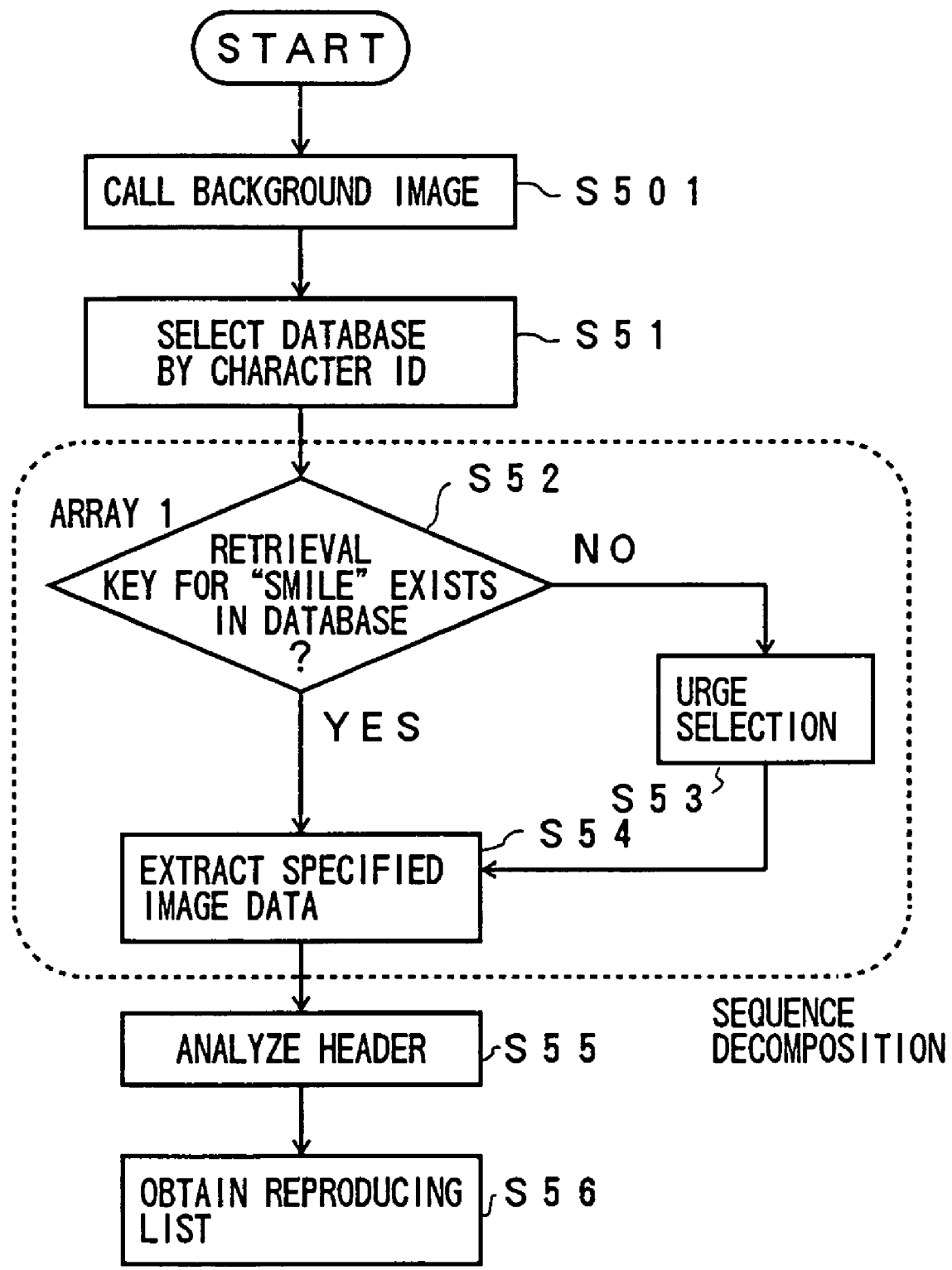
FIG. 44 is a flow chart for explaining the relationship of the significance space and the database engine.
Figure 45:
FIG. 45 is a diagram showing a part of the database of the background image and the database in which the character ID is the office lady.

FIG. 44 is a flow chart for explaining the relationship of the significance space and the database engine. FIG. 45 is a diagram showing a part of a database of the background image and the database in which the character ID is the office lady. In FIGS. 44 and 45, those parts which are the same as those corresponding parts in FIGS. 31 and 32 are designated by the same reference numerals, and a description thereof will be omitted. It is assumed for the sake of convenience that the process is carried out with respect to the significance space 710A-1 shown in FIG. 43 in which the object ID is "greeting". But of course, the process can be carried out similarly with respect to other significance spaces.

In FIG. 44, a step S501 calls a background image file having a header #0 from the database of the background image, based on a background image retrieval key (ABC bank) which is defined as a variable within the significance space 710A-1. The processes which follow after the step S501 is basically the same as those carried out in FIG. 31 described above. The step S501 which calls the background image file may be carried out before the image file of the character is called as shown in FIG. 44 or, may be carried out after the image file of the character is called.

In this embodiment, the database engine 730 constructs a reproducing list such as that shown in FIG. 46, by referring to the header of the database of the background image and the header of the database of the character image. In FIG. 46, those parts which are the same as those corresponding parts in FIG. 33 are designated by the same reference numerals, and a description thereof will be omitted.

Figures 47A, 47B:
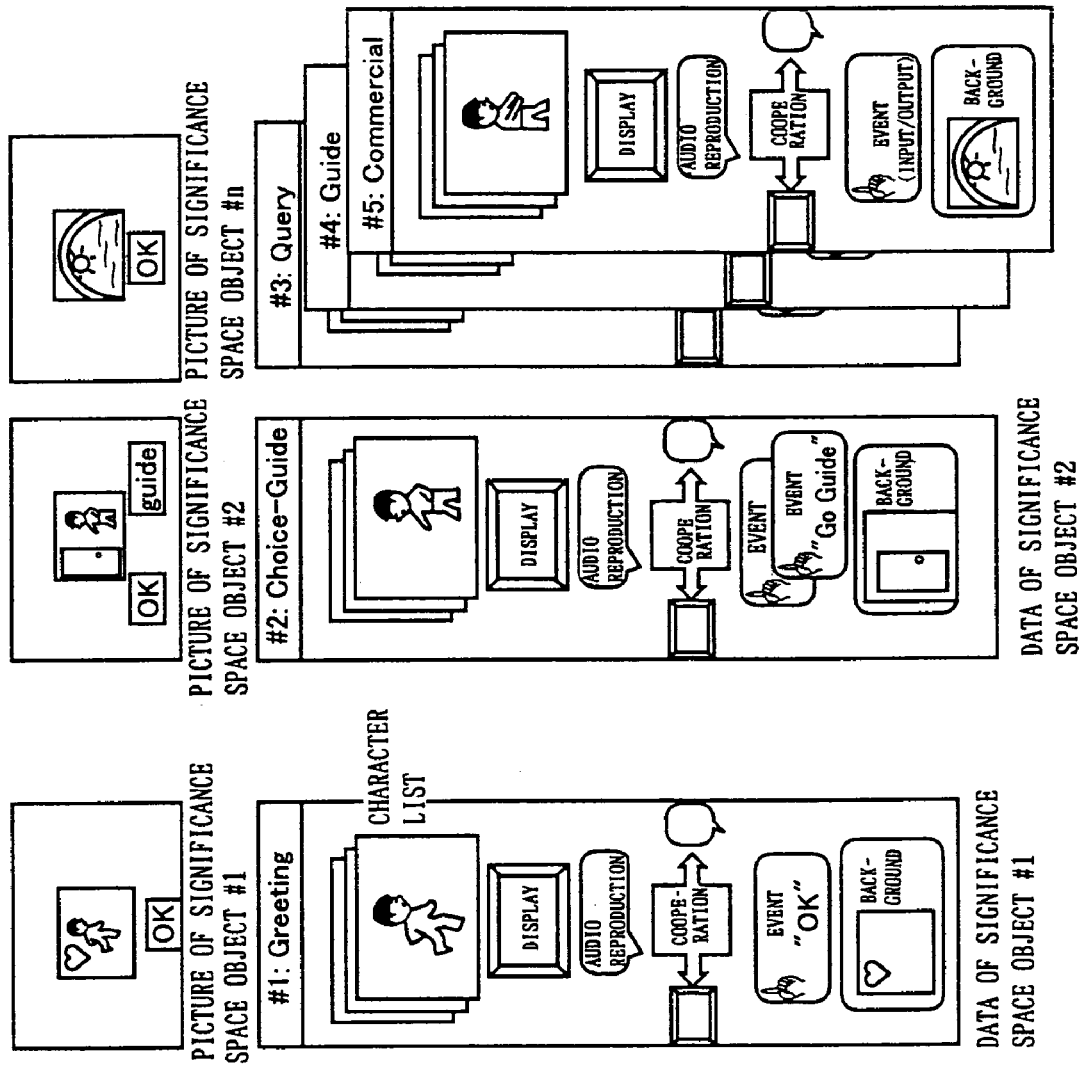
FIGS. 47A and 47B respectively are diagrams for explaining a method of constructing, displaying and connecting the significant spaces.
Figure 48:
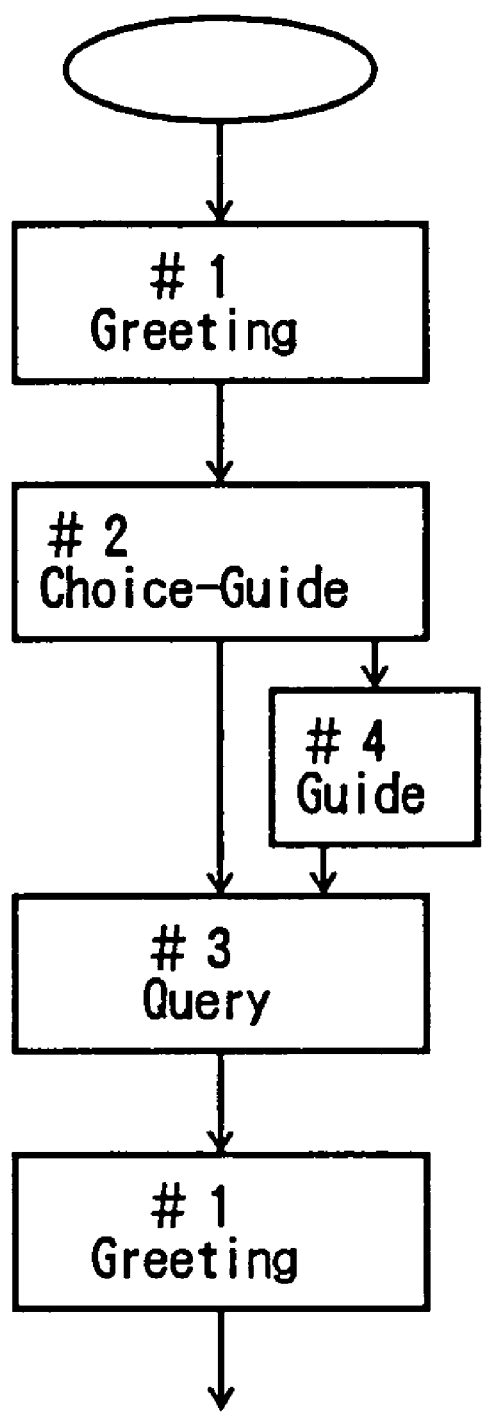
FIG. 48 is a diagram showing an editing using the significance space.

Next, a description will be given of the methods of forming, displaying and connecting the significance spaces. FIG. 47A shows pictures which are displayed by the significance spaces (objects), and FIG. 47B shows functional blocks of the significance spaces for realizing the pictures shown in FIG. 47A. In addition, FIG. 48 is a diagram showing an editing using the significance space.

FIG. 47B shows a significance space #1 for greeting, a significance space #2 for choice-guide, a significance space #3 for query, a significance space #4 for guide, and a significance space #5 for commercial. The functional blocks of each of these significance spaces #1 through #5 include i) a character image group (image list), ii) a display attribute (display rate, resolution, etc.), iii) an audio data, iv) a cooperation relationship of the audio and expression display, v) each data and function of the input event, and vi) a background image, which are required to form one significant space. The pictures shown in FIG. 47A are displayed by these functional blocks. The character action is prescribed by the functional block i), the necessary images are decomposed into image files, and the necessary image is sent from the database of the character image to the image memory.

The display position, the display rate, the display resolution and the like are prescribed by the functional block ii). The audio is prescribed by the functional block iii). The cooperation of the audio and action is prescribed by the functional block iv). Furthermore, in this embodiment, the functional block v) prescribes a process such as that performed in a case where the programmer receives an event that an "OK" button is selected and a reference is made to another significance space. The background image is prescribed by the functional block vi), and the displaying image is generated by calling the necessary background image and superimposing the background image and the character image.

A plurality of such significance spaces (objects) are created depending on the definitions made by the programmer. The constituent elements of the data and the functions are the same, but the required number of constituent elements may be selected depending on the significance space.

FIG. 48 shows an editing for a case where the significance space #1 for greeting, the significance space #2 for choice-guide, the significance space #3 for query, the significance space #4 for guide, and the significance space #5 for commercial shown in FIG. 47B are connected. As shown in FIG. 48, a plurality of connecting significance spaces (objects) are set when a plurality of options exist.

Figure 49:
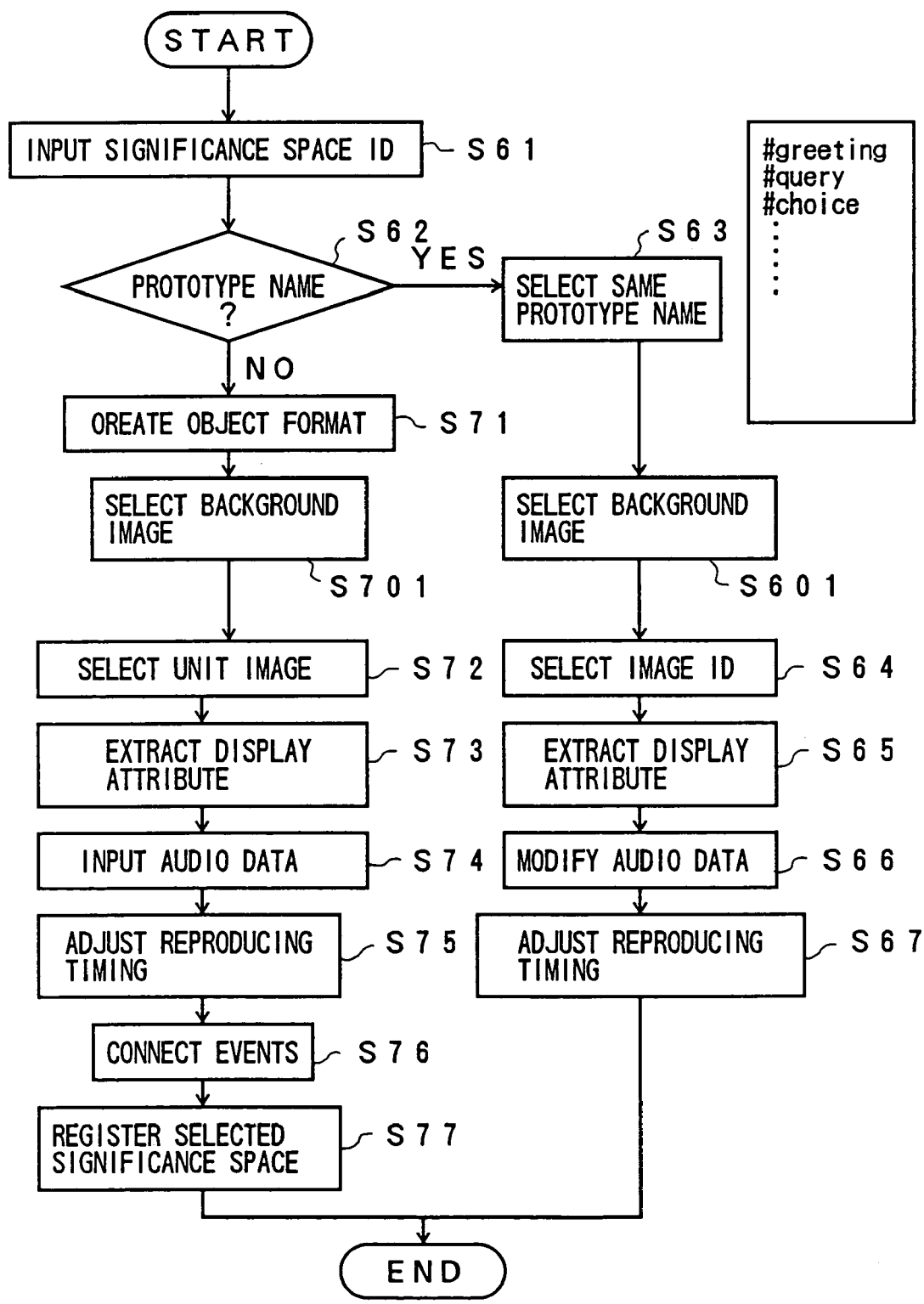
FIG. 49 is a flow chart for explaining the creation of the significance space.

Next, a description will be given of the creation of the significance space (object), by referring to FIG. 49. FIG. 49 is a flow chart for explaining the creation of the significance space. In FIG. 49, those steps which are the same as those corresponding steps in FIG. 40 are designated by the same reference numerals, and a description thereof will be omitted.

In FIG. 49, a step S601 selects the background image between the steps S63 and S64. In addition, a step S701 selects the background image between the steps S71 and S72.

By including the background image in the significance space, the creation and editing of the operation guide sequence is further facilitated.

The databases used in the second and third embodiments described above and having the structure specified by the methods within the significance spaces, respectively form first and second embodiments of the database according to the present invention.

Further, the present invention is not limited to these embodiments, but various variations and modifications may be made without departing from the scope of the present invention.

What is claimed is:

1. An image generating apparatus, comprising:
image generating means for generating a sequential character image by connecting a plurality of unit image groups, each of the plurality of unit image groups being made up of a plurality of sequential images, being defined and guaranteed in advance to indicate one communication information to a viewer, and being specified by attribute information corresponding to the one communication information indicated thereby; and
display means for displaying said sequential character image, wherein
the plurality of unit image groups have mutually different starting reference images and ending reference images with respect to a same communication information, and
the image generating means reads a leading unit image group and a trailing image group which have a starting reference image that approximately matches an ending reference image of the leading unit image group and connects the leading and trailing unit image groups.

2. An image generating apparatus, comprising:
an image generating part generating a sequential character image by connecting a plurality of unit image groups, each defined and guaranteed in advance to indicate a respective, individual communication information to a viewer;
a display part configured to display said sequential character image; and
a storage part storing a plurality of said unit image groups,
said storage part storing a plurality of kinds of unit image groups having mutually different starting reference images and ending reference images with respect to a same communication information, and
said image generating part reading a leading unit image group and a trailing image group which has a starting reference image approximately matching an ending reference image of the leading unit image group from said storage means and connecting the leading and trailing unit image groups.

3. A computer-readable storage medium which stores a program for causing a computer to generate a sequential character image, said program comprising:
an image generating procedure causing the computer to generate a sequential character image by connecting a plurality of unit image groups, each of the plurality of unit image groups being made up of a plurality of sequential images, being defined and guaranteed in advance to indicate one communication information to a viewer and being specified by attribute information corresponding to the one communication information indicated thereby; and
a display procedure causing the computer to display said sequential character image, wherein
the plurality of unit image groups have mutually different starting reference images and ending reference images with respect to a same communication information, and
a leading unit image group and a trailing image group are read which have a starting reference image that approximately matches an ending reference image of the leading unit image group and connects the leading and trailing unit image groups.

4. An image generating apparatus which generates a motion picture, comprising:
a database configured to store unit component images, each representing a respective series of actions, being defined and guaranteed in advance to indicate one communication information to a viewer and being made up of a plurality of images including a starting image and an ending image of an action of a character;
a data retrieving part configured to selectively search and read the unit component images stored in said database; and
a connecting part configured to connect an end image of a first unit component image read by said data retrieving part and a starting image of a second unit component image read by said data retrieving part.

5. An image generating apparatus for generating a motion picture, comprising:
a database configured to store unit image groups respectively representing an action of a character and made up of a plurality of sequential images, in correspondence with attribute information defining each action, each of said unit image groups being defined and guaranteed in advance to indicate one communication information to a viewer by the action represented thereby;

a retrieving part configured to read a unit image group corresponding to input attribute information from said database, based on the input attribute information; and an editing part configured to edit the unit image group read by said retrieving part, wherein the unit image groups have mutually different starting reference images and ending reference images with respect to a same communication information, and a leading unit image group and a trailing image group are read which have a starting reference image approximately matching an ending reference image of the leading unit image group from said storage means and connecting the leading and trailing unit image groups.

6. A computer-readable storage medium which stores a program for causing a computer to generate a motion picture, said program comprising:

a data retrieving procedure causing the computer to selectively search and read unit component images stored in a database which stores unit component images representing respective series of actions, each of said unit component images being defined and guaranteed in advance to indicate one communication information to a viewer and being made up of a plurality of images including a starting image and an ending image of an action of a character; and a connecting procedure causing the computer to connect an end image of a first unit component image which is caused to be read by said data retrieving procedure and a starting image of a second unit component image which is caused to be read by said data retrieving procedure.

7. A computer-readable storage medium which stores a program for causing a computer to generate a motion picture, said program comprising:

a retrieving procedure causing the computer to read a unit image group corresponding to input attribute information from a database, based on the input attribute information, said database storing unit image groups representing respective actions of a character and made up of a plurality of sequential images, in correspondence with attribute information defining each action, each of said unit image groups being defined and guaranteed in advance to indicate one communication information to a viewer by the respective action represented thereby; and an editing procedure causing the computer to edit the unit image group caused to read by said retrieving procedure, wherein the plurality of unit image groups have mutually different starting reference images and ending reference images with respect to a same communication information, and a leading unit image group and a trailing image group are read which have a starting reference image that approximately matches an ending reference image of the leading unit image group and connects the leading and trailing unit image groups.

8. An image generating apparatus comprising:

an image generating part generating a sequential character image by connecting a plurality of unit image groups, each of the plurality of unit image groups being made up of a plurality of sequential images, being defined and guaranteed in advance to indicate one communication information to a viewer, and being specified by attribute information corresponding to the one communication information indicated thereby;

a display part displaying the sequential character image; and a control configured to display a device depending on a motion of the sequential character image, wherein the plurality of unit image groups have mutually different starting reference images and ending reference images with respect to a same communication information, and a leading unit image group and a trailing image group are read which have a starting reference image that approximately matches an ending reference image of the leading unit image group and, connects the leading and trailing unit image groups.

9. An image generating apparatus, comprising:

a sequence generating part generating an operation sequence by connecting a plurality of picture scenes of a character image generated by said image generating apparatus, by treating the character image in units of significance spaces corresponding to one picture scene from a point in time when a switching of one picture of the character image occurs to a point in time when a next switching of one picture occurs, each of said significance spaces being defined as an object at least including a method corresponding to a character display and a method corresponding to a user input and/or output.

10. The image generating apparatus as claimed in claim 9, wherein said image sequence generating part calls a corresponding data file by searching a database based on a retrieval key specified by each method.

11. A computer-readable storage medium which stores a program for causing a computer to generate an operation sequence, said program comprising:

a sequence generating procedure causing the computer to generate an operation sequence by connecting a plurality of picture scenes of a character image, by treating the character image in units of significance spaces corresponding to one picture scene from a point in time when a switching of one picture of the character image occurs to a point in time when a next switching of one picture occurs each of said significance spaces being defined as an object at least including a method corresponding to a character display and a method corresponding to a user input and/or output.

12. The computer-readable storage medium as claimed in claim 11, wherein each of said significance spaces further includes at least one of a method corresponding to audio reproduction, a method corresponding to a cooperation process of the character display and the audio reproduction, and a method corresponding to a background image.

13. A database, comprising:

a character image stored in units of significance spaces corresponding to one picture scene from a point in time when a switching of one picture of the character image occurs to a point in time when a next switching of one picture occurs, and each of said significance spaces is defined as an object at least including a method corresponding to a character display and a method corresponding to a user input and/or output.

14. The database as claimed in claim 13, wherein an operation sequence is generated by connecting a plurality of picture scenes of the character image, and data files of the character image stored in the database are searched based on retrieval keys specified by each of methods.

15. An image generating method to generate a motion picture, comprising:

defining communication information, which guarantees in advance to indicate the communication information to a viewer;

generating a sequential character image by connecting a plurality of unit image groups, each of the plurality of unit image groups being made up of a plurality of sequential images, being defined and guaranteed in advance to indicate one communication information to a viewer, and being specified by attribute information corresponding to the one communication information indicated thereby; and displaying said sequential character image, wherein the plurality of unit image groups have mutually different starting reference images and ending reference images with respect to a same communication information, and a leading unit image group and a trailing image group are read which have a starting reference image that approximately matches an ending reference image of the leading unit image group and connects the leading and trailing unit image groups.

16. An image generating method to generate a motion picture, comprising:

defining communication information, which guarantees in advance to indicate the communication information to a viewer;

generating a sequential character image by connecting a plurality of unit image groups which, respectively, indicate the communication information to a viewer;

displaying said sequential character image;

storing a plurality of said unit image groups;

storing a plurality of kinds of unit image groups having mutually different starting reference images and ending reference images with respect to a same communication information; and reading a leading unit image group and a trailing unit image group which has a starting reference image approximately matching an ending reference image of the leading unit image group from said storage means and connecting the leading and trailing unit image groups.

17. An image generating apparatus, comprising:

an image generator generating a sequential character image by connecting a plurality of unit image groups respectively representing an action of a character and made up of a plurality of sequential images, in correspondence with attribute information defining each action, each of the plurality of unit image groups being defined and guaranteed in advance to indicate one communication information to a viewer by the action represented thereby; and a display part displaying said sequential character image, wherein the plurality of unit image groups have mutually different starting reference images and ending reference images with respect to a same communication information, and a leading unit image group and a trailing image group are read which have a starting reference image that approximately matches an ending reference image of the leading unit image group and connects the leading and trailing unit image groups.

18. The image generating apparatus as claimed in claim 1, wherein the plurality of said unit image groups are made up of humanoid images.

19. The computer-readable storage medium as claimed in claim 3, wherein the plurality of said unit image groups are made up of humanoid images.

20. The image generating apparatus as claimed in claim 9, further comprising:

a cooperation unit adjusting a reproducing time of image data when the reproducing time of the image data and a reproducing time of audio data do not match, such that the adjusted reproducing time of image data matches the reproducing time of audio data.

21. An image generating method to generate a motion picture, comprising:

defining communication information, which guarantees in advance to indicate the communication information to a viewer;

generating a sequential character image by connecting a plurality of unit image groups which, respectively, indicate the communication information to a viewer;

displaying said sequential character image; and adjusting a reproducing time of image data when the reproducing time of the image data and a reproducing time of audio data do not match, such that the adjusted reproducing time of image data matches the reproducing time of audio data.

22. An image generating apparatus comprising:

an image generating part generating a sequential character image by connecting a plurality of unit image groups, which are respectively defined and guaranteed in advance to indicate one communication information to a viewer; and a display part displaying said sequential character image, wherein at least one of the plurality of unit image groups has a respective starting image substantially identical to a respective trailing image.

23. A computer-readable storage medium which stores a program causing a computer to generate a sequential character image, said program comprising:

an image generating procedure causing the computer to generate a sequential character image by connecting a plurality of unit image groups which are respectively defined and guaranteed in advance to indicate one communication information to a viewer; and a display procedure causing the computer to display said sequential character image, wherein at least one of the plurality of unit image groups has a respective starting image substantially identical to a respective trailing image.

24. The image generating apparatus as claimed in claim 4, wherein at least one of the plurality of unit image groups has a respective starting image substantially identical to a respective trailing image.

25. An image generating apparatus for generating a motion picture, comprising:

a database storing unit image groups, each representing a respective action of a character and made up of a plurality of images, in correspondence with attribute information defining each action, each of said unit image groups being defined and guaranteed in advance to indicate one communication information to a viewer;

a retrieving part reading a unit image group corresponding to input attribute information from said database, based on the input attribute information; and an editing part editing the unit image group read by said retrieving part, wherein at least one of the plurality of unit image groups has a respective starting image substantially identical to a respective trailing image.

26. The computer-readable storage medium as claimed in claim 6, wherein at least one of the plurality of unit image groups has a respective starting image substantially identical to a respective trailing image.

27. A computer-readable storage medium which stores a program for causing a computer to generate a motion picture, said program comprising:

a retrieving procedure causing the computer to read a unit image group corresponding to input attribute information from a database, based on the input attribute information, said database storing unit image groups respectively representing an action of a character and made up of a plurality of images, in correspondence with attribute information defining each action, each of said unit image groups being defined and guaranteed in advance to indicate one communication information to a viewer; and an editing procedure causing the computer to edit the unit image group caused to read by said retrieving part, wherein at least one of the plurality of unit image groups has a respective starting image substantially identical to a respective trailing image.

28. An image generating apparatus, comprising:

an image generating part generating a sequential character image by connecting a plurality of unit image groups which are respectively defined and guaranteed in advance to indicate one communication information to a viewer;

a display part displaying the sequential character image; and a control part controlling a device depending on a motion of the sequential character image, wherein at least one of the plurality of unit image groups has a respective starting image substantially identical to a respective trailing image.

29. An image generating method to generate a motion picture, comprising:

defining communication information, which guarantees in advance to indicate the communication information to a viewer;

generating a sequential character image by connecting a plurality of unit image groups which, respectively, indicate the communication information to a viewer; and displaying said sequential character image, wherein at least one of the plurality of unit image groups has a respective starting image substantially identical to a respective trailing image.

30. An image generating apparatus comprising:

an image generating part generating a sequential character image by connecting a plurality of unit image groups which, respectively, represent an action and the plurality of unit image groups are guaranteed in advance to indicate one communication information to a viewer; and a display part displaying said sequential character image, wherein at least one of the plurality of unit image groups has a respective starting image substantially identical to a respective trailing image.

31. An image generating apparatus, comprising:

image generating means for generating a sequential character image by connecting a plurality of unit image groups, each of the plurality of unit image groups being made up of a plurality of sequential images, being defined and guaranteed in advance to indicate an individual communication information to a viewer, and being specified by attribute information corresponding to the individual communication information indicated thereby; and display means for displaying said sequential character image, wherein the plurality of unit image groups have mutual different starting reference images and ending reference images with respect to a same communication information, and a leading unit image group and a trailing image group are read which have a starting reference image that approximately matches an ending reference image of the leading unit image group and connects the leading and trailing unit image groups.

\* \* \* \* \*

UNITED STATES PATENT AND TRADEMARK OFFICE
CERTIFICATE OF CORRECTION

PATENT NO. : 7,348,984 B1
APPLICATION NO. : 09/356445
DATED : March 25, 2008
INVENTOR(S) : Satoshi Iwata et al.

It is certified that error appears in the above-identified patent and that said Letters Patent is hereby corrected as shown below:

Column 32, Line 9, change "and," to --and--.

Column 32, Line 38, change "occurs" to --occurs,--.

Column 36, Line 28, change "mutual" to --mutually--.

Signed and Sealed this

Second Day of September, 2008

JON W. DUDAS
*Director of the United States Patent and Trademark Office*